(12) United States Patent
Kono

(10) Patent No.: US 11,415,444 B2
(45) Date of Patent: Aug. 16, 2022

(54) PHYSICAL QUANTITY MEASUREMENT DEVICE

(71) Applicant: DENSO CORPORATION, Kariya (JP)

(72) Inventor: Yasushi Kono, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/191,131

(22) Filed: Mar. 3, 2021

(65) Prior Publication Data
US 2021/0190560 A1    Jun. 24, 2021

Related U.S. Application Data

(63) Continuation of application No. PCT/JP2019/027829, filed on Jul. 15, 2019.

(30) Foreign Application Priority Data

Sep. 6, 2018   (JP) .............................. JP2018-167180

(51) Int. Cl.
*G01F 1/684* (2006.01)
*G01F 1/692* (2006.01)
(Continued)

(52) U.S. Cl.
CPC ....... *G01F 1/684* (2013.01); *F02M 35/10386* (2013.01); *G01F 1/6842* (2013.01);
(Continued)

(58) Field of Classification Search
CPC . G01F 1/684; G01F 1/69; G01F 1/692; G01F 1/6842; G01F 1/6845; G01F 5/00; F02M 35/10386
See application file for complete search history.

(56) References Cited

U.S. PATENT DOCUMENTS 5,708,205 A  *  1/1998  Yamada ................... G01F 1/692
                                                       73/204.26
6,516,785 B1 *  2/2003  Nakada .................... G01F 1/684
                                                       123/494
(Continued)

FOREIGN PATENT DOCUMENTS

JP          2010-151795            7/2010
JP       2014001969 A   *  1/2014
(Continued)

OTHER PUBLICATIONS

U.S. Appl. No. 17/191,210, to Kono, entitled "Physical Quantity Measurement Device and Method for Manufacturing Physical Quanitity Measurement Device", filed Mar. 3, 2021 (80 pages).

*Primary Examiner* — Ryan D Walsh
(74) *Attorney, Agent, or Firm* — Nixon & Vanderhye P.C.

(57) ABSTRACT

A physical quantity measurement device includes a physical quantity detector that detects a physical quantity of a fluid in a measurement flow path, a physical quantity processor that receives a detection result of the physical quantity detector, and a support plate part that supports the physical quantity detector and the physical quantity processor. The support plate part includes a detector support portion to which the physical quantity detector is attached, and a processor support portion that is located at a position spaced apart from the detector support portion and to which the physical quantity processor is attached. Between the detector support portion and the processor support portion, a heat transfer regulation portion is provided to regulate heat transfer from the processor support portion to the detector support portion.

17 Claims, 44 Drawing Sheets

(51) Int. Cl.
  *G01F 5/00* (2006.01)
  *G01F 1/696* (2006.01)
  *F02M 35/10* (2006.01)

(52) U.S. Cl.
  CPC ............ *G01F 1/6845* (2013.01); *G01F 1/692* (2013.01); *G01F 1/696* (2013.01); *G01F 5/00* (2013.01)

(56) References Cited

U.S. PATENT DOCUMENTS

| | | | |
|---|---|---|---|
| 6,591,674 B2 * | 7/2003 | Gehman | ............... G01F 1/6842 73/204.21 |
| 2012/0247202 A1 | 10/2012 | Kohno et al. | |
| 2015/0000395 A1 | 1/2015 | Tashiro et al. | |
| 2018/0252564 A1 | 9/2018 | Tashiro et al. | |

FOREIGN PATENT DOCUMENTS

| JP | 2015-158521 | | 9/2015 | | |
|---|---|---|---|---|---|
| JP | 2015232514 A | * | 12/2015 | ........... | F02D 41/144 |
| JP | 2016-166895 | | 9/2016 | | |

* cited by examiner

FIG. 16
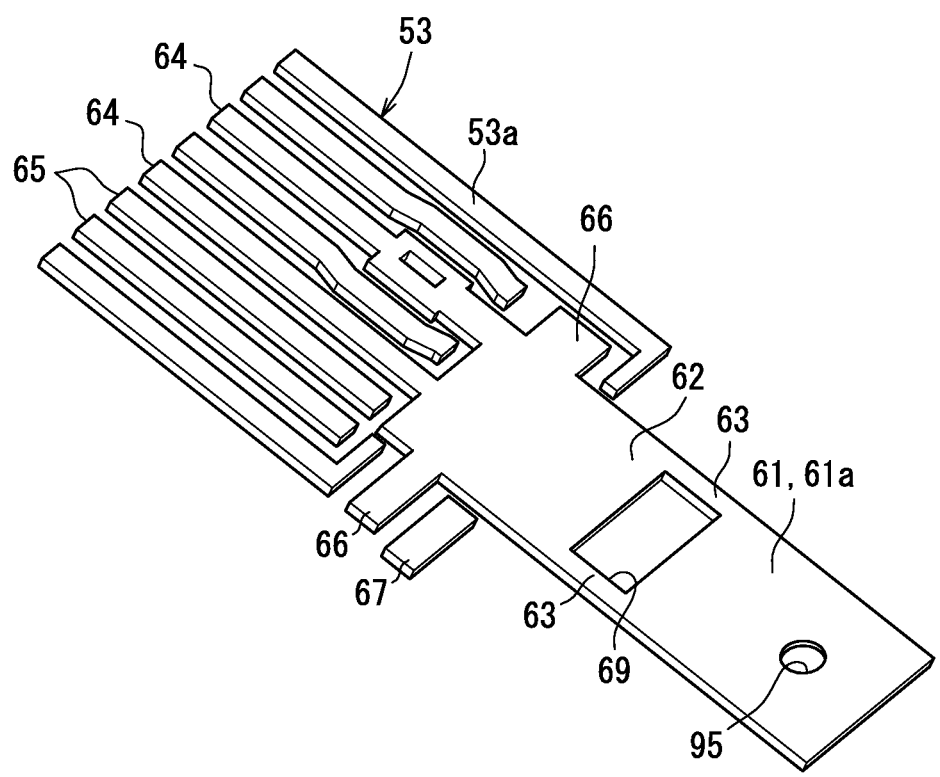
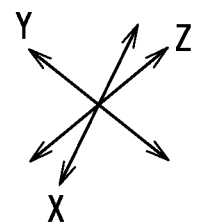

FIG. 21
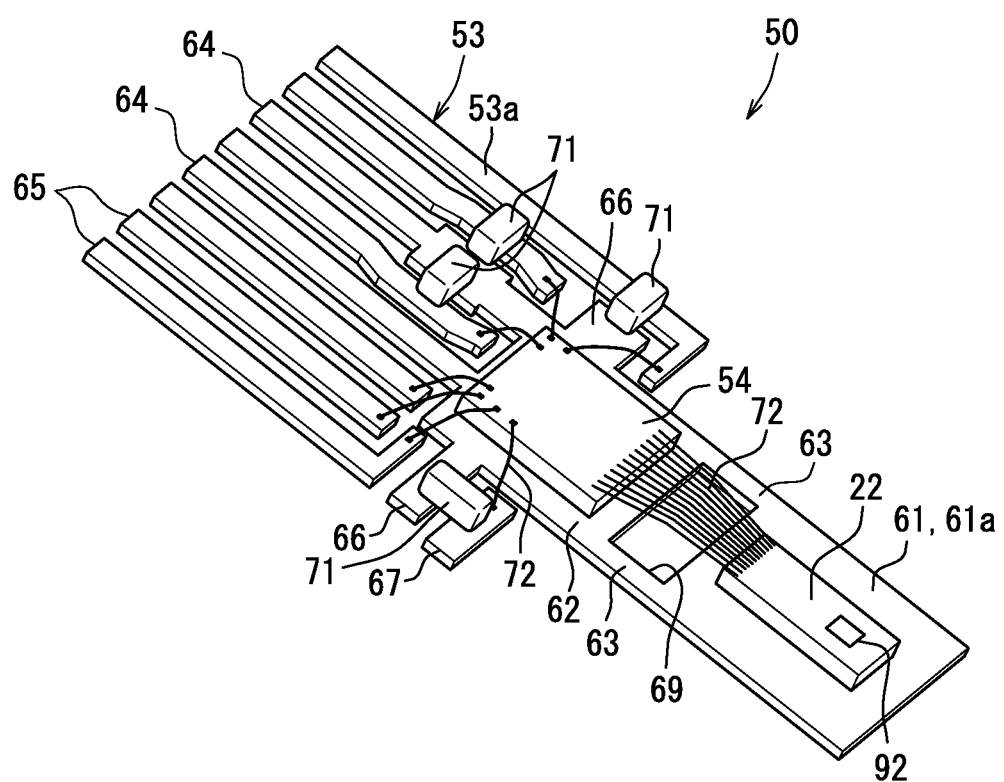
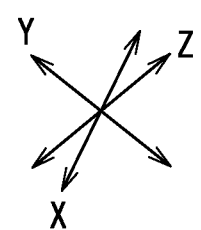

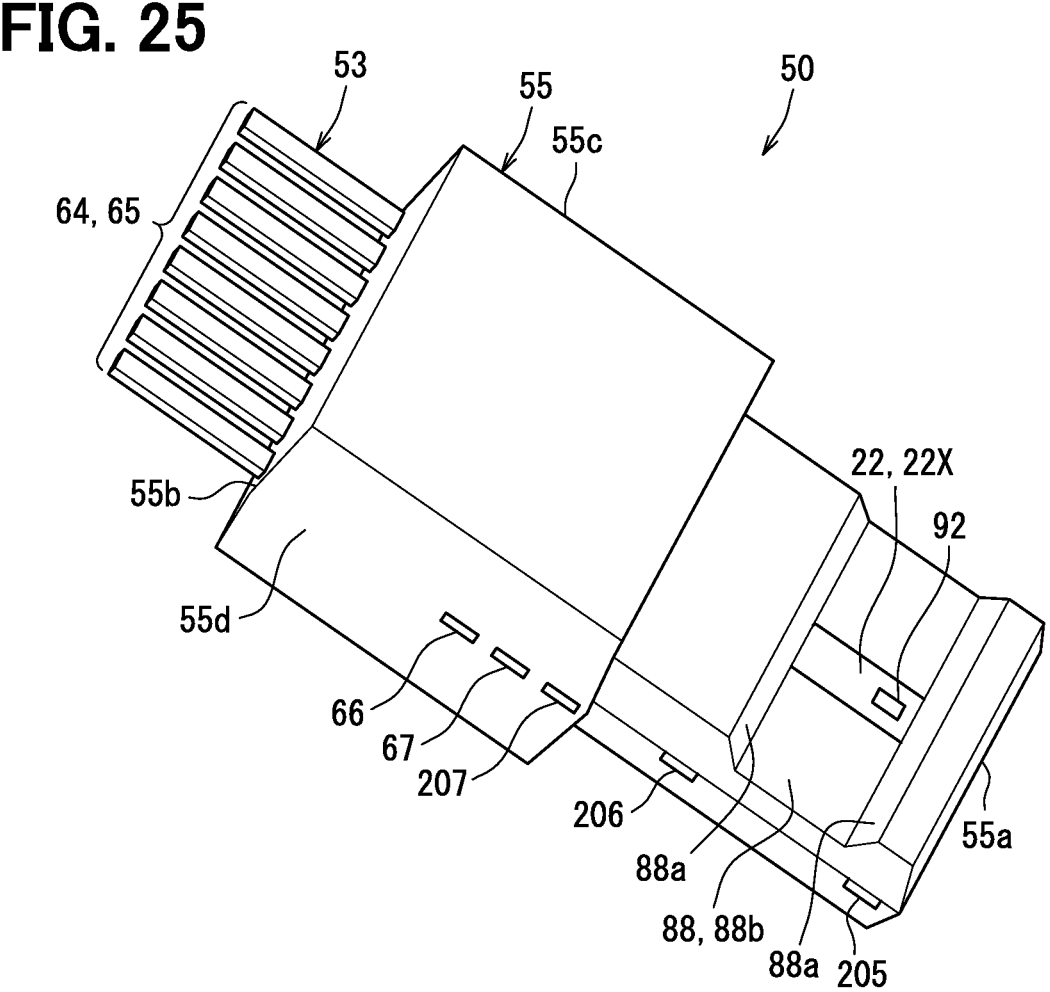
FIG. 25
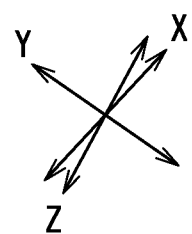

FIG. 32
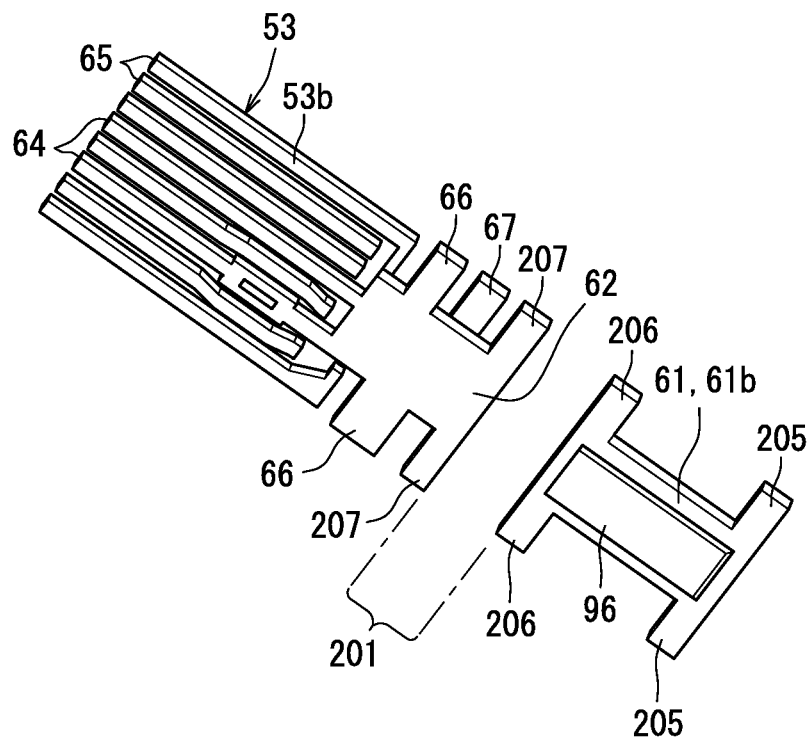
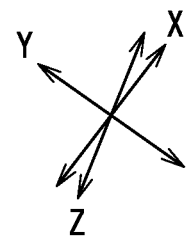

FIG. 34
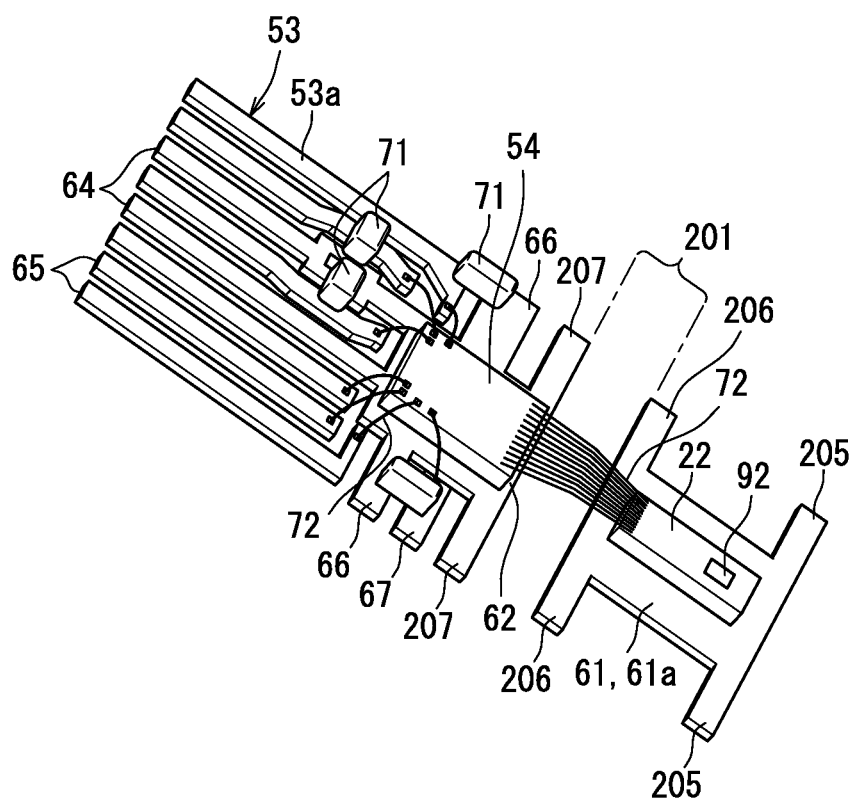
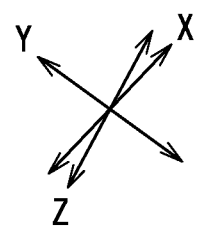

FIG. 41
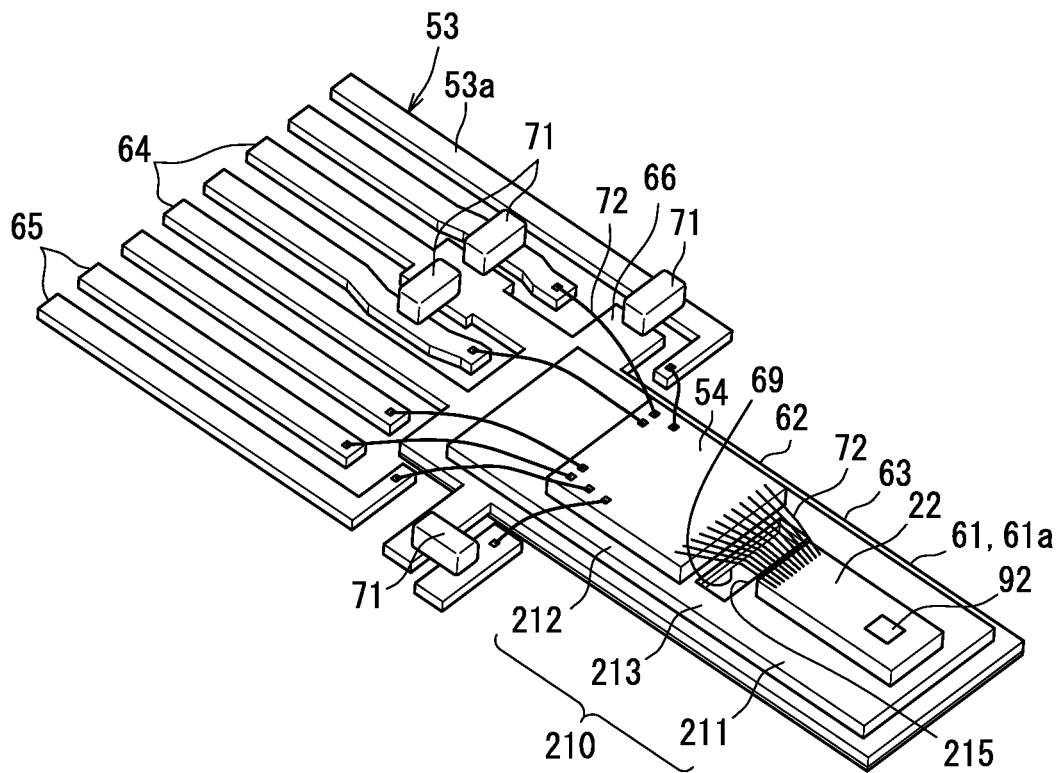
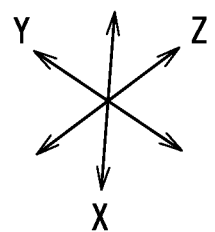

FIG. 44
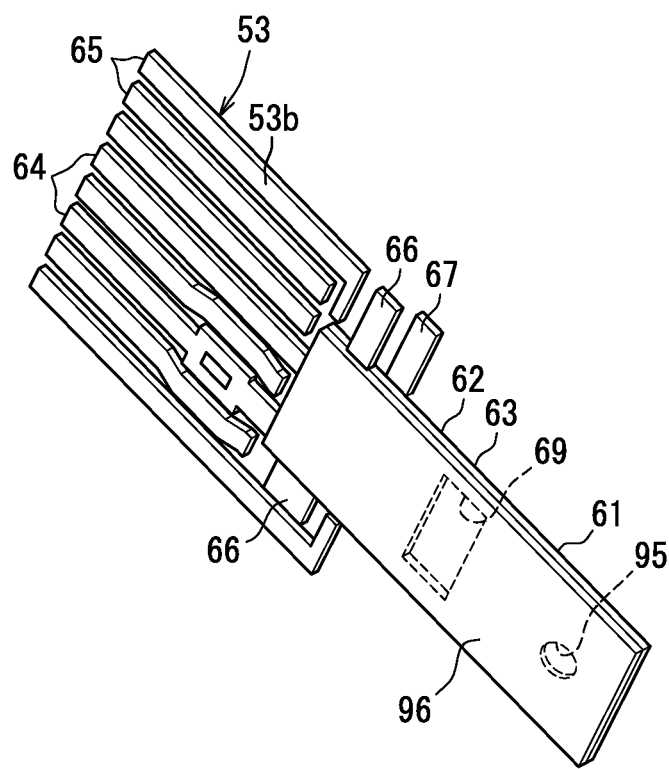
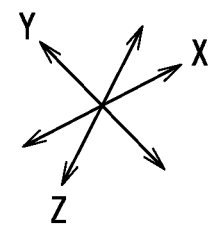

PHYSICAL QUANTITY MEASUREMENT DEVICE

CROSS REFERENCE TO RELATED APPLICATIONS

The present application is a continuation application of International Patent Application No. PCT/JP2019/027829 filed on Jul. 15, 2019, which designated the U.S. and claims the benefit of priority from Japanese Patent Application No. 2018-167180 filed on Sep. 6, 2018. The entire disclosures of all of the above applications are incorporated herein by reference.

TECHNICAL FIELD

The present disclosure relates to a physical quantity measurement device.

BACKGROUND

As a physical quantity measurement device for measuring a physical quantity of a fluid, for example, it is known a thermal flow meter that includes a sensor element for detecting the flow rate of air, a drive circuit electrically connected to the sensor element, and a lead frame having these sensor elements and the drive circuit thereon. In such a thermal flow meter, the sensor element has a heat generating resistor, and the drive circuit performs processing such as temperature control of the heat generating resistor according to the measurement of the air flow rate.

SUMMARY

The present disclosure describes a physical quantity measurement device including a physical quantity detector, a physical quantity processor, a support plate part, and a heat transfer regulation portion. The support plate part includes a detector support portion supporting the physical quantity detector thereon, and a processor support portion supporting the physical quantity processor thereon. The heat transfer regulation portion is disposed between the detector support portion and the processor support portion to regulate heat transfer from the processor support portion to the detector support portion.

BRIEF DESCRIPTION OF DRAWINGS

FIG. 16 is a perspective view of the SA substrate when viewed from a front side.

FIG. 21 is a perspective view of the SA substrate, in a state where the chip component is attached, when viewed from the front side.

FIG. 25 is a perspective view of the sensor SA according to the second embodiment, when viewed from the front side.

FIG. 32 is a perspective view of the SA substrate in the state where the filter unit is attached to the SA substrate, when viewed from the back side.

FIG. 34 is a perspective view of the SA substrate in a state where the chip component is attached to the SA substrate, when viewed from the front side.

FIG. 41 is a perspective view of the SA substrate, in the state where the chip component is attached to the SA substrate, when viewed from the front side.

FIG. 44 is a perspective view of an SA substrate, in a state where a filter unit is attached, when viewed from the back side.

DETAILED DESCRIPTION

Figure 1:
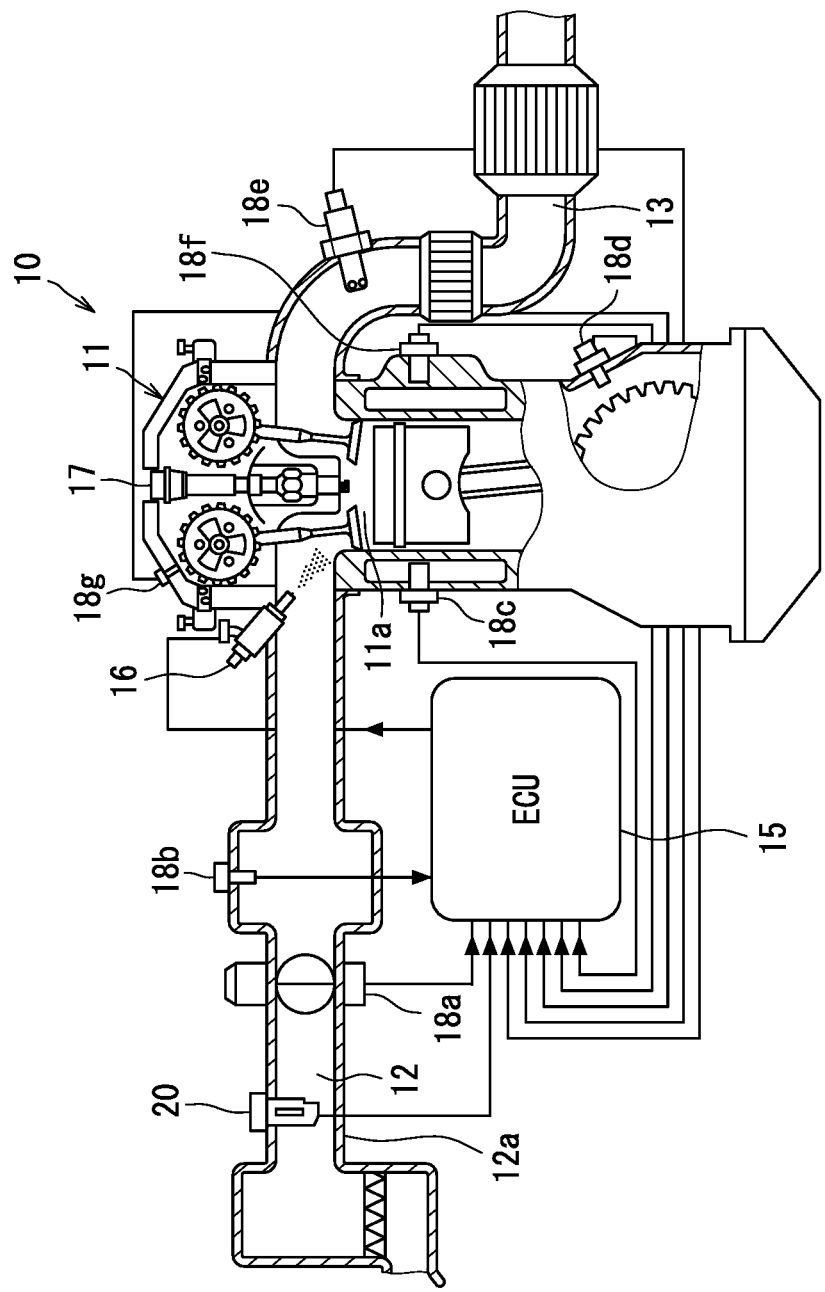
FIG. 1 is a diagram showing a configuration of a combustion system according to a first embodiment.

In a physical quantity measurement device including a sensor element, a drive circuit and a lead frame, if both the sensor element and the drive circuit are mounted on the lead frame, it is considered that, when heat is generated from the drive circuit due to the measurement of the fluid, the heat is transferred to the sensor element via the lead frame. If the heat generated from the drive circuit is transferred to the sensor element, it is assumed that the detection accuracy of the sensor element is lowered due to the temperature of the sensor element rising regardless of the flow rate of the air.

According to an aspect of the present disclosure, a physical quantity measurement device for measuring a physical quantity of a fluid includes: a measurement flow path through which a fluid to be measured flows; a physical quantity detector that detects the physical quantity of the fluid in the measurement flow path; a physical quantity processor that receives a detection result from the physical quantity detector; and a support plate part that supports the physical quantity detector and the physical quantity processor. The support plate part includes: a detector support portion to which the physical quantity detector is attached; and a processor support portion that is located at a position spaced apart from the detector support portion and to which the physical quantity processor is attached. The support plate part includes, between the detector support portion and the processor support portion, a heat transfer regulation portion that regulates heat transfer from the processor support portion to the detector support portion.

In such a physical quantity measurement device, in the support plate part, heat transfer from the processor support portion to the detector support portion is regulated by the heat transfer regulation portion. Therefore, even if heat is generated from the physical quantity processor, it is less likely that the heat will be transferred to the physical quantity detector through the support plate. As such, it is less likely that the temperature of the physical quantity detector will rise irrespective to the physical quantity of the fluid. In this case, since it is less likely that the detection accuracy of the physical quantity detector will be lowered due to the heat unrelated to the detection of the physical quantity being applied to the physical quantity detector, the measurement accuracy of the physical quantity can be improved.

Hereinafter, multiple embodiments of the present disclosure will be described with reference to the drawings. Throughout the embodiment, corresponding components will be designated with the same reference numbers, and descriptions thereof will not be repeated. When configurations are described only partly in the respective embodiments, the configurations of the embodiments previously described may be applied to the rest of the configurations. Further, not only the combinations of the configurations explicitly shown in the description of the respective embodiments, but also the configurations of the multiple embodiments can be partially combined even though they are not explicitly shown as long as there is no difficulty in the combination in particular. It should be understood that the unexplained combinations of the structural components recited in the following embodiments and modifications thereof are assumed to be disclosed in this description by the following explanation.

First Embodiment

A combustion system 10 shown in FIG. 1 includes an internal combustion engine 11 such as a gasoline engine, an intake passage 12, an exhaust passage 13, an airflow meter 20, and an ECU 15, and the combustion system 10 is mounted on a vehicle, for example. The airflow meter 20 is disposed in the intake passage 12 to measure a physical quantity such as a flow rate, a temperature, a humidity, or a pressure of an intake air supplied to the internal combustion engine 11. The airflow meter 20 corresponds to a "physical quantity measurement device" that measures a fluid, such as intake air. The intake air is a gas to be supplied to a combustion chamber 11a of the internal combustion engine 11. In the combustion chamber 11a, a mixture of the intake air and a fuel is ignited by an ignition plug 17.

The ECU (Engine Control Unit) 15 is a controller for controlling an operation of the combustion system 10. The ECU 15 is a calculation processing circuit including a processor, a storage medium such as a RAM, a ROM and a flash memory, a microcomputer including an input and output unit, a power supply circuit, and the like. The ECU 15 receives a sensor signal output from the airflow meter 20, sensor signals output from a large number of in-vehicle sensors, and the like. The ECU 15 uses measurement results of the airflow meter 20 to perform an engine control such as control of a fuel injection amount and an EGR amount of an injector 16. The ECU 15 is a controller that controls an operation of the internal combustion engine 11, and the combustion system 10 may be referred to as an engine control system. The ECU 15 corresponds to an external device.

The combustion system 10 has a plurality of measurement units as in-vehicle sensors. As the measurement units, in addition to the airflow meter 20, a throttle sensor 18a, an intake pressure sensor 18b, a water temperature sensor 18c, a crank angle sensor 18d, an air-fuel ratio sensor 18e, a knock sensor 18f, a cam angle sensor 18g, and the like are included. Each of these measurement units is electrically connected to the ECU 15 and outputs a detection signal to the ECU 15. The airflow meter 20 is provided in the intake passage 12 and at a position upstream of a throttle valve to which the throttle sensor 18a is attached.

Figure 3:
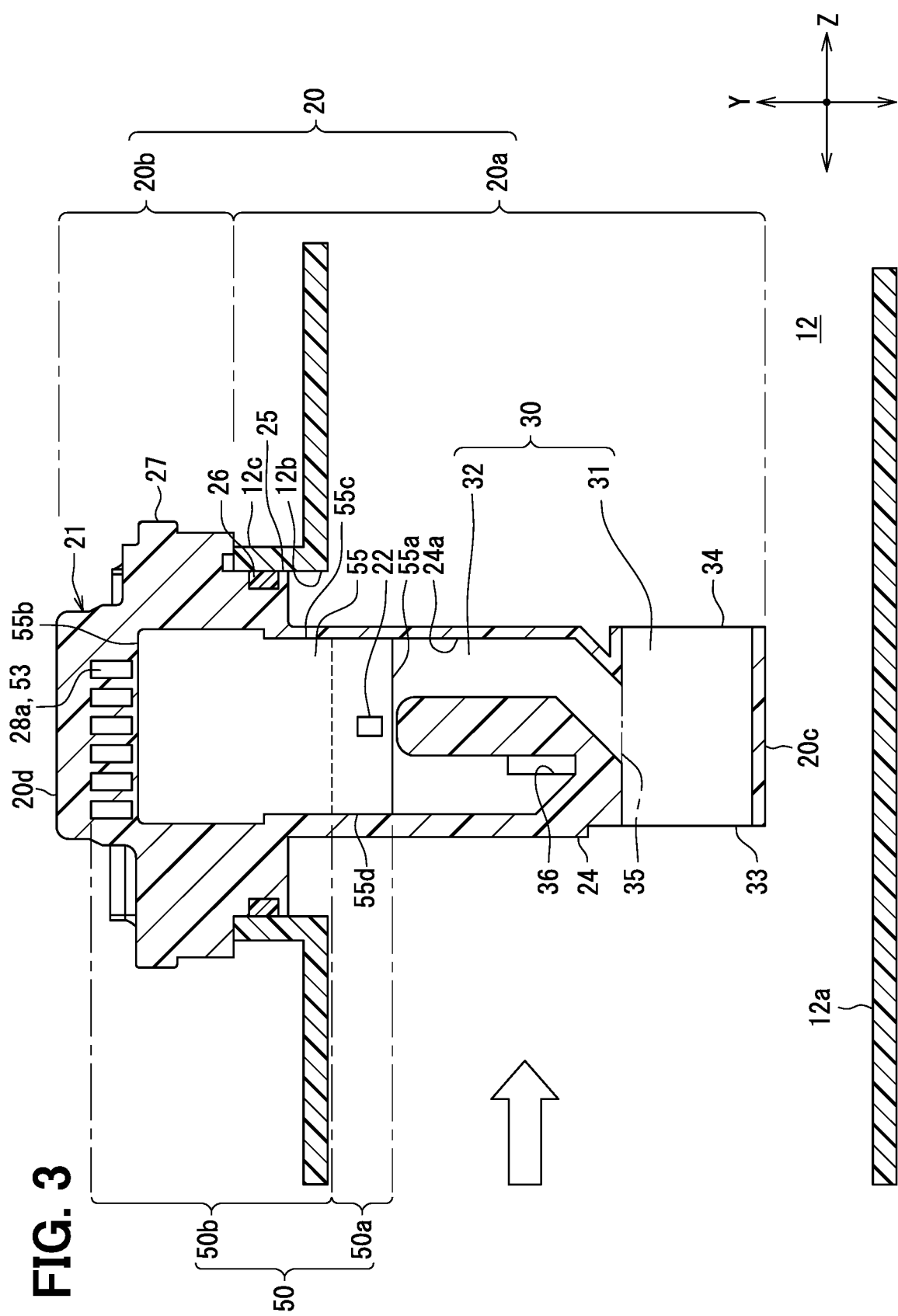
FIG. 3 is a vertical cross-sectional view of the airflow meter in a state of being attached to an intake pipe.

As shown in FIG. 3, the airflow meter 20 is attached to an intake pipe 12a such as a duct for forming the intake passage 12. The intake pipe 12a has an airflow meter insertion hole 12b as a through hole passing through an outer peripheral portion of the intake pipe 12a. An annular pipe flange 12c is provided to the airflow insertion hole 12b, and the pipe flange 12c is included in the intake pipe 12a. The airflow meter 20 is inserted into the pipe flange 12c and the airflow insertion hole 12b so as to enter and locate in the intake passage 12, and is fixed to the intake pipe 12a and the pipe flange 12c in this state.

In the present embodiment, a width direction X, a height direction Y, and a depth direction Z are defined for the airflow meter 20, and those directions X, Y, and Z are orthogonal to each other. The airflow meter 20 extends in the height direction Y, and the intake passage 12 extends in the depth direction Z. The airflow meter 20 includes an inner unit 20a positioned inside the intake passage 12 and an outer unit 20b protruding outward from the pipe flange 12c without being in the intake passage 12. The inner unit 20a and the outer unit 20b are aligned in the height direction Y. In the airflow meter 20, of one pair of end surfaces 20c and 20d aligned in the height direction Y, one being included in the inner unit 20a is referred to as an airflow tip end surface 20c, and the other being included in the outer unit 20b is referred to as an airflow base end surface 20d. The airflow tip end surface 20c and the airflow base end surface 20d are orthogonal to the height direction Y. Further, the tip end face of the pipe flange 12c is also orthogonal to the height direction Y.

Figure 2:
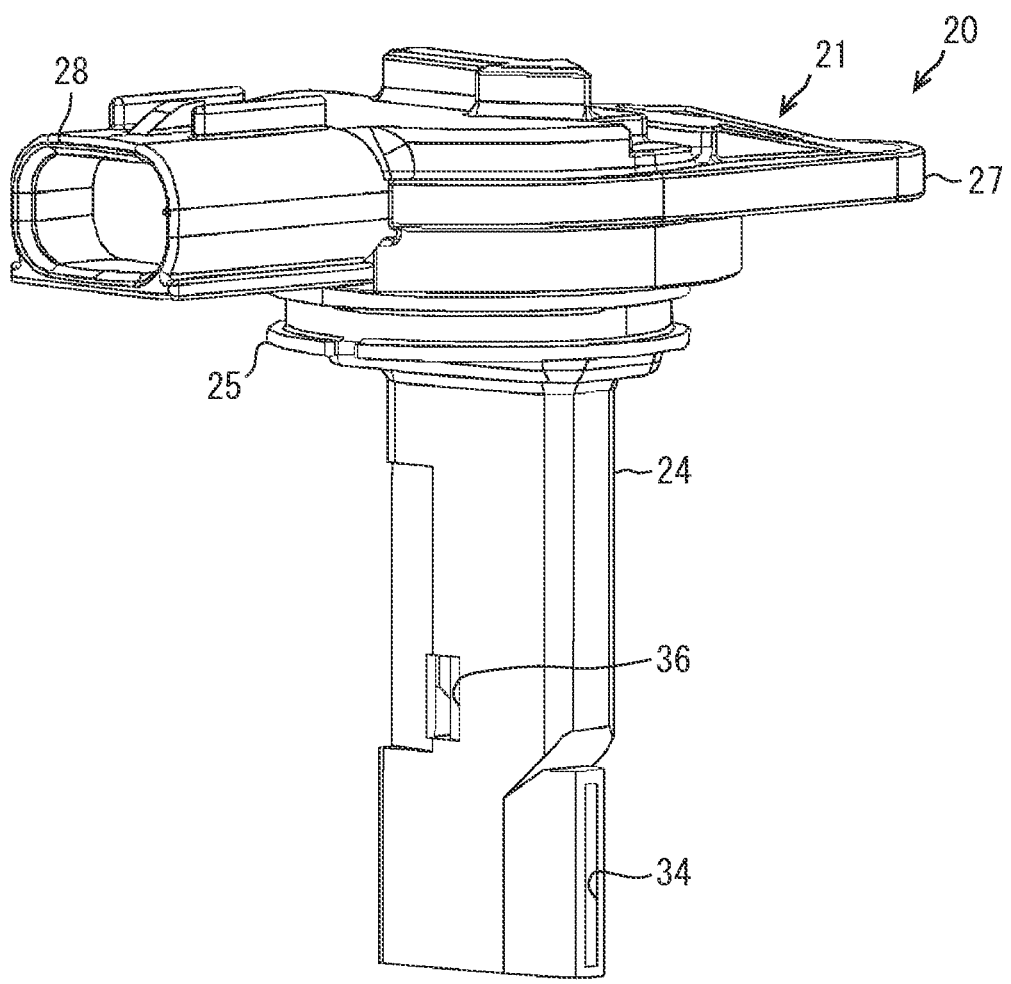
FIG. 2 is a perspective view of an airflow meter.

As shown in FIGS. 2 and 3, the airflow meter 20 includes a housing 21, a flow rate detection unit 22 that detects the flow rate of intake air, and an intake air temperature sensor (not shown) that detects the temperature of intake air. The housing 21 is made of, for example, a resin material. The housing 21 of the airflow meter 20 is attached to the intake pipe 12a such that the flow rate detection unit 22 can come in contact with the intake air flowing through the intake passage 12. The housing 21 has a housing main body 24, a ring holding portion 25, a flange portion 27, and a connector portion 28, and an O-ring 26 is attached to the ring holding portion 25.

The housing main body 24 is formed into a cylindrical shape as a whole. In the housing 21, the ring holding portion 25, the flange portion 27, and the connector portion 28 are integral with the housing main body 24. The ring holding portion 25 is included in the inner unit 20a, and the flange portion 27 and the connector portion 28 are included in the outer unit 20b.

The ring holding portion 25 is provided inside the pipe flange 12c, and holds the O-ring 26 so as not to be displaced in the height direction Y. The O-ring 26 is a sealing member for sealing the intake passage 12 inside the pipe flange 12c, and is in close contact with both an outer peripheral surface of the ring holding portion 25 and an inner peripheral surface of the pipe flange 12c. The flange portion 27 is formed with a fixing hole such as a screw hole for fixing a fixing tool such as a screw for fixing the airflow meter 20 to the intake pipe 12a. The connector portion 28 is a protection unit for protecting a connector terminal 28a electrically connected to the flow rate detection unit 22.

The flow rate detection unit 22 is provided in an internal space 24a of the housing main body 24, and the intake air temperature sensor is provided outside the housing 21. The intake air temperature sensor includes a temperature sensing element for sensing a temperature of the intake air, a lead wire extending from the temperature sensing element, and an intake air temperature terminal connected to the lead wire. The housing 21 includes a support portion that supports the intake air temperature sensor, and the support portion is provided on an outer peripheral side of the housing 21.

The housing main body 24 forms a bypass flow path 30 into which a part of the intake air flowing through the intake passage 12 flows. The bypass flow path 30 is disposed in the inner unit 20a of the airflow meter 20. The bypass flow path 30 includes a passage flow path 31 and a measurement flow path 32. The passage flow path 31 and the measurement flow path 32 are defined by an internal space 24a of the housing main body 24. The intake passage 12 may be referred to as a main passage, and the bypass flow path 30 may be referred to as a sub passage.

The passage flow path 31 passes through the housing main body 24 in the depth direction Z. The passage flow path 31 has an inflow port 33 as an upstream end and an outflow port 34 as a downstream end. The measurement flow path 32 is a branch flow path branched from an intermediate portion of the passage flow path 31, and the flow rate detection unit 22 is disposed in the measurement flow path 32. The measurement flow path 32 has a measurement inlet 35, which is an upstream end of the measurement flow path 32, and a measurement outlet 36, which is a downstream end of the measurement flow path 32. A portion where the measurement flow path 32 branches from the passage flow path 31 is a boundary between the passage flow path 31 and the measurement flow path 32, and the measurement inlet 35 is included in the boundary. The measurement inlet 35 corresponds to a branch inlet, and the measurement outlet 36 corresponds to a branch outlet. The boundary between the passage flow path 31 and the measurement flow path 32 may also be referred to as a flow path boundary.

The flow rate detection unit 22 is a thermal type flow rate sensor having a heater. The flow rate detection unit 22 outputs a detection signal according to a temperature change caused by heat generation of the heater. The flow rate detection unit 22 is a rectangular parallelepiped chip component. The flow rate detection unit 22 may also be referred to as a sensor chip. The flow rate detection unit 22 corresponds to a physical quantity detector that detects the flow rate of the intake air as a physical quantity of fluid.

The airflow meter 20 has a sensor sub-assembly including the flow rate detection unit 22, and the sensor sub-assembly is referred to as a sensor SA 50. The sensor SA 50 is accommodated in the internal space 24a of the housing main body 24. The sensor SA 50 may also be referred to as a detection unit, a measurement unit, or a sensor package.

The sensor SA 50 has an inward part 50a entering and locating in the measurement flow path 32 in the internal space 24a, and an outward part 50b protruding from the measurement flow path 32 without entering the measurement flow path 32. The inward part 50a and the outward part 50b are aligned in the height direction Y, and the flow rate detection unit 22 is included in the inward part 50a.

Figure 5:
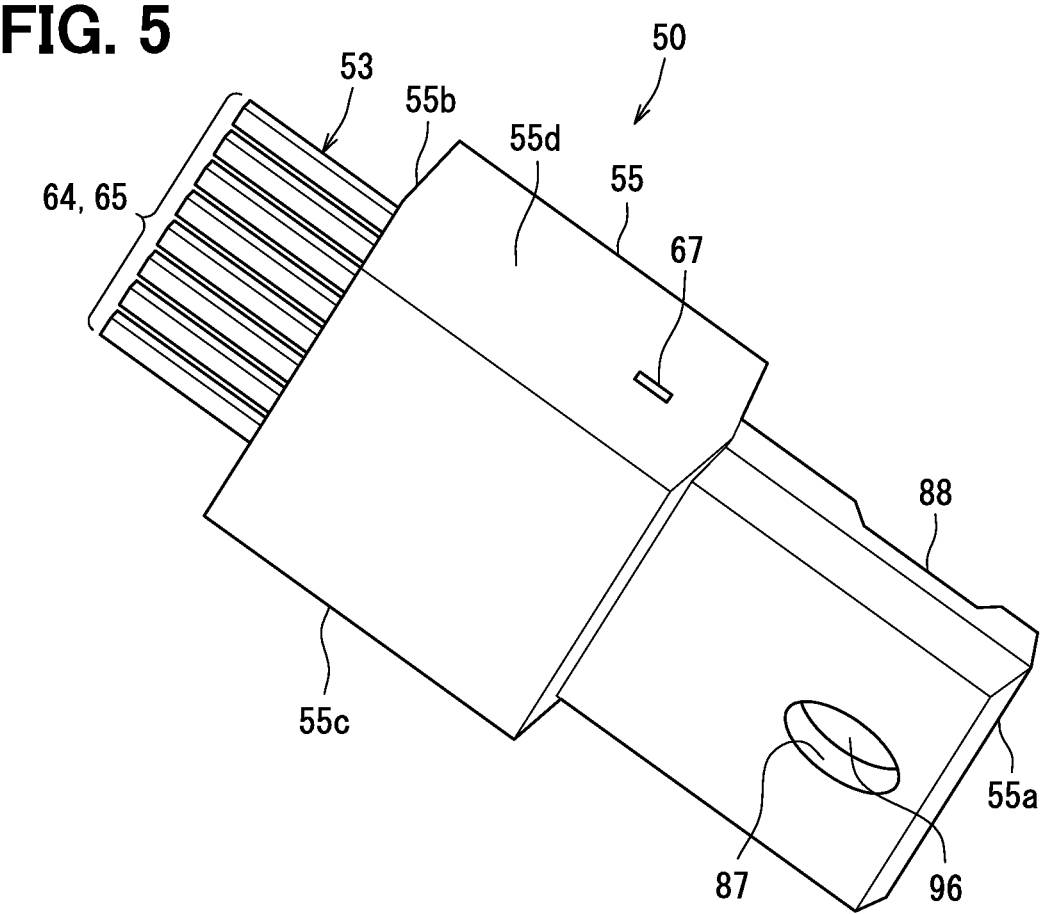
FIG. 5 is a perspective view of the sensor SA when viewed from a back side.
Figure 6:
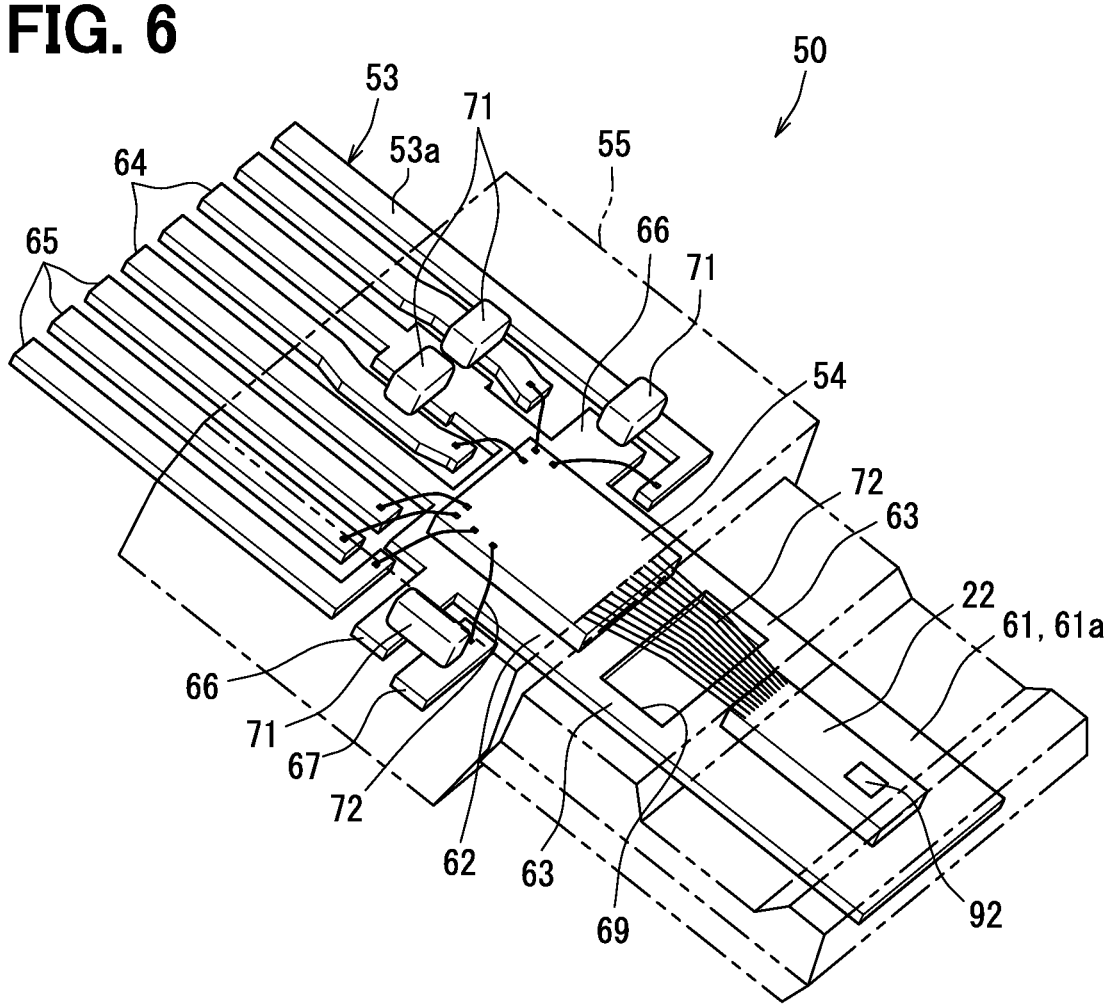
FIG. 6 is a perspective view for showing an internal structure of the sensor SA.
Figure 7:
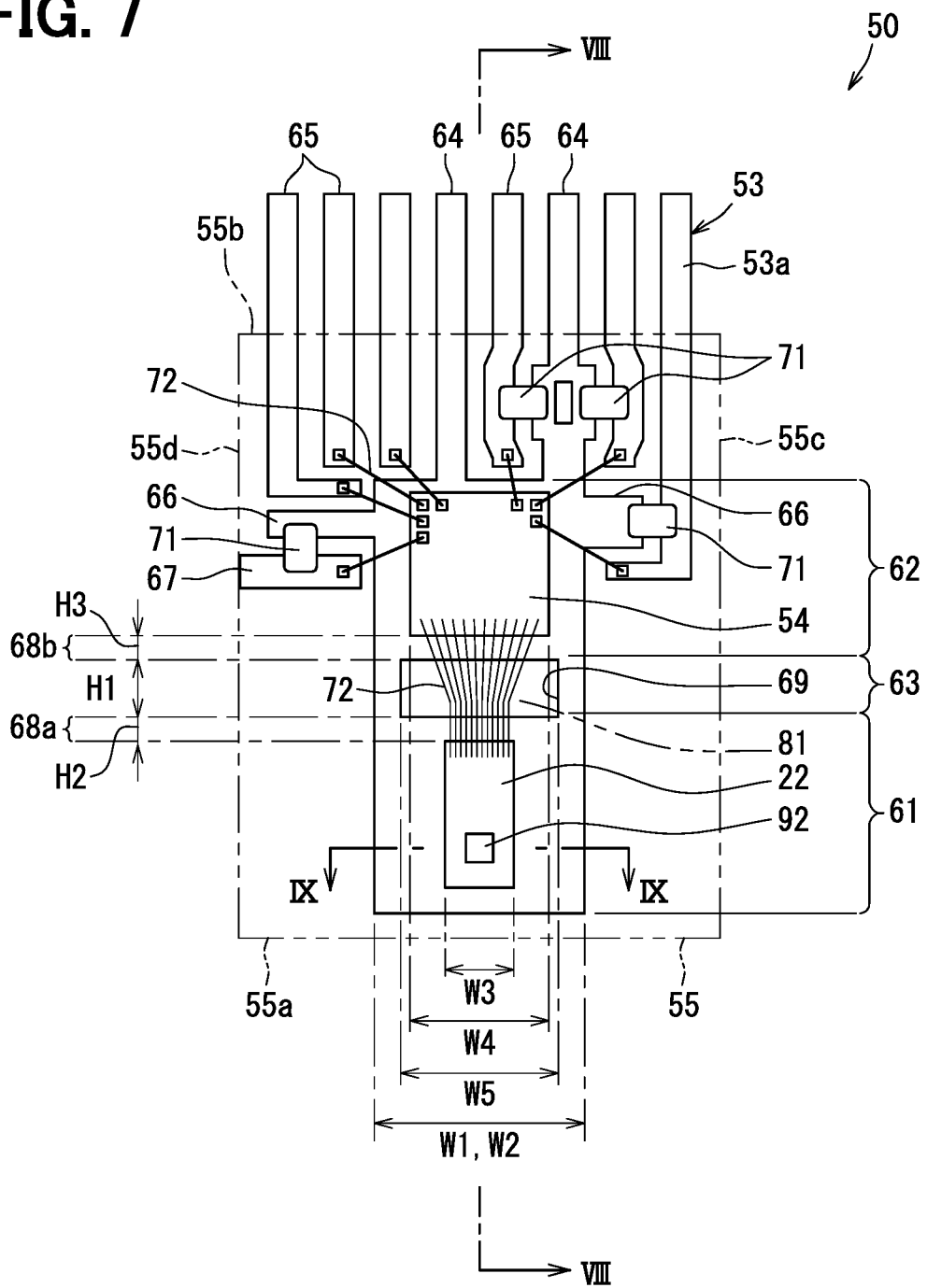
FIG. 7 is a front view for showing the internal structure of the sensor SA.

As shown in FIGS. 4 to 7, the sensor SA 50 includes an SA substrate 53 on which the flow rate detection unit 22 is mounted, a flow rate processor 54 electrically connected to the flow rate detection unit 22, and a molded part 55 covering the SA substrate 53, and the flow rate detection unit 22, and the flow rate processor 54. The flow rate processor 54 receives a detection signal from the flow rate detection unit 22 as the detection result of the flow rate detection unit 22. The flow rate detection unit 22 corresponds to the physical quantity processor. Further, the SA substrate 53 corresponds to the support plate part, and the molded part 55 corresponds to a body that protects the physical quantity detector and the physical quantity processor. The SA substrate may also be referred to as a lead frame. In FIG. 7, the molded part 55 is shown by a virtual line in order to illustrate the internal structure of the sensor SA 50.

The molded part 55 is formed into a plate shape as a whole. As shown in FIG. 3, in the molded part 55, of one pair of end surfaces 55a and 55b arranged in the height direction Y, one being included in the inward part 50a is referred to as a mold tip end surface 55a and the other being included in the outward part 50b is referred to as a mold base end surface 55b. Of one pair of surfaces 55c, 55d facing each other on opposite sides of the mold tip end surface 55a and the mold base end surface 55b, one is referred to as a mold upstream surface 55c, and the other is referred to as a mold downstream surface 55d. The sensor SA 50 is arranged in the internal space 24a with an orientation such that the mold tip end surface 55a is adjacent to the airflow tip end surface 20c, and the mold upstream surface 55c is arranged upstream from the mold downstream surface 55d in the measurement flow path 32.

The mold upstream surface 55c of the sensor SA 50 is arranged on the upstream side of the mold downstream surface 55d in the measurement flow path 32. A flow direction of air in a part of the measurement flow path 32 where the flow rate detection unit 22 is disposed is opposite to a flow direction of air in the intake passage 12. Therefore, the mold upstream surface 55c is located downstream of the mold downstream surface 55d in the intake passage 12.

In FIGS. 6 and 7, the SA substrate 53 is made of a metal material or the like, and formed into a plate shape as a whole. The SA substrate 53 is a conductive substrate. A plate surface of the SA substrate 53 is orthogonal to the width direction X and extends in the height direction Y and the depth direction Z. The SA substrate 53 includes a detection frame 61 that supports the flow rate detection unit 22, a processor frame 62 that supports the flow rate processor 54, a connection frame 63 that connects these frames 61 and 62, and lead terminals 64, 65 that are connected to the connector terminal 28a. The detection frame 61 corresponds to a detector support portion, the processor frame 62 corresponds to a processor support portion, and the connection frame 63 corresponds to a connection support portion.

The detection frame 61 and the processor frame 62 are each formed into a rectangular shape as a whole, and their respective plate surfaces are orthogonal to the width direction X. The detection frame 61 is provided at a position separated from the processor frame 62 toward the mold tip end surface 55a. A pair of connection frames 63 are provided between the detection frame 61 and the processor frame 62 in the height direction Y, and each of the connection frames 63 is in a state of bridging the detection frame 61 and the processor frame 62. The pair of connection frames 63 are arranged in the depth direction Z in a state of being separated from each other.

The SA substrate 53 is formed with a substrate hole 69 as a through hole that passes through the SA substrate 53 in the width direction X. The substrate hole 69 is located between the detection frame 61 and the processor frame 62 in the height direction Y, and provides a separation portion between the frames 61 and 62. Further, the substrate hole 69 is located between the pair of connection frames 63 in the depth direction Z, and provides a separation portion between the connection frames 63. The substrate hole 69 is arranged between the flow rate detection unit 22 and the flow rate processor 54 in the height direction Y. Since the SA substrate 53 is formed with the substrate hole 69, in regard to the cross section defined in a direction orthogonal to the height direction Y, the total cross-sectional area of the pair of connection frames 63 is smaller than the cross-sectional area of each of the detection frame 61 and the processor frame 62. Therefore, the connection frame 63 is less likely to transfer heat than each of the detection frame 61 and the processor frame 62. The substrate hole 69 corresponds to the through portion.

Figure 8:
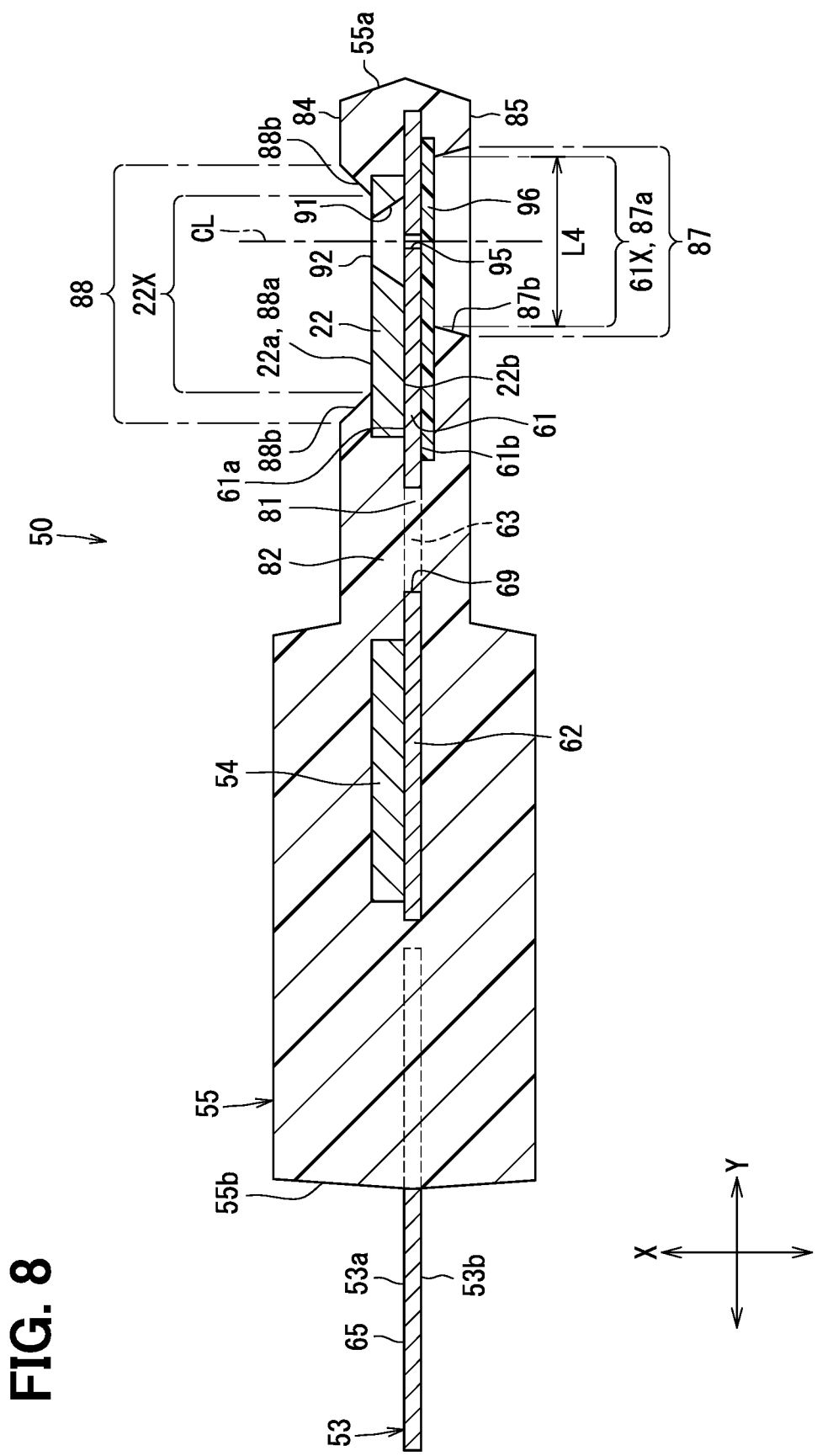
FIG. 8 is a cross-sectional view taken along a line VIII-VIII in FIG. 7.

As shown in FIG. 8, both the flow rate detection unit 22 and the flow rate processor 54 are mounted on one of the plate surfaces of the SA substrate 53. The one of the plate surfaces on which the flow rate detection unit 22 and the flow rate processor 54 are mounted is referred to as a front surface 53a, and the other of the plate surfaces opposite to the front surface 53a is referred to as a back surface 53b. The front surface 53a of the SA substrate 53 includes the front surface 61a of the detection frame 61, and the back surface 53b of the SA substrate 53 includes the back surface 61b of the detection frame 61. The front surface 61a and the back surface 61b extend parallel to each other. In regard to the detection frame 61, the front surface 61a corresponds to the front plate surface, and the back surface 61b corresponds to the back plate surface.

The flow rate detection unit 22 is formed into a plate shape. A plate surface of the flow rate detection unit 22 opposite to the detection frame 61 is referred to as a front surface 22a, and a plate surface of the flow rate detection unit 22 opposite to the front surface 22a is referred to as a back surface 22b. Both the front surface 22a and the back surface 22b extend parallel to each other. In the sensor SA 50, the back surface 22b of the flow rate detection unit 22 is overlapped with the front surface 61a of the detection frame 61.

Returning to the description of FIGS. 6 and 7, opposite side ends of the substrate hole 69 are located at positions more to outside than both of the flow rate detection unit 22 and the flow rate processor 54 in the depth direction Z. In this case, the pair of connection frames 63 are not located at positions interposed between the flow rate detection unit 22 and the flow rate processor 54, but are located at positions shifted from the flow rate detection unit 22 and the flow rate processor 54 laterally in each of the width direction X and the depth direction Z.

The detection frame 61, the processor frame 62, and the substrate hole 69 are aligned in the height direction Y, and the center lines of the detection frame 61, the processor frame 62, and the substrate hole 69 coincide with a virtual axis extending in the height direction Y. In the depth direction Z, the flow rate detection unit 22 is located at the center position of the detection frame 61, and the flow rate processor 54 is located at the center position of the processor frame 62.

In the depth direction Z, the width dimension W1 of the detection frame 61 and the width dimension W2 of the processor frame 62 are the same. Further, the width dimension W3 of the flow rate detection unit 22 is smaller than the width dimension W4 of the flow rate processor 54, and the width dimension W5 of the substrate hole 69 is larger than the width dimensions W3 and W4. The width dimension W5 of the substrate hole 69 corresponds to a separation distance between the pair of connection frames 63.

The substrate hole 69 has the length dimension H1 in the height direction Y such that heat is unlikely to be transferred between the detection frame 61 and the processor frame 62. The detection frame 61 has a detection extension portion 68a extending so as to protrude toward the substrate hole 69 from the flow rate detection unit 22, and the processor frame 62 has a processor extension portion 68b extending so as to protrude toward the detection frame 61 from the flow rate processor 54. In this case, the length dimension H1 of the substrate hole 69 is larger than each of the extension dimension H2 of the detection extension portion 68a from the flow rate detection unit 22 and the extension dimension H3 of the processor extension portion 68b from the flow rate processor 54. Further, the length dimension H1 of the substrate hole 69 is larger than the sum of the extension dimensions H2 and H3. Further, in the height direction Y, the substrate hole 69 is arranged in the middle of the flow rate detection unit 22 and the flow rate processor 54, and the extension dimension H2 of the detection extension portion 68a and the extension dimension H3 of the processor extension portion 68b have almost the same value.

A part of each of the lead terminals 64 and 65 projects from the mold base end surface 55b to the outside of the molded part 55. The part of each of the lead terminals 64 and 65 projecting outside of the molded part 55 extends in the height direction Y from the mold base end surface 55b, and is connected to the connector terminal 28a in the internal space 24a of the housing main body 24. In this case, the back surface 53b of the SA substrate 53 includes the back surfaces of the lead terminals 64 and 65, and the back surfaces of the lead terminals 64 and 65 are in contact with the connector terminal 28a.

Of the lead terminals 64 and 65, the ground lead terminal 64 extends from the processor frame 62 and is electrically connected to the ground terminal in the sensor SA 50. In this case, the detection frame 61 and the connection frame 63 are both grounded via the processor frame 62. The ground lead terminal 64 corresponds to a support terminal.

The circuit lead terminal 65 is electrically connected to the flow rate processor 54 while being spaced from the processor frame 62 inside the molded part 55. A plurality of ground lead terminals 64 and a plurality of circuit lead terminals 65 are provided. The plurality of circuit lead terminals 65 include a power supply terminal of the sensor SA 50 that supplies electric power to the power supply terminal, and a signal terminal of the sensor SA 50 that outputs and receives a signal to and from the signal terminal.

The sensor SA 50 has a protection chip 71 that protects the flow rate processor 54 from noise. The protection chip 71 is a chip component having a protection circuit including a capacitor. The protection chip 71 is provided in a state of bridging the ground lead terminal 64 and the circuit lead terminal 65 inside the molded part 55.

The SA substrate 53 has protection frames 66 and 67 to which the protection chip 71 is attached. Of the protection frames 66 and 67, a ground protection frame 66 extends from the processor frame 62. A circuit protection frame 67 is electrically connected to the flow rate processor 54 while being spaced from the processor frame 62 inside the molded part 55. The protection chip 71 is provided in a state of bridging the ground protection frame 66 and the circuit protection frame 67 or the circuit lead terminal 65.

The flow rate processor 54 has a drive circuit such as a digital circuit (see FIG. 11) that performs various processes. The flow rate processor 54 is a rectangular parallelepiped chip component. The flow rate processor 54 may also be referred to as a circuit chip. The flow rate processor 54 is electrically connected to the flow rate detection unit 22, the circuit lead terminal 65, and the circuit protection frame 67 via bonding wires 72. The molded part 55 covers the protection chip 71 and the bonding wires 72, in addition to the flow rate detection unit 22 and the flow rate processor 54, so as to protect the flow rate detection unit 22, the flow rate processor 54, the protection chip 71 and the bonding wires 72. In this case, the molded part 55 may also be referred to as a protection body.

The molded part 55 is a molded resin of such as a polymer resin molded by a molding method, and has an electrical insulation property and a heat insulation property higher than those of the SA substrate 53. The molded part 55 integrally seals the flow rate processor 54, the protection chip 71, the bonding wire 72, and the like.

As shown in FIG. 8, the molded part 55 has a frame regulation portion 81 that regulates heat transfer from the processor frame 62 to the detection frame 61. The frame regulation portion 81 is a portion of the molded part 55 that is located in the substrate hole 69, and is in a state of being filled inside the substrate hole 69. Therefore, the frame regulation portion 81 has the same size and shape as the substrate hole 69. For example, in the depth direction Z, the width dimension of the frame regulation portion 81 is the same as the width dimension W5 of the substrate hole 69. The frame regulation portion 81 is arranged side by side with the connection frames 63 in the depth direction Z. In this case, the frame regulation portion 81 and the connection frames 63 are arranged side by side along the plate surface of the SA substrate 53. The frame regulation portion 81 corresponds to a heat transfer regulation portion.

When being electrically conducted and performing various processes, the flow rate processor 54 may generate heat. When this heat is transferred to the flow rate detection unit 22, it is concerned that detection accuracy of the flow rate detection unit 22 may degrade. In particular, when the power is turned on, such as when an ignition switch is turned on, the flow rate processor 54 begins to generate heat as the flow rate processor 54 starts to drive. In this case, since the flow rate processor 54 shifts from the state in which heat is not generated to the state in which heat is generated, the temperature increase of the flow rate processor 54 is likely to be large. Therefore, the detection value of the flow rate detection unit 22 may be likely to be unstable until the temperature of the flow rate detection unit 22 stabilizes at a temperature corresponding to the heat transmitted from the flow rate processor 54. As a result, the airflow meter 20 are likely to have poor activation characteristics when the power is turned on, and the responsiveness of the flow rate detection unit 22 is likely to decrease for a while after the power is turned on.

On the other hand, in the present embodiment, as described above, since the frame regulation portion 81 is provided in the entirety of the substrate hole 69, the frame regulation portion 81 restricts the heat of the flow rate processor 54 from transferring to the flow rate detection unit 22 via the SA substrate 53. Therefore, it is less likely that the activation characteristics of the air flow meter 20 will be deteriorated, and the responsiveness of the flow rate detection unit 22 will be deteriorated. Further, in addition to the frame regulation portion 81, the molded part 55 has a direct regulation portion 82 that is located between the flow rate processor 54 and the flow rate detection unit 22 in the height direction Y. The direct regulation portion 82 is a portion that regulates direct transfer of heat from the flow rate processor 54 to the flow rate detection unit 22 without passing through the SA substrate 53.

Figure 9:
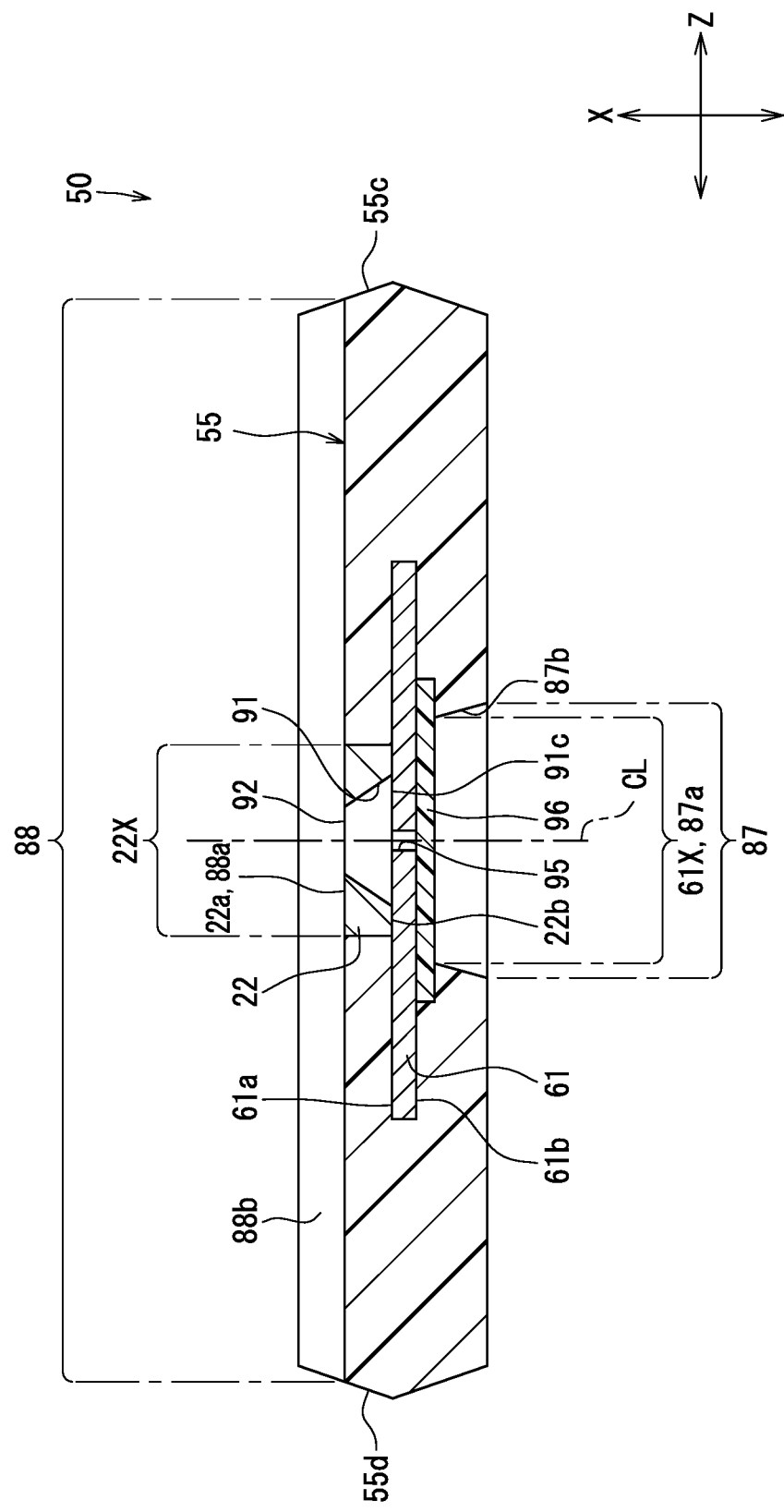
FIG. 9 is a cross-sectional view taken along line IX-IX in FIG. 7.
Figure 10:
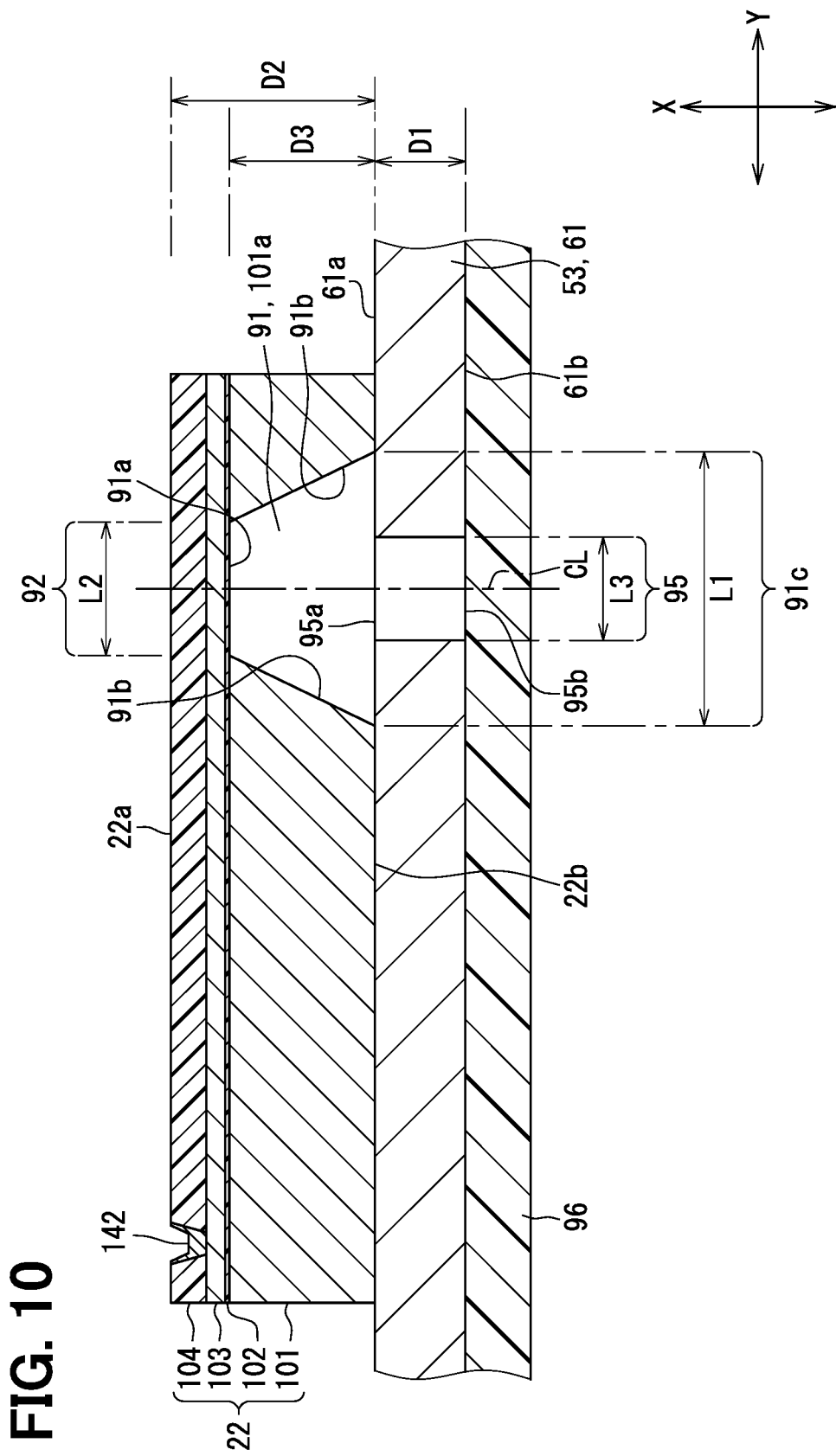
FIG. 10 is an enlarged view of the periphery of a flow rate detection unit in FIG. 8.

As shown in FIGS. 8 to 10, the flow rate detection unit 22 has a detection recess 91 formed by recessing the back surface 22b thereof and a membrane part 92 forming the bottom surface 91a of the detection recess 91. The detection recess 91 has a bottom surface 91a facing the detection frame 61 and an inner wall surface 91b extending from the bottom surface 91a toward the detection frame 61. The detection recess 91 has a recess opening 91c, which is an opening that allows an internal space of the detection recess 91 to open toward the side opposite to the bottom surface 91a, and the recess opening 91c is provided on the back surface 22b of the flow rate detection unit 22. The detection recess 91 is covered with the detection frame 61, and the bottom surface 91a faces the front surface 61a of the detection frame 61. The detection recess 91 corresponds to a recessed part. Further, the internal space of the detection recess 91 is hollow, and the detection recess 91 may also be referred to as a cavity or a gap.

The center line CL of the detection recess 91 extends in the width direction X and is orthogonal to the front surface 22a and the back surface 22b of the flow rate detection unit 22. The detection recess 91 is tapered off from the recess opening 91c toward the bottom surface 91a, and the inner wall surface 91b extends straight from the recess opening 91c toward the bottom surface 91a, so that the detection recess 91 has a tapered shape as a whole. The internal space of the detection recess 91 gradually becomes smaller toward the bottom surface 91a in the width direction X, and the detection recess 91 has a tapered shape as a whole. In this case, the cross-sectional area of the detection recess 91 in the direction orthogonal to the center line CL gradually increases from the bottom surface 91a toward the recess opening 91c. The inner wall surface 91b is not parallel to the center line CL, but is inclined with respect to the center line CL so as to face the recess opening 91c. The detection recess 91 has two pairs of inner wall surfaces 91b facing each other, so that the bottom surface 91a and the recess opening 91c have a rectangular shape. In the detection recess 91, the open area of the recess opening 91c is larger than the area of the bottom surface 91a.

An end of the inner wall surface 91b adjacent to the back surface 22b forms the peripheral edge portion of the recess opening 91c, and an end of the inner wall surface 91b adjacent to the front surface 22a forms the peripheral edge portion of the bottom surface 91a. As shown in FIG. 10, in the present embodiment, a separation distance between a pair of sides of the peripheral edge portion of the recess opening 91c facing each other is referred to as an opening dimension L1 of the recess opening 91c, and a separation distance between a pair of sides of the peripheral edge portion of the bottom surface 91a facing each other is referred to as a bottom surface dimension L2. The recess opening 91c and the bottom surface 91a each have a square shape. Thus, the opening dimension L1 and the bottom surface dimension L2 are each equal between the pair of sides arranged in the height direction Y and the pair of sides arranged in the depth direction Z. The opening dimension L1 of the recess opening 91c is larger than the bottom surface dimension L2 of the bottom surface 91a. In FIG. 10, the molded part 55 is not shown, and the membrane part 92 is shown thicker than its actual thickness.

The membrane part 92 is provided on the front side of the detection recess 91 in the width direction X, and is a film-like portion thinned by the detection recess 91 in the flow rate detection unit 22. The surface of the membrane part 92 is formed by the front surface 22a of the flow rate detection unit 22, and the back surface of the membrane part 92 is formed by the bottom surface 91a of the detection recess 91. In this case, the membrane part 92 is not arranged between the front surface 22a and the back surface 22b, but is arranged at the front surface 22a, in the flow rate detection unit 22. The membrane part 92 has a plurality of detection elements, and is a sensor unit that detects the flow rate of air in the flow rate detection unit 22.

In a plan view, the shape and size of the membrane part 92 are the same as the shape and size of the detection recess 91. Specifically, when a separation distance between the pair of sides facing each other in the peripheral edge portion of the membrane part 92 is referred to as a membrane dimension, the membrane dimension is the same as the bottom surface dimension L2. Further, the membrane part 92 has a square shape, similarly to the detection recess 91, and the membrane dimension is the same for each of the pair of sides arranged in the height direction Y and the pair of sides arranged in the depth direction Z.

The detection frame 61 is formed with a detection frame hole 95 communicating with the internal space of the detection recess 91 at a portion of the detection frame 61 that covers the recess opening 91c of the detection recess 91. The detection frame hole 95 is a through hole that passes through the detection frame 61 in the width direction X, and is a round hole having a circular cross section. The center line of the detection frame hole 95 coincides with the center line CL of the detection recess 91. The detection frame hole 95 has a front opening 95a which is an end portion on the front surface 61a. The recess opening 91c and the front opening 95a are included in the boundary between the detection recess 91 and the detection frame hole 95. The detection frame 61 corresponds to a portion covering the detection recess 91, the detection frame hole 95 corresponds to a communication hole, and the front opening 95a corresponds to a hole opening.

The peripheral edge portion of the front opening 95a is located at a position spaced apart from the peripheral edge portion of the recess opening 91c, toward an inner peripheral side, that is, toward the center line CL. In this case, the front opening 95a is smaller than the recess opening 91c. Specifically, the inner diameter L3 of the front opening 95a is smaller than the opening dimension L1 of the recess opening 91c. The inner diameter L3 of the front opening 95a is defined by a separation distance between portions of a peripheral edge of the front opening 95a facing each other at a shortest distance on opposite sides of the center line CL. The center of the front opening 95a is a portion through which the center line CL passes. Further, the width of the detection frame hole 95 is constant in the width direction X, and the inner diameter of the detection frame hole 95 is the same as the inner diameter L3 of the front opening 95a at any position in the width direction X.

Further, the peripheral edge portion of the front opening 95a is located at a position spaced apart, toward the inner peripheral side, from the peripheral edge portion of the bottom surface 91a of the detection recess 91. In this case, the front opening 95a is smaller than the bottom surface 91a. Specifically, the inner diameter L3 of the front opening 95a is smaller than the bottom surface dimension L2 of the bottom surface 91a.

In the case where the detection frame hole 95 is formed in the detection frame 61, it is assumed that burrs, which are unnecessary protrusions, may remain on the peripheral edge portion of the detection frame hole 95. For example, when the detection frame hole 95 is formed by punching or pressing, if the detection frame 61 is punched from the back surface 61b toward the front surface 61a, burrs extending from the front surface 61a may be generated on the peripheral edge portion of the front opening 95a. If these burrs come into contact with the back surface 22b of the flow rate detection unit 22, there is a concern that the flow rate detection unit 22 may be damaged or broken, and the detection accuracy of the flow rate detection unit 22 may decrease. On the other hand, in the present embodiment, since the peripheral edge portion of the front opening 95a is located at a position more to inside than the peripheral edge portion of the recess opening 91c, even if burrs remain on the peripheral edge portion of the front opening 95a, the burrs are present more to inside than the peripheral edge portion of the recess opening 91c. That is, the burrs exist in the internal space of the detection recess 91. Therefore, it is possible to restrict the burrs from coming into contact with the back surface 22*b* of the flow rate detection unit 22 and damaging or breaking the flow rate detection unit 22.

The sensor SA 50 has a filter unit 96 that covers the detection frame hole 95 on the back surface 61*b*. The filter unit 96 is a film-like ventilation filter such as a porous film that allows air to pass through, and is stacked on the back surface 61*b* of the detection frame 61. The filter unit 96 is a member that removes foreign particles such as dirt, dust, and the like from the air flowing into the detection frame hole 95 and the detection recess 91. The filter unit 96 is smaller than the back surface 61*b* of the detection frame 61, and is arranged at a position so that the filter unit 96 does not protrude outside from the back surface 61*b*. The detection frame hole 95 has a back opening 95*b* which is an end adjacent to the back surface 61*b*, and the back opening 95*b* is included in the boundary portion between the detection frame hole 95 and the filter unit 96.

As shown in FIGS. 8 and 9, the molded part 55 has a front cover portion 84 provided adjacent to the front surface 61*a* of the detection frame 61 and a back cover portion 85 provided adjacent to the back surface 61*b* of the detection frame 61. The front cover portion 84 covers the front surface 61*a* of the detection frame 61 together with the flow rate detection unit 22 from the front side in a state where the membrane part 92 of the flow rate detection unit 22 is exposed on the front side of the sensor SA 50. In this case, the front cover portion 84 is in a state of being overlapped with each of the front surface 61*a* of the detection frame 61 and the front surface 22*a* of the flow rate detection unit 22. The front cover portion 84 corresponds to a detection body portion.

The front surface 22*a* of the flow rate detection unit 22 has a front extension region 22X extending from the membrane part 92 toward the outer peripheral side. The front extension region 22X is an exposed region exposed on the front side of the sensor SA 50 around the membrane part 92 on the front surface 22*a* of the flow rate detection unit 22. In this case, the front surface 22*a* of the flow rate detection unit 22 is not entirely exposed on the front side of the sensor SA 50, but only the membrane part 92 and the front extension region 22X of the front surface 22*a* are exposed on the front side of the sensor SA 50. The front extension region 22X has an annular shape entirely along the peripheral edge portion of the membrane part 92 between the membrane part 92 and the front cover portion 84.

Figure 4:
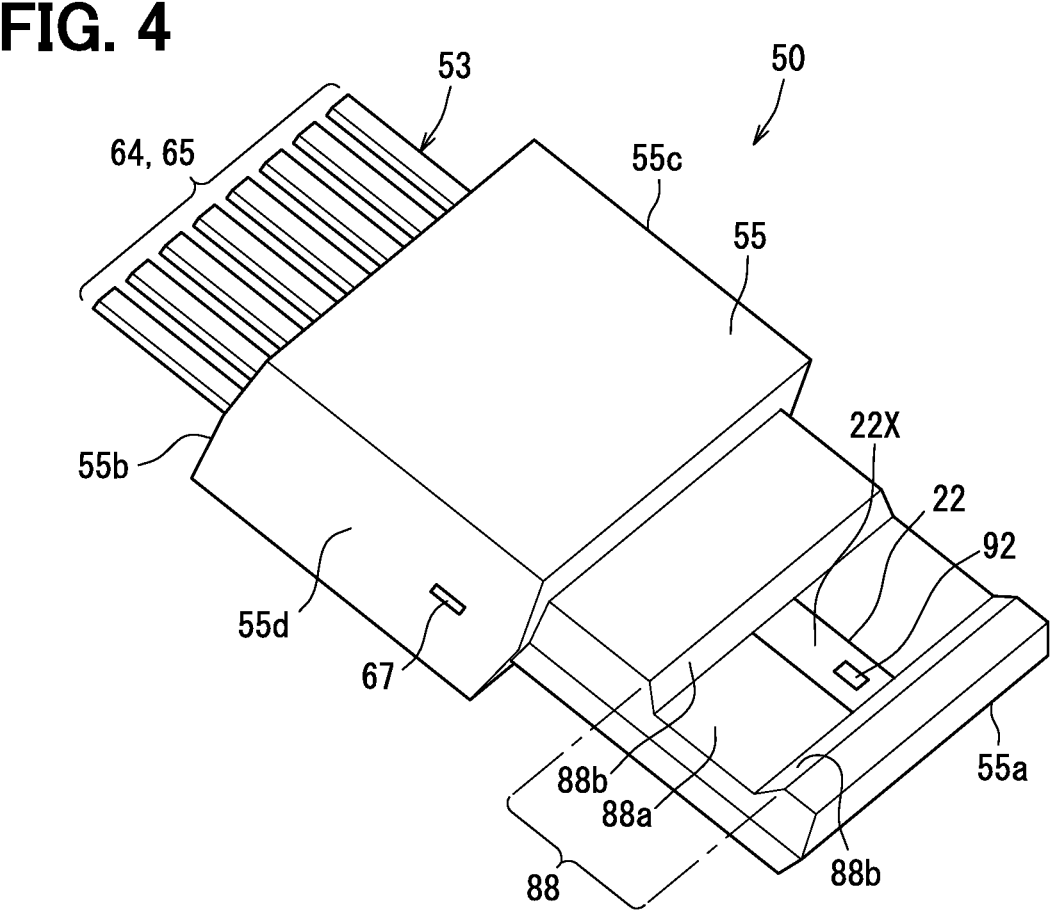
FIG. 4 is a perspective view of a sensor SA when viewed from a front side.

In the molded part 55, the front cover portion 84 is partly thinned, so that the membrane part 92 and the front extension region 22X are not covered by the front cover portion 84. Specifically, as shown in FIGS. 4 and 8, the molded part 55 is provided with a groove-shaped front mold groove 88 extending in the depth direction Z. The front mold groove 88 is a groove formed by depressing the surface of the molded part 55, and extends over between the mold upstream surface 55*c* and the mold downstream surface 55*d*. The front mold groove 88 has the depth such that the front surface 22*a* of the flow rate detection unit 22 is exposed but the front surface 61*a* of the detection frame 61 is not exposed, and the front surface 22*a* of the flow rate detection unit 22 is included in the bottom surface 88*a* of the front mold groove 88. That is, the membrane part 92 and the front extension region 22X are exposed at the bottom surface 88*a* of the front mold groove 88.

The internal space of the front mold groove 88 in the width direction X gradually reduces toward the bottom surface 88*a*. The inner peripheral surface of the front mold groove 88 has a pair of inner wall surfaces 88*b* facing each other on opposite sides of the bottom surface 88*a*. These inner wall surfaces 88*b* are inclined with respect to the width direction X so as to face the side opposite to the flow rate detection unit 22, and are tapered surfaces extending straight from the bottom surface 88*a*. The front extension region 22X is in a state of extending between the pair of inner wall surfaces 88*b*.

In the front mold groove 88, the flow rate detection unit 22 is located at an intermediate position in the depth direction Z. That is, the flow rate detection unit 22 is located between the mold upstream surface 55*c* and the mold downstream surface 55*d*. Further, the sensor SA 50 is installed with respect to the measurement flow path 32 so that the front mold groove 88 extends in the air flow direction in the measurement flow path 32. Therefore, the air flowing through the measurement flow path 32 is rectified by the inner surfaces of the front mold groove 88 by the time the air reaches the flow rate detection unit 22. Therefore, it is possible to suppress the detection accuracy of the flow rate detection unit 22 from being degraded due to the turbulence of the air flow.

The back cover portion 85 covers the back surface 61*b* of the detection frame 61 together with the filter unit 96 from the back side in a state where a part of the filter unit 96 is exposed on the back side of the sensor SA 50. In this case, the back cover portion 85 is in a state of being overlapped on the back surface 61*b* of the detection frame 61 and the back surface of the filter unit 96, respectively. The portion of the filter unit 96 exposed on the back side of the sensor SA 50 includes a portion overlapping the back opening 95*b* of the detection frame hole 95, and the detection frame hole 95 is open on the back side of the sensor SA 50 via the filter unit 96. The back cover portion 85 corresponds to a support body portion.

In the present embodiment, although the detection frame hole 95 is covered by the filter unit 96, the detection frame hole 95 is not covered by the back cover portion 85. This state of the detection frame hole 95 is referred to as "a state in which the detection frame hole 95 is exposed". This also applies to a back extension region 61X, which will be described later. Although the back extension region 61X is covered by the filter unit 96, the back extension region 61X is not covered by the back cover portion 85. This state of the back extension region 61X is referred to as "a state in which the back extension region 61X is exposed".

The back surface 61*b* of the detection frame 61 has a back extension region 61X extending from the back opening 95*b* toward the outer peripheral side. The back extension region 61X is an exposed region of the back surface 61*b* of the detection frame 61 that is exposed on the back side of the sensor SA 50 around the back opening 95*b* of the detection frame hole 95. In this case, the back surface 61*b* of the detection frame 61 is not entirely exposed on the back side of the sensor SA 50, but only the detection frame hole 95 and the back extension area 61X of the back surface 61*b* are exposed on the back surface of the sensor SA 50. The back extension region 61X has an annular shape entirely along the peripheral edge portion of the back opening 95*b* between the back opening 95*b* and the back cover portion 85 of the detection frame hole 95.

As shown in FIGS. 5 and 8, in the molded part 55, since the back cover portion 85 is formed with a back mold hole 87, the detection frame hole 95 and the back extension region 61X are not covered by the back cover portion 85. The back mold hole 87 passes through the back cover portion 85 in the width direction X, and is a round hole larger than the detection frame hole 95. The back mold hole 87 has a front end 87*a* as an end adjacent to the detection frame 61, and the peripheral edge portion of the front end 87*a* is spaced apart, toward an outer peripheral side, from the back opening 95*b* of the detection frame hole 95. As a result, a back extension region 61X is formed between the peripheral edge portion of the front end 87*a* and the back opening 95*b*. In this case, the inner diameter L4 of the front end 87*a* is larger than the inner diameter of the back opening 95*b*. In the detection frame hole 95, the inner diameter of the back opening 95*b* is the same as the inner diameter L3 of the front opening 95*a*. The back mold hole 87 corresponds to an exposing hole that exposes the detection frame hole 95 and the back extension region 61X, and to a heat radiation hole that discharges the heat of the detection frame 61 to the outside.

Further, the peripheral edge portion of the front end 87*a* is spaced apart, toward the outer peripheral side, from both the bottom surface 91*a* of the detection recess 91 and the recess opening 91*c*. In this case, the inner diameter L4 of the front end 87*a* is larger than the bottom surface dimension L2 of the bottom surface 91*a* (see FIG. 10) and the opening dimension L1 of the recess opening 91*c* (see FIG. 10).

The front extension region 22X of the flow rate detection unit 22 and the back extension region 61X of the detection frame 61 are aligned in the width direction X. In this case, at least a part of the front extension region 22X and a part of the back extension region 61X overlap each other in the width direction X, and the overlapping parts make one round about the center line CL so as to have a ring shape.

The back mold hole 87 is smaller than each of the detection frame 61 and the filter unit 96. The molded part 55 covers the peripheral portions of the detection frame 61 and the filter unit 96. In this case, the molded part 55 restricts the filter unit 96 from peeling off from the detection frame 61.

The size of the back mold hole 87 gradually reduces in the width direction X toward the detection frame 61. That is, the size of the back mold hole 87 gradually increases from the front end 87*a* toward the back end. The inner peripheral surface 87*b* of the back mold hole 87 is inclined with respect to the width direction X so as to face the side opposite to the detection frame 61, and is a tapered surface extending straight from the front end 87*a*.

As shown in FIG. 10, the flow rate detection unit 22 includes a detection base material 101 which is a plate-shaped base material, an insulation film 102 having an insulating property, a resistor 103 having a plurality of resistance elements, and a protection film 104 that protects the resistor 103. The detection base material 101 is formed of a semiconductor material such as silicon, and has a plate shape. The insulation film 102 is overlaid on one plate surface of the detection base material 101, the resistor 103 is overlaid on the insulation film 102, and the protection film 104 is overlaid on the resistor 103. The insulation film 102, the resistor 103 and the protection film 104 provide the membrane part 92.

The flow rate detection unit 22 has a base material hole 101*a* that passes through the detection base material 101 in the width direction X. In the flow rate detection unit 22, the detection recess 91 is formed by covering the base material hole 101*a* with the insulation film 102, the resistor 103, and the protection film 104. Further, the portions of the insulation film 102, the resistor 103, and the protection film 104 that cover the base material hole 101*a* provide the membrane part 92.

In the flow rate detection unit 22, the base material hole 101*a* is formed by processing a part of the detection base material 101 by wet etching. That is, the detection recess 91 and the membrane part 92 are formed by wet etching. The detection recess 91 that has the inner wall surface 91*b* inclined only by a predetermined inclination angle (for example, 54.7 degrees) relative to the center line CL due to the crystal plane orientation of the silicon is formed by the wet etching. The base material hole 101*a* may be formed by performing a dry etching process on the detection base material 101.

The detection frame hole 95 has a size that does not excessively increase the difficulty of the work load for forming the detection frame hole 95. Specifically, the opening dimension L1 of the front opening 95*a* is larger than the thickness dimension D1 of the detection frame 61 in the width direction X. On the other hand, the opening dimension L1 is smaller than the thickness dimension D2 of the flow rate detection unit 22 in the width direction X. Further, the opening dimension L1 is smaller than the thickness dimension D3 of the detection base material 101 in the width direction X.

Next, the electrical configuration of the sensor SA 50 will be described with reference to FIGS. 11 to 13 and the like. The sensor SA 50 has a flow rate detection circuit 110 that detects the flow rate of air, and the flow rate detection circuit 110 provides a thermal-type flow rate detection unit 22.

Figure 11:
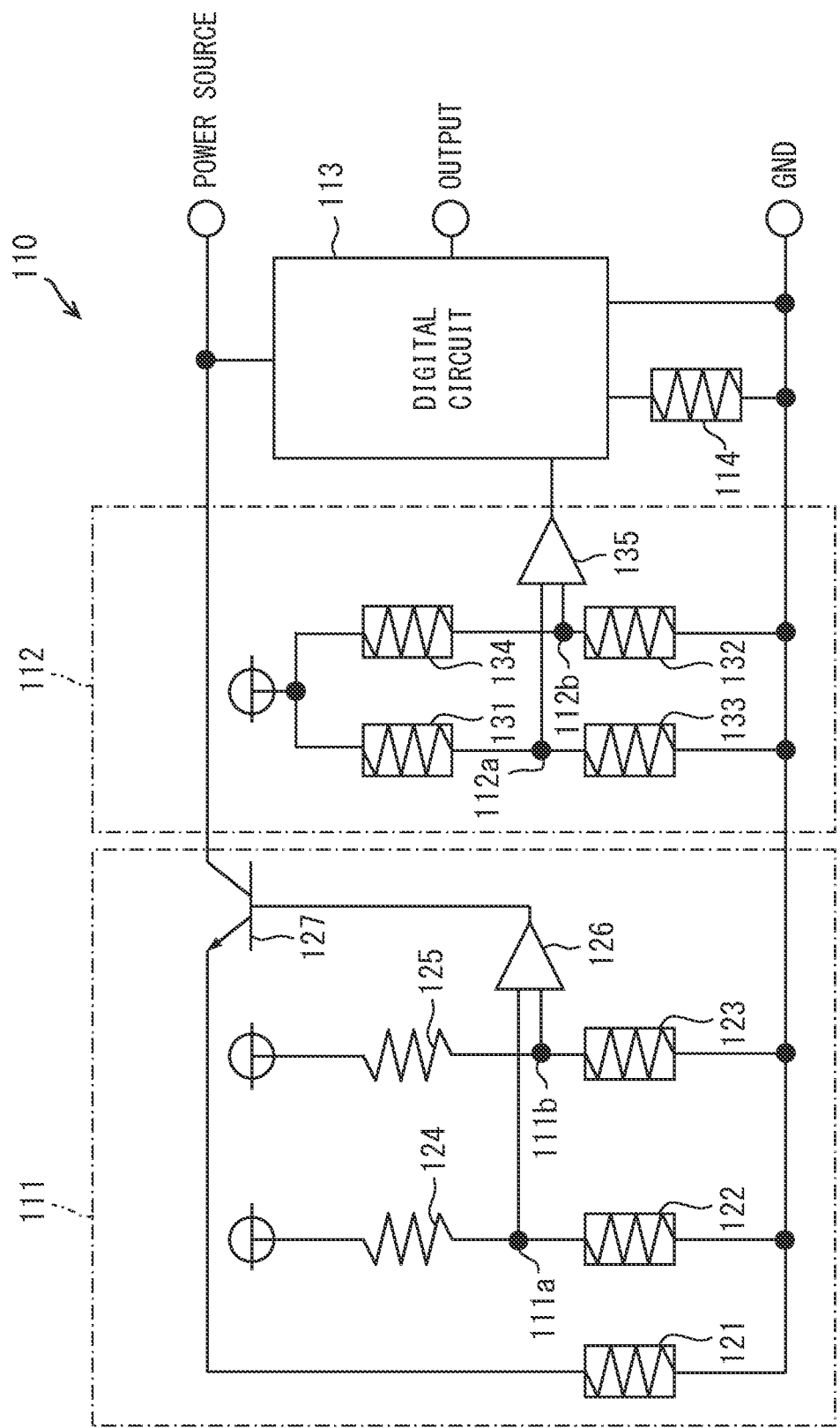
FIG. 11 is a circuit diagram showing a configuration of a flow rate detection circuit.

As shown in FIG. 11, the flow rate detection circuit 110 includes a heater control bridge 111 that controls the heater temperature, a flow rate detection bridge 112 that detects the flow rate according to the temperature of the air, and a digital circuit 113 that performs various processes. The heater control bridge 111, the flow rate detection bridge 112, and the digital circuit 113 each include a plurality of circuit elements such as resistance elements and switching elements. These circuit elements correspond to detection elements for detecting the physical quantity of the fluid.

The heater control bridge 111 is connected to a power supply terminal and a ground terminal in the flow rate detection circuit 110. The heater control bridge 111 includes a heater resistor 121 that generates heat when energized, a heater temperature resistor 122 that detects the temperature of the heater resistor 121, and a first air temperature resistor 123 that detects the temperature of the air flowing through the measurement flow path 32. Further, the heater control bridge 111 has a first control resistor 124 connected in series with the heater temperature resistor 122 and a second control resistor 125 connected in series with the first air temperature resistor 123.

The heater control bridge 111 includes an operational amplifier 126 as a comparison element for comparing potentials and a transistor 127 as a switching element for opening and closing an electrical conduction path. The operational amplifier 126 is connected to a first connection point 111*a* between the heater temperature resistor 122 and the first control resistor 124, and is also connected to a connection point 111*b* between the second air temperature resistor 123 and the second control resistor 125. The operational amplifier 126 is a comparison unit that compares the potential of the first connection point 111*a* with the potential of the second connection point 111*b*. The transistor 127 is connected to the output terminal of the operational amplifier 126, and operates according to the output of the operational amplifier 126. In the heater control bridge 111, the transistor 127 operates so that the temperature of the heater resistor 121 becomes a target temperature higher than the temperature of the air by a predetermined temperature.

In the heater control bridge 111, when the temperature of the heater resistor 121 is lower than the target temperature, the resistance value of the heater temperature resistor 122 becomes smaller and the potential difference between the connection points 111a and 111b becomes larger, so that the operational amplifier 126 controls the transistor 127 to turn on. In this case, the temperature of the heater resistor 121 rises as the heater resistor 121 is electrically conducted. When the temperature of the heater resistor 121 rises to the target temperature, the resistance value of the heater temperature resistor 122 increases and the potential difference between the connection points 111a and 111b decreases, so that the operational amplifier 126 controls the transistor 127 to turn off. In this case, the temperature of the heater resistor 121 is lowered by stopping the electrical conduction to the heater resistor 121. In this way, in the heater control bridge 111, the temperature of the heater resistor 121 is maintained at the target temperature.

The flow rate detection bridge 112 is connected to the signal terminal and the ground terminal in the flow rate detection circuit 110. The flow rate detection bridge 112 has upstream resistors 131 and 132 that detect the air temperature on the upstream side of the heater resistor 121 in the measurement flow path 32, and downstream resistors 133 and 134 that detect the air temperature on the downstream side of the heater resistor 121 in the measurement flow path 32. The upstream resistors 131 and 132 and the downstream resistors 133 and 134 are connected in series one by one. In this case, the first upstream resistor 131 is connected to the ground terminal via the first downstream resistor 133, and the second downstream resistor 134 is connected to the ground terminal via the second upstream resistor 132.

The flow rate detection bridge 112 has an operational amplifier 135 as a comparison element for comparing potentials. The operational amplifier 135 is connected to a first connection point 112a between the first upstream resistor 131 and the first downstream resistor 133, and is also connected to a connection point 112b between the second upstream resistor 132 and the second downstream resistor 134. The operational amplifier 135 is a comparison unit that compares the potential of the first connection point 112a with the potential of the second connection point 112b. The output terminal of the operational amplifier 135 is connected to the digital circuit 113, and the comparison result of the potentials of the connection points 112a and 112b is provided to the digital circuit 113.

When there is no air flow caused in the measurement flow path 32, in the flow rate detection bridge 112, the heat of the heater resistor 121 is transferred similarly to both the upstream and downstream, and thus the resistance values of the upstream resistors 131 and 132 and the resistance values of the downstream resistors 133, 134 have almost the same resistance value. In this case, since the potential difference between the connection points 112a and 112b is small, the comparison result of the operational amplifier 135 is provided to the digital circuit 113.

When a forward flow of air from the measurement inlet 35 to the measurement outlet 36 occurs in the measurement flow path 32, the heat of the heater resistor 121 in the flow rate detection bridge 112 is transferred more to the downstream resistors 133 and 134 than to the upstream resistors 131 and 132 because the forward flow serves as a medium. In this case, the potential difference between the connection points 112a and 112b becomes a value according to both the air direction of the forward flow and the air flow rate, and this value is provided to the digital circuit 113 as the comparison result of the operational amplifier 135.

On the other hand, when a backflow, which is opposite to the forward flow, occurs in the measurement flow path 32, the heat of the heater resistor 121 is transferred more to the upstream resistors 131 and 132 than the downstream resistors 133 and 134 because the backflow serves as a medium. In this case, the potential difference between the connection points 112a and 112b becomes a value according to both the air direction of backflow and the air flow rate, and this value is provided to the digital circuit 113 as the comparison result of the operational amplifier 135.

The flow rate detection circuit 110 has a second air temperature resistor 114 that detects the temperature of the air flowing through the measurement flow path 32, and the second air temperature resistor 114 is connected to the digital circuit 113. The digital circuit 113 calculates the flow rate of air flowing through the measurement flow path 32 and the intake passage 12 by using the comparison result of the operational amplifier 135 and the potential of the second air temperature resistor 114, and outputs the information including the calculation result to the output terminal.

Detection elements such as a heater resistor 121 included in the flow rate detection circuit 110 are included in the flow rate detection unit 22 and the flow rate processor 54. For example, the flow rate detection unit 22 includes resistors 114, 121 to 125, 131 to 134 and connection points 111a, 111b, 112a, 112b. In the flow rate detection unit 22, the resistor 103 includes the plurality of resistors 114, 121 to 125, 131 to 134 as a plurality of resistance elements. The flow rate processor 54 includes the digital circuit 113, the operational amplifiers 126 and 135, and the transistor 127.

As described above, since the digital circuit 113 has a large number of circuit elements, it is considered that heat is likely to be generated when the digital circuit 113 is driven to perform various processes. Further, it is considered that the operational amplifiers 126 and 135 and the transistor 127 are also likely to generate heat when operated. Therefore, it is assumed that the flow rate processor 54 having the digital circuit 113, the operational amplifiers 126, 135, and the transistor 127 generates heat when processing the detection result received from the flow rate detection unit 22.

Figure 12:
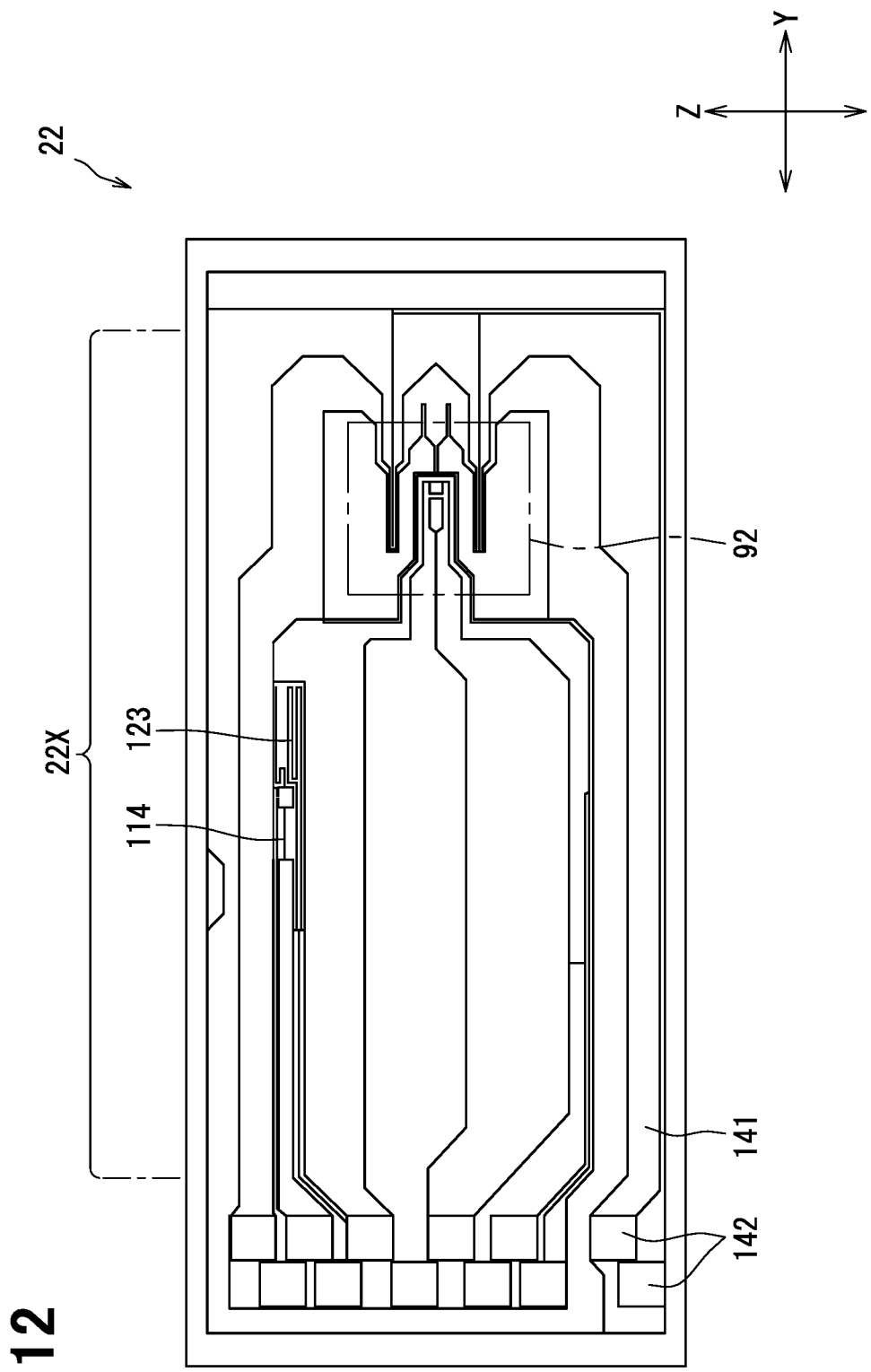
FIG. 12 is a plan view for showing the positional relationship between an air temperature resistance and a membrane in the flow rate detection unit.
Figure 13:
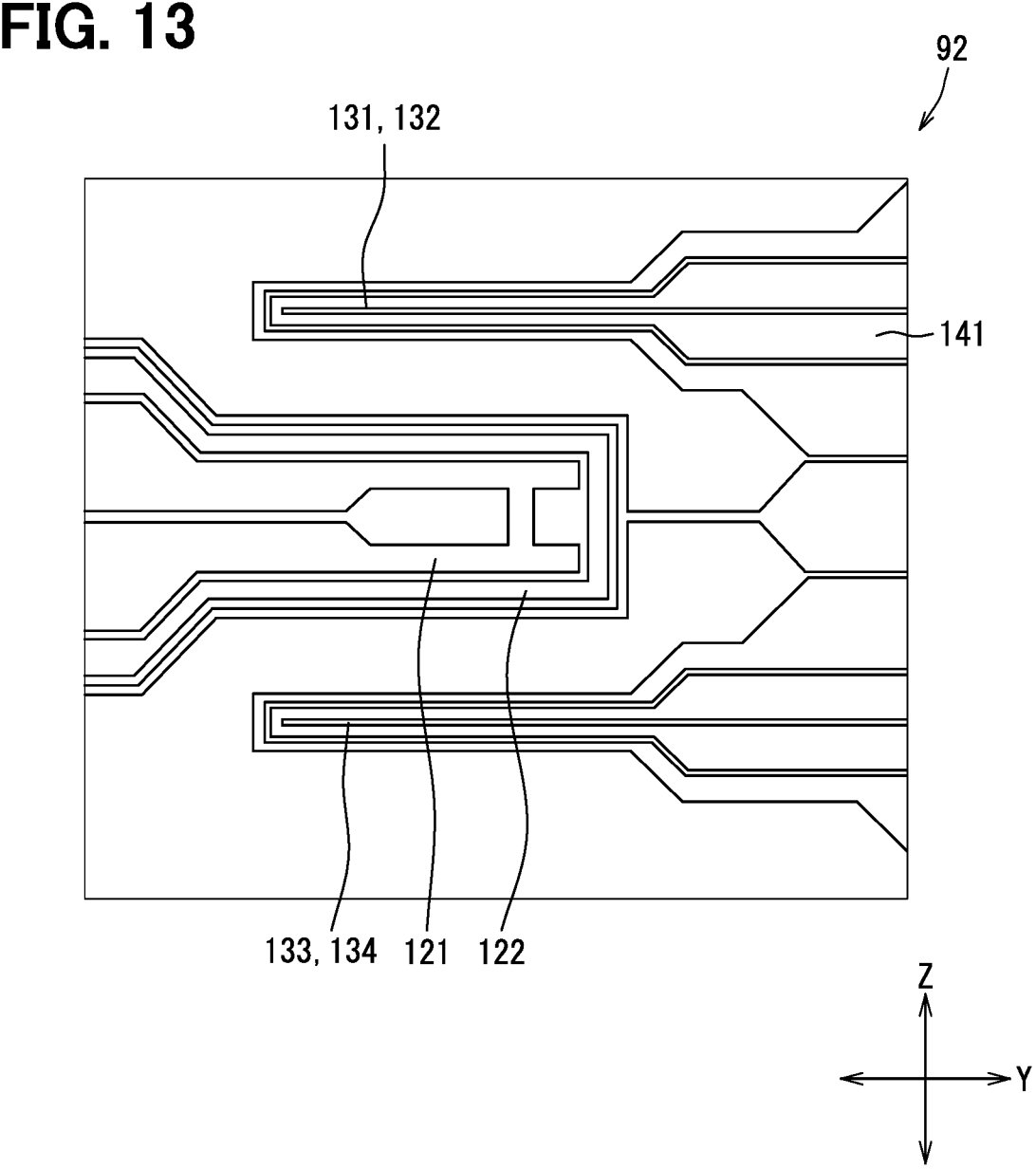
FIG. 13 is an enlarged view of the periphery of the membrane in FIG. 12.

As shown in FIGS. 12 and 13, the flow rate detection unit 22 includes the plurality of resistance elements such as the heater resistor 121, wiring patterns 141 connected to these resistance elements, and a plurality of electrodes 142 connected to the wiring patterns 141. The plurality of resistance elements are provided in at least either one of the membrane part 92 or the front extension region 22X in the flow rate detection unit 22.

As shown in FIG. 13, the membrane part 92 is provided with the heater resistor 121, the heater temperature resistor 122, the upstream resistors 131 and 132, and the downstream resistors 133 and 134. The heater resistor 121 is arranged at the center or a position close to the center of the membrane part 92, and the heater temperature resistor 122 is arranged at a position close to the heater resistor 121. The heater temperature resistor 122 is an indirectly heated resistor that detects the temperature of the heater resistor 121 and disposed beside the heater resistor 121. The upstream resistors 131 and 132 are arranged adjacent to the mold upstream surface 55c than the heater resistor 121 in the depth direction Z, and the downstream resistors 133 and 134 are arranged adjacent to the mold downstream surface 55d than the heater resistor 121. In this case, the heater resistor 121 is arranged between the upstream resistors 131 and 132 and the downstream resistors 133 and 134 in the depth direction Z.

Since the membrane part 92 is thinned as described above, heat is less likely to transfer through the membrane part 92. Therefore, when heat is generated by the heater resistor 121, it is less likely that the heat will transfer to the upstream resistors 131 and 132 and the downstream resistors 133 and 134 via the constituent parts of the flow rate detection unit 22, such as the detection base material 101. In this case, the resistance values of the upstream resistors 131 and 132 and the downstream resistors 133 and 134 do not change due to the heat transferred through the constituent parts of the flow rate detection unit 22, but change due to the heat transmitted through the air. Therefore, it is possible to suppress the degradation of the detection accuracy of the flow rate detection unit 22 due to the heat of the heater resistor 121.

As described above, since the internal space of the detection recess 91 is open to the outside of the sensor SA 50 through the detection frame hole 95 and the back mold hole 87, it is less likely that the membrane part 92 will be deformed due to the pressure difference between the inside and the outside of the detection recess 91. If the membrane part 92 is deformed, the positional relationship between the heater resistor 121 and the upstream resistors 131, 132 or the positional relationship between the heater resistor 121 and the downstream resistors 133, 134 changes, and the relationship between the air flow rate and the resistance values of the resistors 131 to 134 changes. As a result, the detection accuracy of the flow rate detection unit 22 may degrade. In the present embodiment, on the other hand, since the membrane part 92 is unlikely to be deformed, the positional relationship between the heater resistor 121 and the resistors 131 to 134 and the relationship between the air flow rate and the resistance values of the resistors 131 to 134 do not easily change. As a result, the detection accuracy of the flow rate detection unit 22 can be improved.

As shown in FIG. 12, the air temperature resistors 114 and 123 are arranged in the front extension region 22X. The air temperature resistors 114 and 123 are sufficiently spaced apart from the heater resistor 121 as being arranged in the front extension region 22X. Therefore, the air temperature resistors 114 and 123 can accurately detect the temperature of the air flowing through the measurement flow path 32 regardless of the heat generated by the heater resistor 121.

In the present embodiment, the air temperature resistors 114 and 123 are arranged between the membrane part 92 and the flow rate processor 54 in the height direction Y, and the heat generated by the flow rate processor 54 is more easily transferred to the temperature resistors 114 and 123 than to the membrane part 92. If the heat generated by the flow rate processor 54 is transmitted to the flow rate detection unit 22, there is a concern that the temperature of the air temperature resistors 114 and 123 may rise in the front extension region 22X regardless of the flow rate and temperature of the air. In this case, the accuracy for detecting the air flow rate by the flow rate detection circuit 110 may be degraded. For example, when the temperature of the first air temperature resistor 123 rises, the potential of the second connection point 111b in the heater control bridge 111 changes, and hence the temperature of the heater resistor 121 may deviate from the target temperature. Further, when the temperature of the second air temperature resistor 114 rises, the calculation result of the air flow rate output from the digital circuit 113 may change. In the present embodiment, on the other hand, since the frame regulation portion 81 is provided, heat transfer from the flow rate processor 54 to the air temperature resistors 114 and 123 are restricted, and hence the detection accuracy of the flow rate detection circuit 110 is less likely to decrease.

Although not shown, the control resistors 124 and 125 are also arranged at positions sufficiently spaced apart from the heater resistor 121 in the flow rate detection unit 22. In this case, since the resistance values of the control resistors 124 and 125 are not easily changed with the heat generated by the heater resistor 121, it is possible to suppress the degradation of accuracy of temperature control of the heater resistor 121 by the heater control bridge 111. The control resistors 124 and 125 are arranged in the front extension region 22X, similarly to the air temperature resistors 114 and 123, for example.

Bonding wires 72 are respectively connected to the plurality of electrodes 142. These electrode 142 are arranged at positions covered by the molded part 55 in the flow rate detection unit 22, whereby the bonding wires 72 are protected by the molded part 55. In this case, each of the electrodes 142 is arranged at a position different from the membrane part 92 and the front extension region 22X in the flow rate detection unit 22.

As a method for manufacturing the air flow meter 20, a method for manufacturing the sensor SA 50 will be described with reference to FIGS. 14 to 24 and the like. The method for manufacturing the airflow meter 20 corresponds to a method for manufacturing a physical quantity measurement device.

First, a step of producing the flow rate detection unit 22 is performed. In this step, the insulation film 102, the resistor 103, and the protection film 104 are formed on the detection base material 101, and the base material hole 101a is formed in the detection base material 101 by wet etching, thereby to form the detection recess 91. Further, the electrodes 142 are formed. Thus, the flow rate detection unit 22 is produced.

Figure 14:
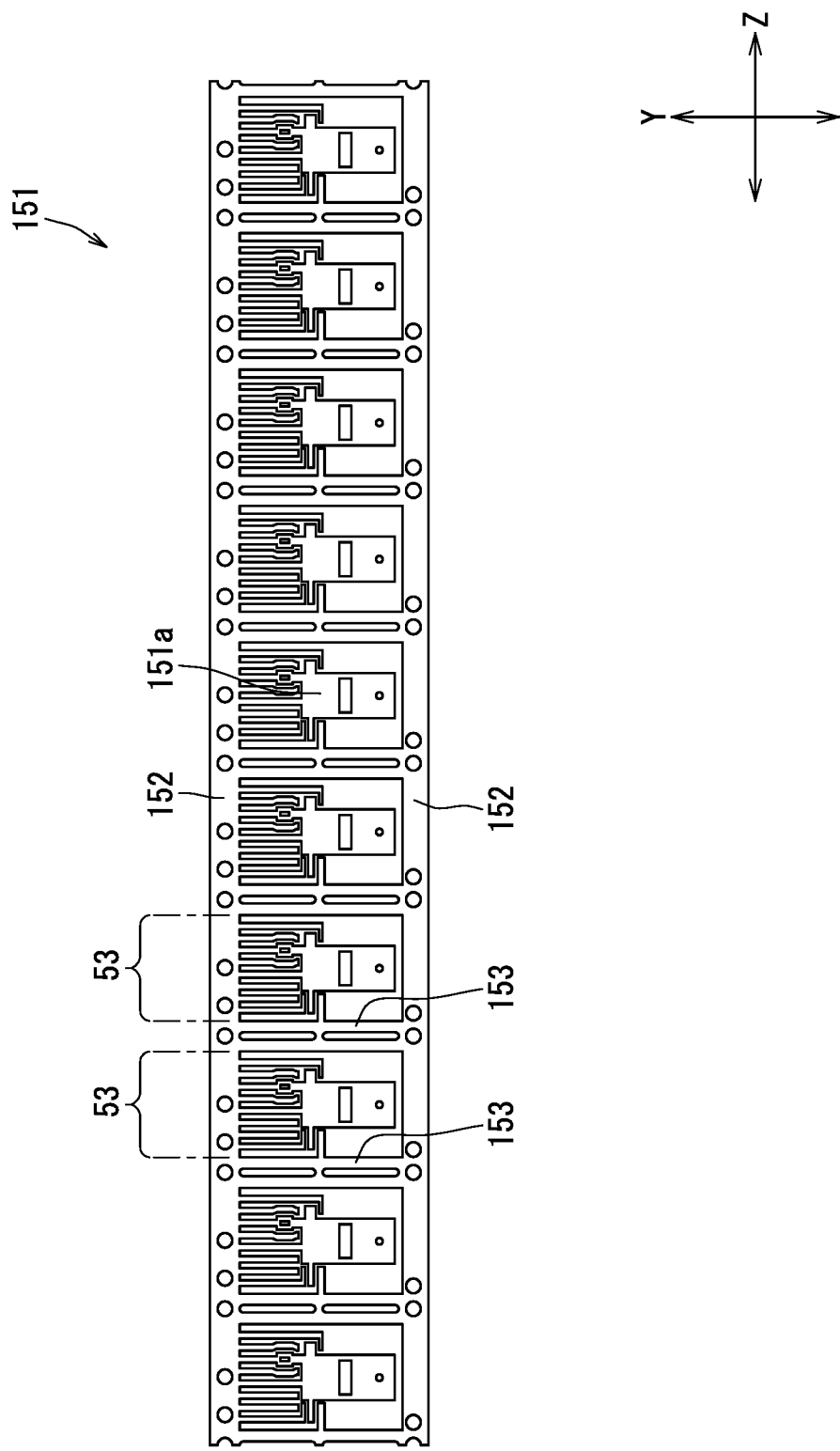
FIG. 14 is a plan view of a base material formed.
Figure 15:
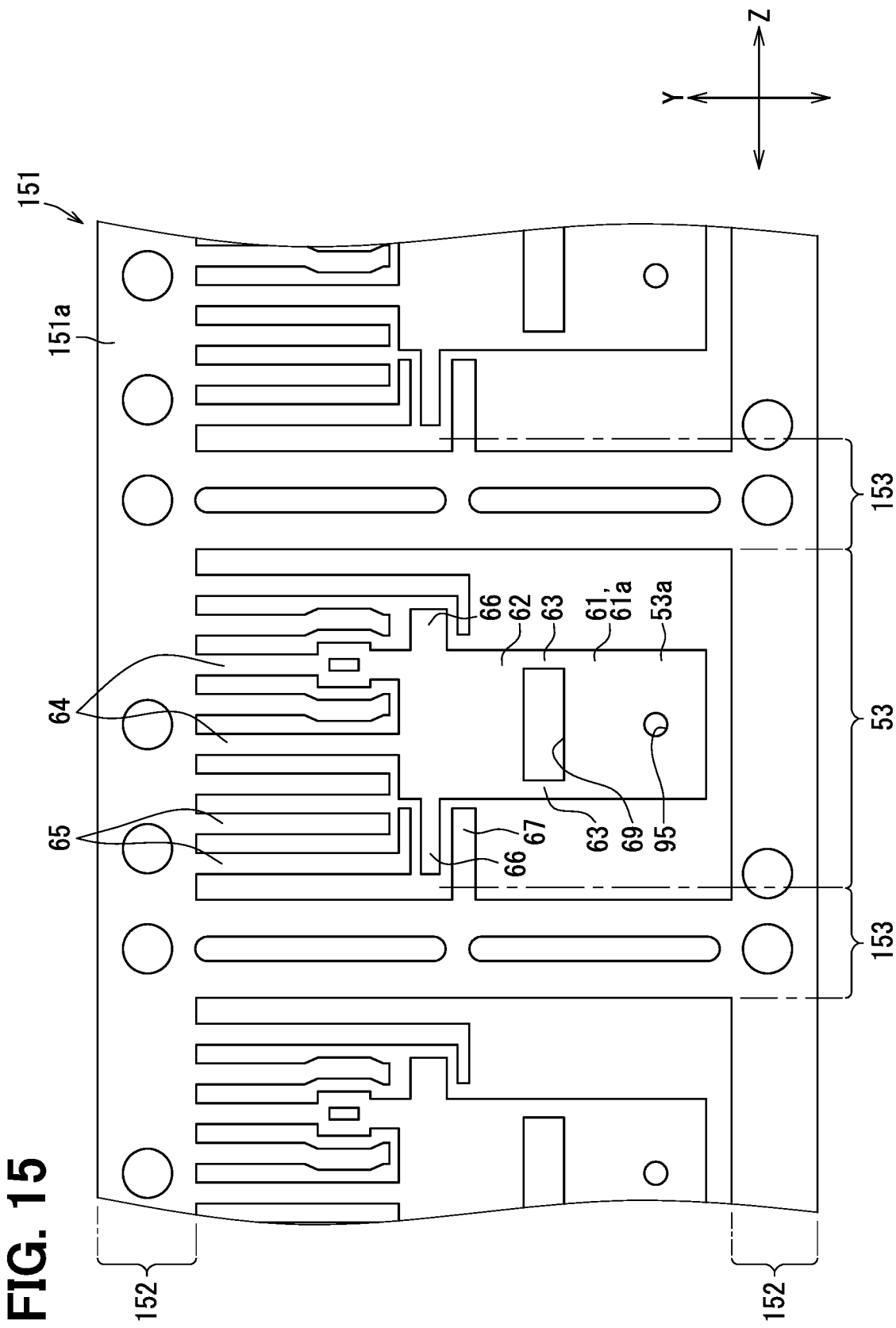
FIG. 15 is an enlarged view of the periphery of a SA substrate in FIG. 14.

Further, a step of forming the base material 151 is performed. In this step, as shown in FIGS. 14 and 15, the base material 151 having a plurality of SA substrates 53 is formed by performing punching or pressing to the conductive plate material. In the punching, the plate material is punched by applying a tool such as a punching tool from one plate surface of the plate material toward the other plate surface. In the base material 151, the plate surface from which the tool is extruded out is referred to as a punched surface 151a, and the plate surface against which the tool is pressed for punching is referred to as a punching surface 151b (see FIG. 18). In this case, in view of the direction in which the plate material is punched, it is considered that burrs caused by the punching process tend to remain on the punched surface 151a of the base material 151 and hardly remain on the punching surface 151b. In the SA substrate 53, the front surface 53a is included in the punched surface 151a, and the back surface 53b is included in the punching surface 151b. Therefore, on the front surface 53a of the SA substrate 53, the burrs are likely to remain on the peripheral edge portion of the front opening 95a of the detection frame hole 95 and the peripheral edge portions of the lead terminals 64 and 65.

The base material 151 has a pair of bridging leads 152 bridging over the plurality of SA substrates 53, and connecting leads 153 connecting between the pair of bridging leads 152. In the SA substrate 53, the lead terminals 64 and 65 are in a state of being connected to the bridging lead 152, and the circuit protection frame 67 is in a state of being connected to the connecting lead 153. In this case, the detection frame 61 and the connection frame 63 are connected to the bridging lead 152 via the ground lead terminals 64. Therefore, it is not necessary to provide the base material 151 with hanging leads for connecting the detection frame 61 and the connection frame 63 to the bridging lead 152 and the connecting lead 153.

As shown in FIG. 16, when the illustrations of the bridging lead 152 and the connecting lead 153 are omitted from the base material 151, in the SA substrate 53 at the stage where the base material 151 is formed, the ground lead terminals 64 and the like are spaced apart from the detection frame 61 and the like.

Figure 17:
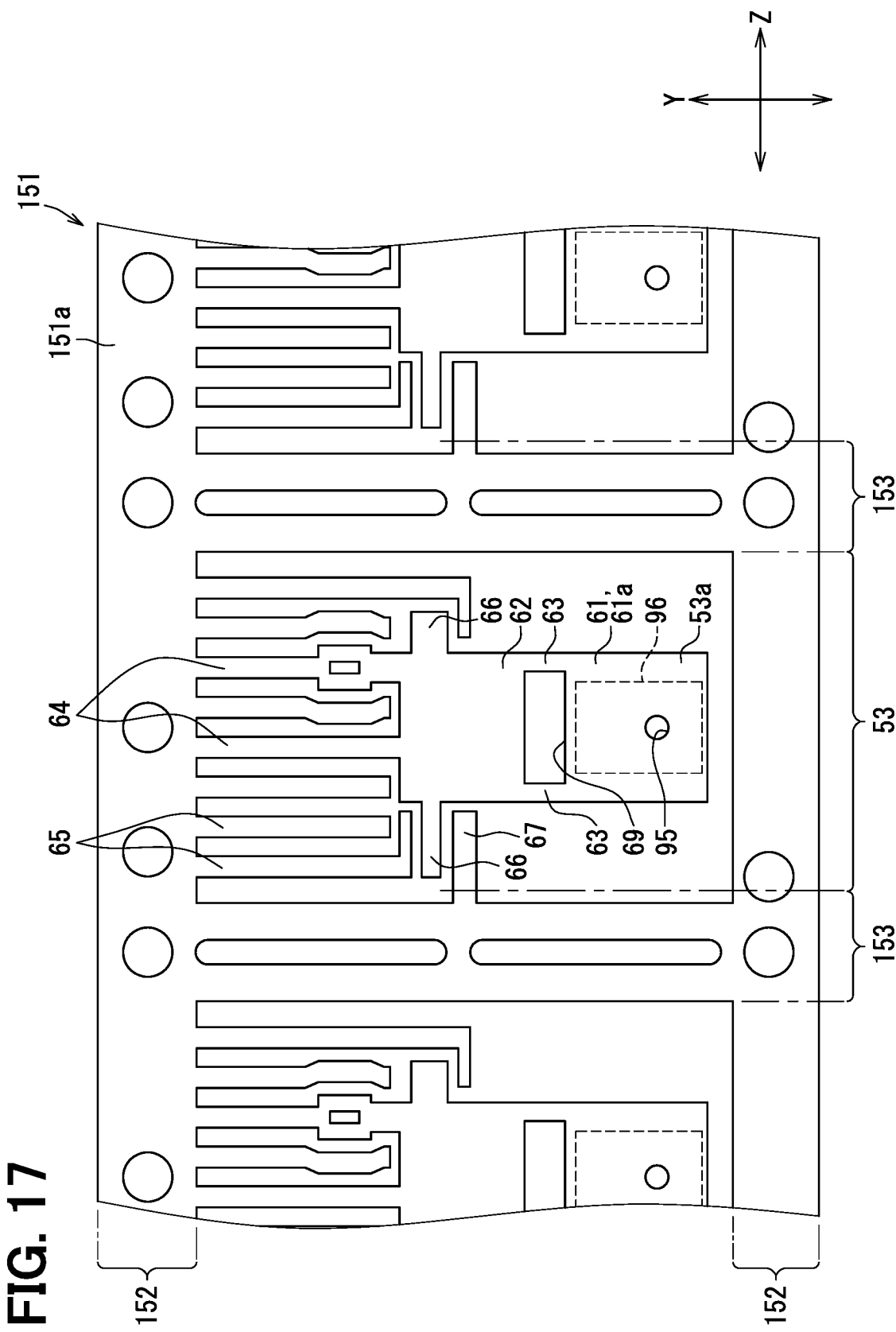
FIG. 17 is a plan view of a base material, in a state where a filter unit is attached to the SA substrate, when viewed from the front side.
Figure 18:
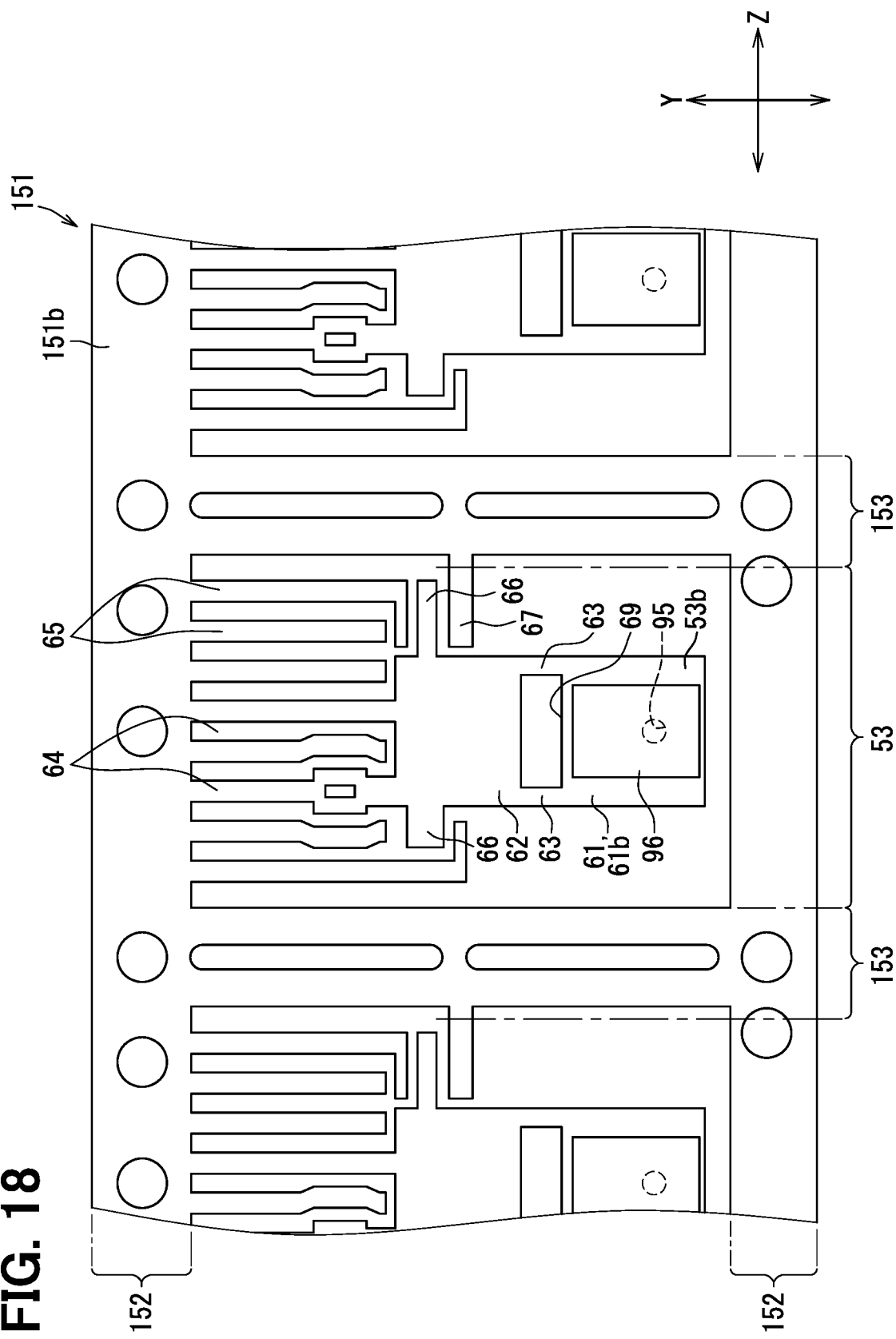
FIG. 18 is a plan view of the base material, in a state where the filter unit is attached to the SA substrate, when viewed from the back side.
Figure 19:
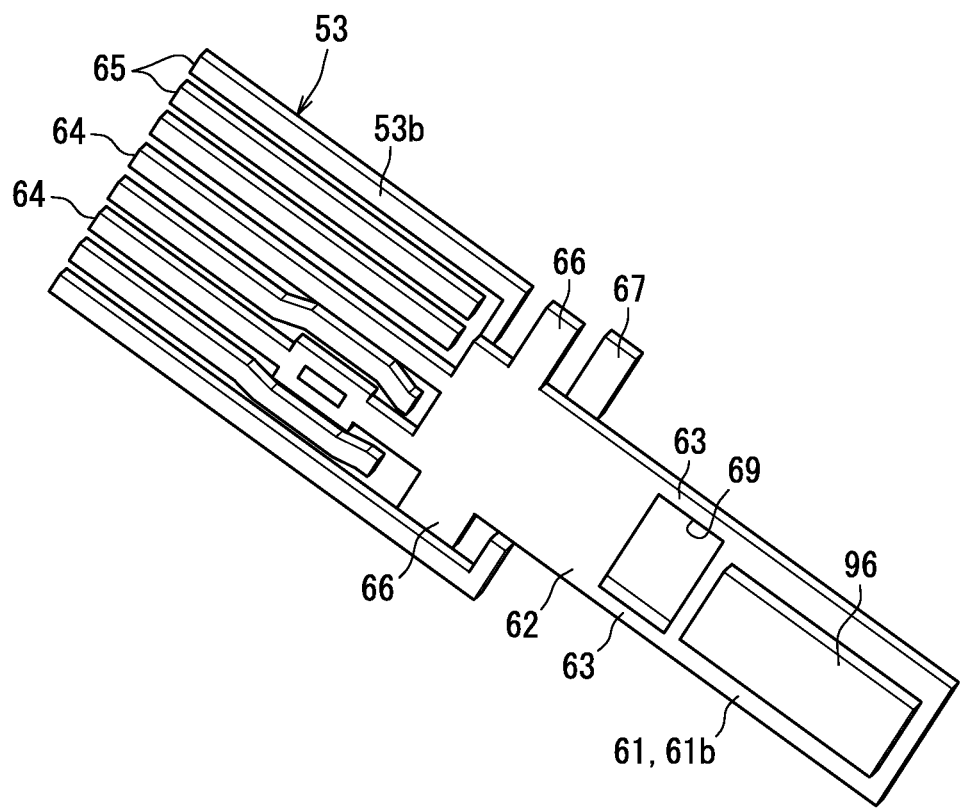
FIG. 19 is a perspective view of the SA substrate, in a state where the filter unit attached, when viewed from the back side.

Next, a step of attaching the filter unit 96 to the punching surface 151b of the base material 151 is performed. In this step, as shown in FIGS. 17 to 19, the filter unit 96 is attached to the back surface 53b of each of the SA substrates 53 in the base material 151. In this case, the filter unit 96 is attached to the back surface 61b of the detection frame 61 using an adhesive or the like so that the filter unit 96 covers the detection frame hole 95. In this way, by attaching the filter unit 96 to the punching surface 151b, it is less likely that the filter unit 96 will be damaged by the burrs remaining on the punched surface 151a. For example, unlike the present embodiment, in a configuration in which the filter unit 96 is attached to the punched surface 151a, the filter unit 96 will be damaged by the burrs remaining on the punched surface 151a, and thus the foreign particle removing performance of the filter unit 96 may deteriorate.

Figure 20:
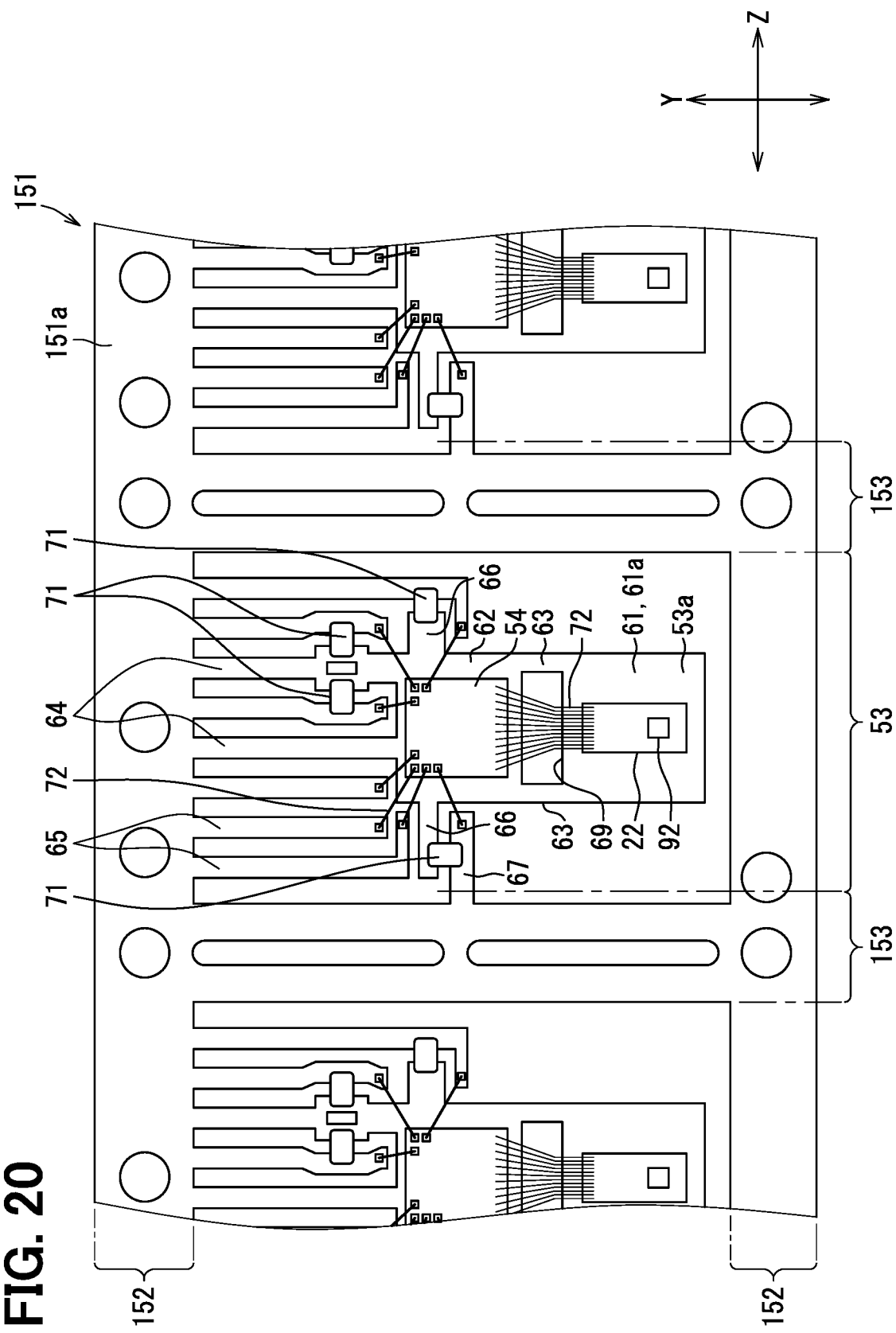
FIG. 20 is a plan view of the base material, in a state where a chip component is attached to the SA substrate, when viewed from the front side.

Further, a step of attaching a chip component such as the flow rate detection unit 22 to the punched surface 151a of the base material 151 is performed. In this step, as shown in FIGS. 20 and 21, chip components such as the flow rate detection unit 22, the flow rate processor 54, and the protection chip 71 are mounted on each of the SA substrates 53 in the base material 151. Then, a wire bonding is performed to these chip components and the SA substrate 53, so that the bonding wires 72 are connected to the flow rate detection unit 22, the flow rate processor 54, the circuit lead terminal 65, the circuit protection frame 67, and the like.

Here, when the flow rate detection unit 22 is attached to the punched surface 151a, there is a concern that the flow rate detection unit 22 may be damaged by the burrs remaining on the punched surface 151a. Specifically, there is a concern that burrs remaining on the peripheral edge portion of the front opening 95a of the detection frame 61 may come into contact with the back surface 22b of the flow rate detection unit 22. On the other hand, as described above, the front opening 95a is sufficiently smaller than the recess opening 91c so that the peripheral edge portion of the front opening 95a of the detection frame 61 is arranged at a position spaced apart inwardly from the peripheral edge portion of the recess opening 91c of the flow rate detection unit 22. Therefore, even if the burrs remain on the peripheral edge portion of the front opening 95a of the detection frame 61, since the flow rate detection unit 22 is attached to the detection frame 61 so that the front opening 95a is arranged inside the peripheral edge portion of the recess opening 91c, damage to the flow rate detection unit 22 due to burrs can be avoided.

Figure 22:
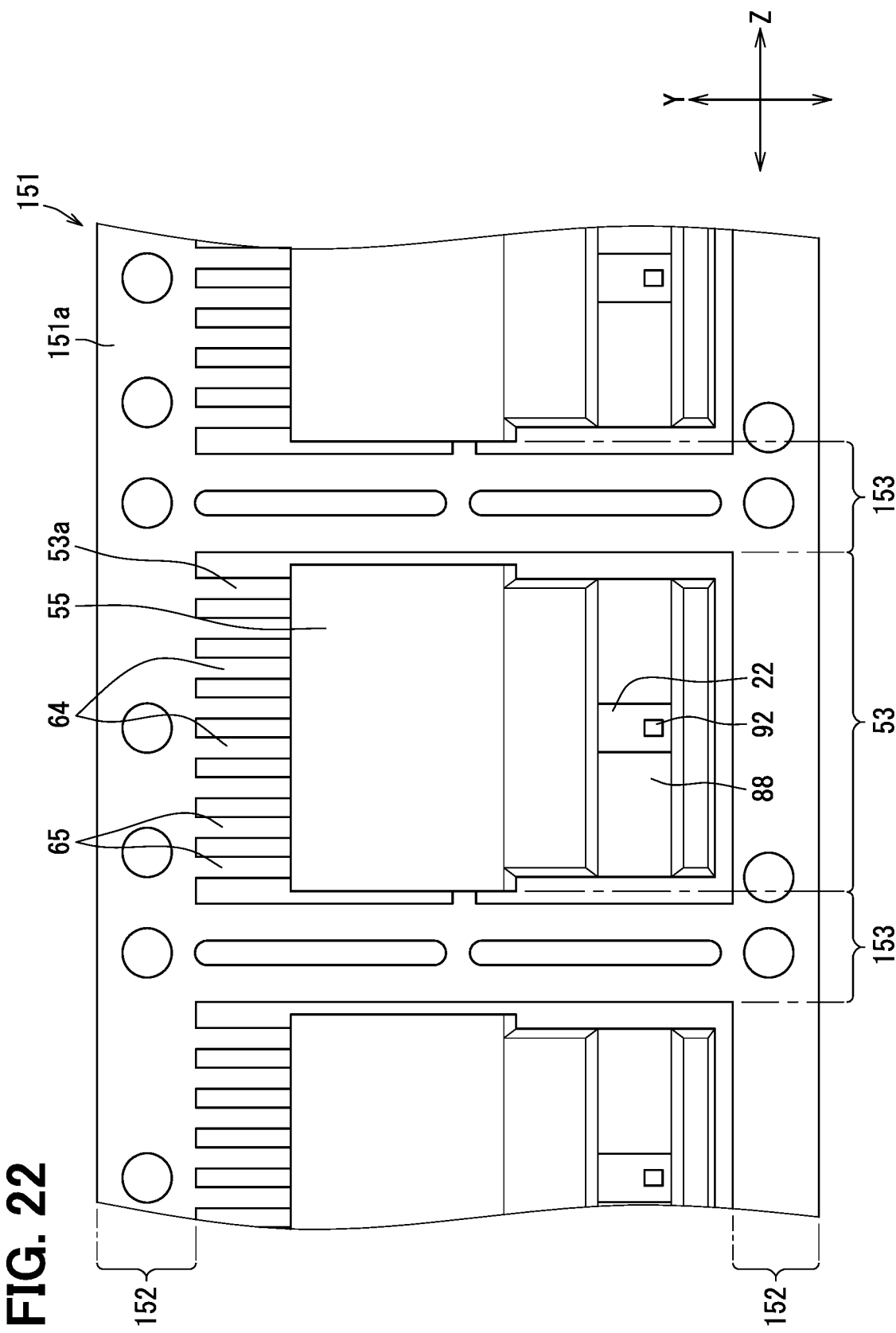
FIG. 22 is a plan view of the base material, in a state where a molded unit is attached to the SA substrate, when viewed from the front side.

Subsequently, a step of attaching the molded part 55 to the base material 151 is performed. This step can also be referred to as a molding step of molding the molded part 55. In this step, as shown in FIG. 22, the molded part 55 is attached to each of the SA substrates 53 in the base material 151 so as to cover the flow rate detection unit 22, the flow rate processor 54, the protection chip 71, and the bonding wire 72. Further, in this step, a mold device 160 is mounted on each of the SA substrates 53 of the base material 151, and the molded part 55 is resin-molded by the mold device 160.

Figure 23:
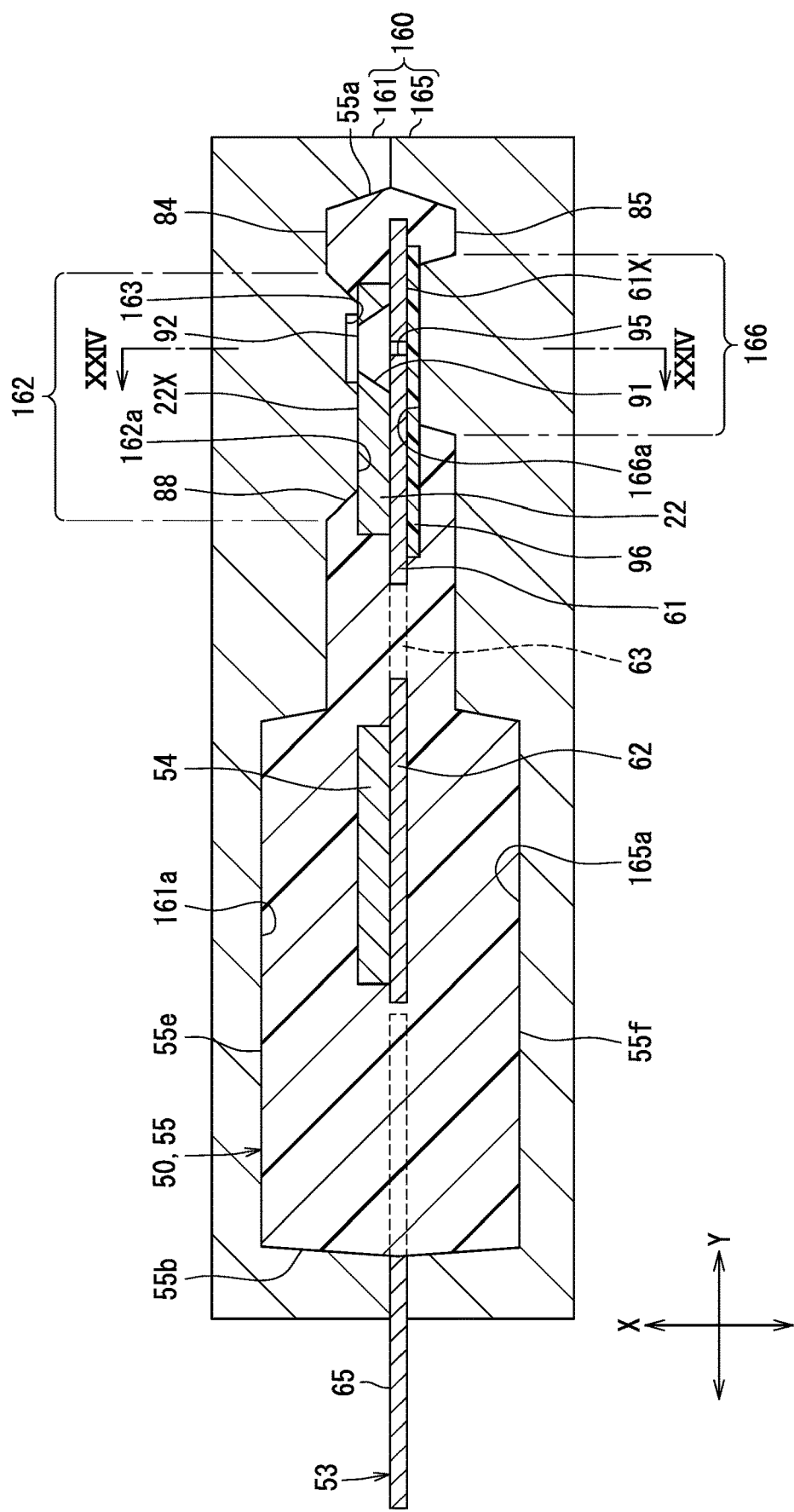
FIG. 23 is a vertical cross-sectional view for showing a configuration of a mold device.
Figure 24:
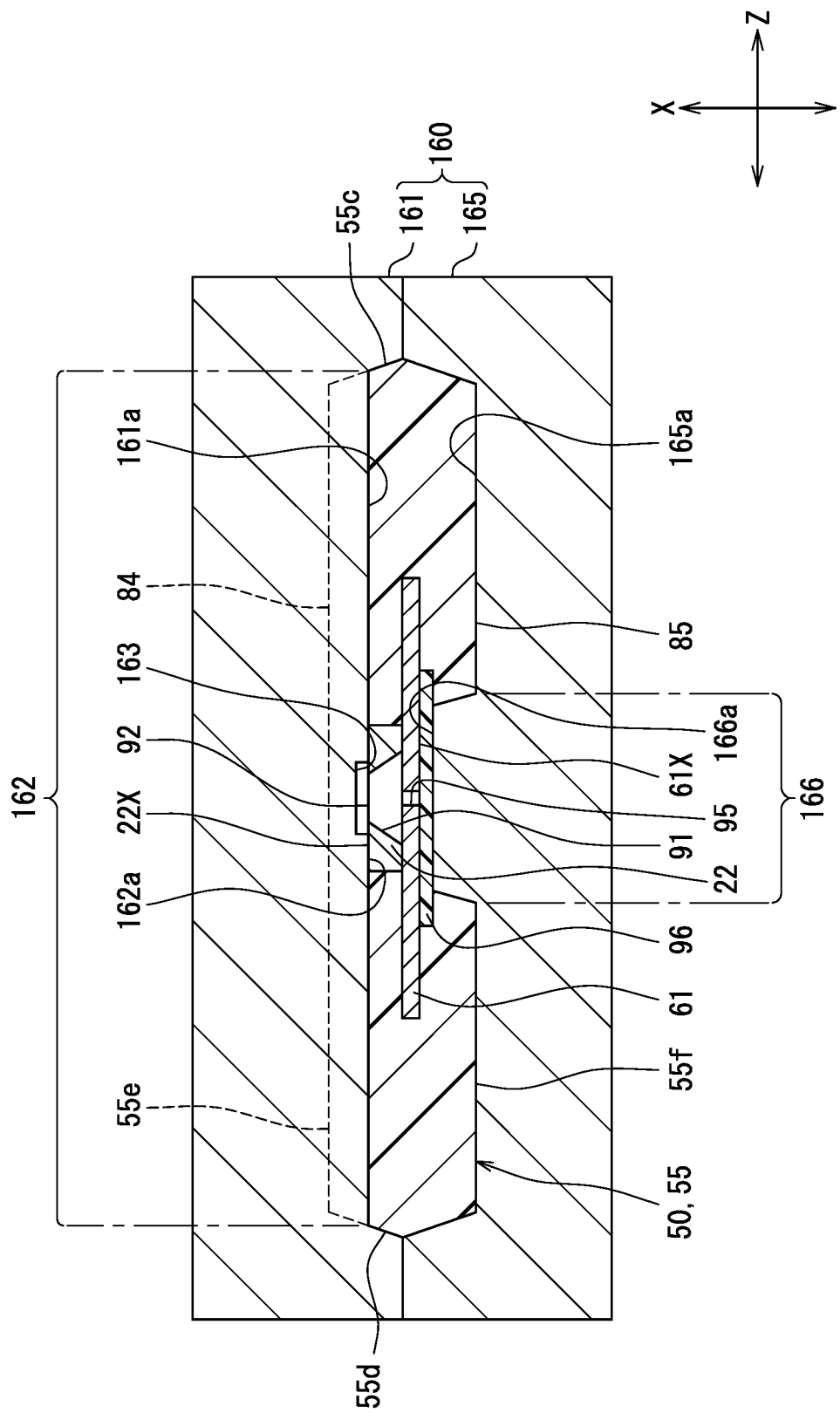
FIG. 24 is a cross-sectional view taken along a line XXIV-XXIV in FIG. 23.

As shown in FIGS. 23 and 24, the mold device 160 has a front mold unit 161 for molding the front cover portion 84 of the molded part 55 and a back mold unit 165 for molding the back cover portion 85 of the molded part 55. Regarding the outer peripheral surface of the molded part 55, when the surface adjacent to the front cover portion 84 is referred to as a front surface 55e and the surface adjacent to the back cover portion 85 is referred to as a back surface 55f, the front mold unit 161 includes a front mold recess 161a for molding the front surface 55e of the molded part 55. Further, the back mold unit 165 has a back mold recess 165a for molding the back surface 55f of the molded part 55.

The front mold unit 161 has a groove molding portion 162 for molding the front mold groove 88 in the molded part 55. The groove molding portion 162 is a protruding portion that protrudes so that the bottom surface of the front mold recess 161a expands. The groove molding portion 162 is gradually tapered off toward the tip surface 162a thereof, and has a tapered shape as a whole. When the mold device 160 is mounted on the SA substrate 53, the tip surface 162a of the groove molding portion 162 is in a state of being pressed against the front extension region 22X of the flow rate detection unit 22. The groove molding portion 162 is a portion that is in contact with the front extension region 22X for exposing the membrane part 92 and the front extension region 22X, and corresponds to a front exposure molding portion.

The groove molding portion 162 is provided with an avoidance recess 163 that restricts the groove molding portion 162 from coming into contact with the membrane part 92, in the state where the mold device 160 is mounted on the SA substrate 53. The avoidance recess 163 is formed as a recess recessed from the tip surface 162a of the groove molding portion 162, and the open end of the avoidance recess 163 is larger than the membrane part 92. When the mold device 160 is mounted on the SA substrate 53, the peripheral edge of the open end of the avoidance recess 163 is spaced apart from the membrane part 92 toward the outer peripheral side. Further, the tip surface 162a of the groove molding portion 162 has an annular shape since the surface 162a surrounds the peripheral edge portion of the avoidance recess 163.

The back mold unit 165 has a hole molding portion 166 for forming the back mold hole 87 in the molded part 55. The hole molding portion 166 is a protruding portion that protrudes so that the bottom surface of the back mold recess 165a expands. The hole molding portion 166 is gradually tapered off toward the tip surface 166a thereof, and has a tapered shape as a whole. When the mold device 160 is mounted on the SA substrate 53, the tip surface 166a of the hole molding portion 166 is in a state of being pressed against the back extension region 61X via the filter unit 96. The hole molding portion 166 is a portion that is in contact with the filter unit 96 for exposing the detection frame hole 95 and the back extension region 61X through the filter unit 96, and corresponds to a back exposure molding portion.

In the state where the back mold unit 165 is mounted on the SA substrate 53, the tip surface 166a of the hole molding portion 166 is in contact with the portion of the filter unit 96 that is overlapped with the back extension region 61X of the detection frame 61. In the present embodiment, this state is also referred to as a state in which the tip surface 166a of the hole molding portion 166 is in contact with the back extension region 61X via the filter unit 96.

In a process for molding the molded part 55, the mold device 160 is assembled so that the SA substrate 53 of the base material 151 is held between the front mold unit 161 and the back mold unit 165, and is clamped. Thus, the mold device 160 is mounted on the base material 151. Then, a molten resin is injected into the internal space of the mold device 160 from an injection port formed in the mold device 160 and filled therein. The internal space of the mold device 160 is provided by the internal spaces of the front mold recess 161a and the back mold recess 165a. The mold device 160 has a plurality of front mold recesses 161a and back mold recesses 165a. Thus, the mold device 160 can mold a plurality of molded parts 55.

When the mold device 160 is mounted on the SA substrate 53, the tip surface 162a of the groove molding portion 162 of the front mold unit 161 is overlapped with the front extension region 22X, and the tip surface 166a of the hole molding portion 166 of the back mold unit 165 is overlapped with the back extension region 61X via the filter unit 96. In this state, the groove molding portion 162 and the hole molding portion 166 are in a state of pressing the flow rate detection unit 22 and the detection frame 61 against indirections approaching each other. Therefore, when the molten resin is injected into the mold device 160, it is possible to restrict the molten resin from penetrating into an unintended portion. Specifically, it is possible to restrict the molten resin from penetrating between the tip surface 162a of the groove molding portion 162 and the front extension region 22X, between the tip surface 166a of the hole molding portion 166 and the back extension region 61X, and between the back surface 22b of the flow rate detection unit 22 and the front surface 61a of the detection frame 61.

Further, since the avoidance recess 163 is formed on the tip surface 162a of the groove molding portion 162, the tip surface 162a does not come into contact with the membrane part 92 even when the groove molding portion 162 is pressed against the front extension region 22X. Therefore, it is less likely that the membrane part 92 will be pressed by the groove molding portion 162 and be deformed. Moreover, in the groove molding portion 162 of the surface mold unit 161, the tip surface 162a thereof has a ring shape so as to surround the avoidance recess 163. Therefore, it is less likely that the molten resin will penetrate into the avoidance recess 163 through between the tip surface 162a of the groove molding portion 162 and the back extension region 61X.

Further, since each of the front extension region 22X and the back extension region 61X is as large as possible, pressures applied from the groove molding portion 162 and the hole molding portion 166 to the front extension region 22X and the back extension region 61X are easily dispersed in these extension regions 22X and 61X. For example, the smaller the front extension region 22X is, the less the pressure applied from the groove molding portion 162 to the front extension region 22X disperses. In such a case, there is a concern that the flow rate detection unit 22 may be deformed or damaged. Similarly, the smaller the back extending region 61X is, the less the pressure applied from the hole molding portion 166 to the back extending region 61X disperses. Thus, there is a concern that the detection frame 61 and the filter unit 96 may be deformed or damaged.

In the front mold unit 161, the groove molding portion 162 can be moved in the width direction X with respect to other portions, and thus the pressure that the groove molding portion 162 is pressed against the front extension region 22X can be adjusted. For this reason, under a condition that the molten resin is restricted to penetrate between the tip surface 162a of the groove molding portion 162 and the front extension region 22X, the groove molding portion 162 can be pressed against the front extension region 22X with a pressure that does not cause the flow rate detection unit 22 to be deformed or damaged.

Further, the mold device 160 is mounted on the base material 151 in a state where a mold filter made of fluororesin or the like is attached to the inner peripheral surface of the front mold recess 161a. With this mold filter, it is possible to suppress that the pressure applied from the groove molding portion 162 to the front extension region 22X and the pressure applied from the hole molding portion 166 to the back extension region 61X vary from product to product.

After the molten resin filled inside the mold device 160 is cured, the mold device 160 is disassembled to remove the front mold unit 161 and the back mold unit 165 from the base material 151 and the molded part 55. Thus, as shown in FIG. 22, the plurality of sensor SAs 50 are in the states being connected through the bridging leads 152 and the connecting lead 153 in the base material 151.

Next, a step of removing the sensor SA 50 from the leads 152 and 153 is performed. In this step, tie bar cutting is performed. Here, the lead terminals 64 and 65 are separated from the bridging lead 152, and the circuit protection frame 67 is separated from the connecting lead 153. Therefore, as shown in FIGS. 4 and 5, the cut surface of the circuit protection frame 67 is exposed to the side of the sensor SA 50 on the mold downstream surface 55d. The cut surface of the circuit protection frame 67 may be coated with resin or the like.

After the sensor SA 50 is completed, the sensor SA 50 is installed in the internal space 24a of the molded housing 21. Then, the lead terminals 64 and 65 of the sensor SA 50 are connected to the connector terminals 28a. In this case, the back surfaces of the lead terminals 64 and 65 are brought into contact with the connector terminals 28a. As described above, the back surfaces of the lead terminals 64 and 65 are formed by the punching surface 151b of the base material 151. Therefore, even if burrs remain on the peripheral edges of the lead terminals 64 and 65 on the punched surface 151a, it is less likely that the burrs will come into contact with the connector terminal 28a. In this case, it is possible to restrict a burr from being interposed between the lead terminals 64 and 65 and the connector terminal 28a and from causing insufficient contact between the lead terminals 64 and 65 and the connector terminal 28a.

According to the present embodiment described so far, since the frame regulation portion 81 is provided between the detection frame 61 and the processor frame 62 in the SA substrate 53, the heat transfer from the processor frame 62 toward the detection frame 61 can be regulated by the frame regulation portion 81. Therefore, even if heat is generated from the flow rate processor 54, it is less likely that the heat will be transferred from the flow rate processor 54 to the flow rate detection unit 22 via the detection frame 61 and the processor frame 62. In this case, since it is less likely that the temperature of the flow rate detection unit 22 will rise regardless of the flow rate and temperature of the air in the measurement flow path 32, the degradation of detection accuracy of the flow rate detection unit 22 due to the heat unrelated to the detection of the air flow rate being applied to the flow rate detection unit 22 can be suppressed. Therefore, the measurement accuracy of the air flow rate by the airflow meter 20 can be improved. In particular, it is possible to suppress deterioration of the starting characteristics of the air flow meter 20 when the power of the vehicle is turned on.

According to the present embodiment, the detection frame 61 and the processor frame 62 are connected to each other through the connection frame 63. In this case, at the time of manufacturing the sensor SA 50, it is not necessary to form a suspension lead, in the base material 151, for connecting at least one of the detection frame 61 and the processor frame 62 to the bridging lead 152 and the connecting lead 153. Therefore, it is possible to reduce the work load when separating the SA substrate 53 from the bridging lead 152 and the connecting lead 153. In this way, by reducing the cross-sectional area of the connection frame 63 so as to be smaller than the cross-sectional areas of the detection frame 61 and the processor frame 62, the heat transfer from the processor frame 62 to the detection frame 61 is regulated, as well as the work load when manufacturing the sensor SA 50 can be reduced.

According to the present embodiment, between the detection frame 61 and the processor frame 62, the frame regulation portion 81 and the connection frames 63 are arranged side by side along the plate surface of the SA substrate 53. Such an arrangement can be realized by a simple operation of forming the substrate hole 69 in the SA substrate 53 and forming the frame regulation portion 81 inside the substrate hole 69.

According to the present embodiment, the connection frames 63 are arranged at positions shifted outward from both the flow rate detection unit 22 and the flow rate processor 54 in the depth direction Z. Therefore, when the heat of the flow rate processor 54 transfers toward the flow rate detection unit 22 via the SA substrate 53, this heat transfers through the connection frames 63 while expanding largely outwardly from the flow rate detection unit 22 and the flow rate processor 54. In this case, for example, as compared to the case where heat transfers through a shortest route linearly connecting the flow rate processor 54 and the flow rate detection unit 22 in the SA substrate 53, the heat can be released from the SA substrate 53 by the amount of the detour. Therefore, even if the processor frame 62 and the detection frame 61 are connected through the connection frames 63, it is possible to restrict the heat from being transferred from the processor frame 62 to the detection frame 61 via the connection frames 63.

According to the present embodiment, the frame regulation portion 81 is provided by the portion of the molded part 55 that is inserted between the processor frame 62 and the detection frame 61. In this case, the frame regulation portion 81 can be provided between the processor frame 62 and the detection frame 61 by simply performing the molding of the molded part 55, which is the necessary work for manufacturing the sensor SA 50. In this way, since the frame regulation portion 81 can be formed in one step of molding the molded part 55, the work load when manufacturing the sensor SA 50 can be reduced. Differently from the present embodiment, for example, in a configuration in which the frame regulation portion 81 is a member independent from the molded part 55, it is necessary to separately perform the step of installing the frame regulation portion 81 and the step of molding the molded part 55, resulting in the increase in work load.

According to the present embodiment, the ground lead terminal 64 protruding outside of the molded part 55 extends from the processor frame 62. Therefore, at the time of manufacturing the sensor SA 50, the ground lead terminals 64 are connected to the bridging lead 152 and the connecting lead 153 in the base material 151, and thus it is not necessary to form suspension leads for connecting the processor frame 62 to these leads 152 and 153 in the base material 151. In this case, since the work of disconnecting the suspension leads from the processor frame 62 is reduced, the work load when manufacturing the sensor SA 50 can be reduced. Further, in this case, it is less likely occur that the cut surface of the suspension leads for supporting the processor frame 62 will be exposed to the outside from the molded part 55. Therefore, it is less likely that corrosion will spread from such a cut surface to the suspension leads and the processor frame 62.

According to the present embodiment, the back extension region 61X, which is a part of the back surface 61b of the detection frame 61, is exposed on the back side of the sensor SA 50 through the back mold hole 87. Therefore, even if the heat generated from the flow rate processor 54 is transferred to the detection frame 61 via the processor frame 62 and the connection frames 63, this heat can be released to the outside of the molded part 55 from the back extension region 61X through the back mold hole 87.

Second Embodiment

In the first embodiment described above, the detection frame 61 and the processor frame 62 are connected through the connection frames 63 in the sensor SA 50. In the second embodiment, on the other hand, the detection frame 61 and the processor frame 62 are provided by portions separated from each other in the SA substrate 53. In the present embodiment, differences from the first embodiment will be mainly described.

As shown in FIG. 25, the detection frame 61 and the processor frame 62 are spaced apart from each other in the height direction Y. When this spaced portion is referred to as a separation portion 201 at which the detection frame 61 and the processor frame 62 are separated from each other, the separation portion 201 is located, in the height direction Y, between the detection frame 61 and flow rate detection unit 22, and the processor frame 62 and flow rate processor 54. The SA substrate 53 includes two independent portions separated from each other by the separation portion 201, one of the two portions being the detection frame 61 and the other being the processor frame 62. A portion of the molded part 55 is inserted in the separation portion 201, and the inserted portion serves as the frame regulation portion 81. Also in the present embodiment, therefore, the frame regulation portion 81 is provided between the detection frame 61 and the processor frame 62, similarly to the first embodiment described above.

Figure 26:
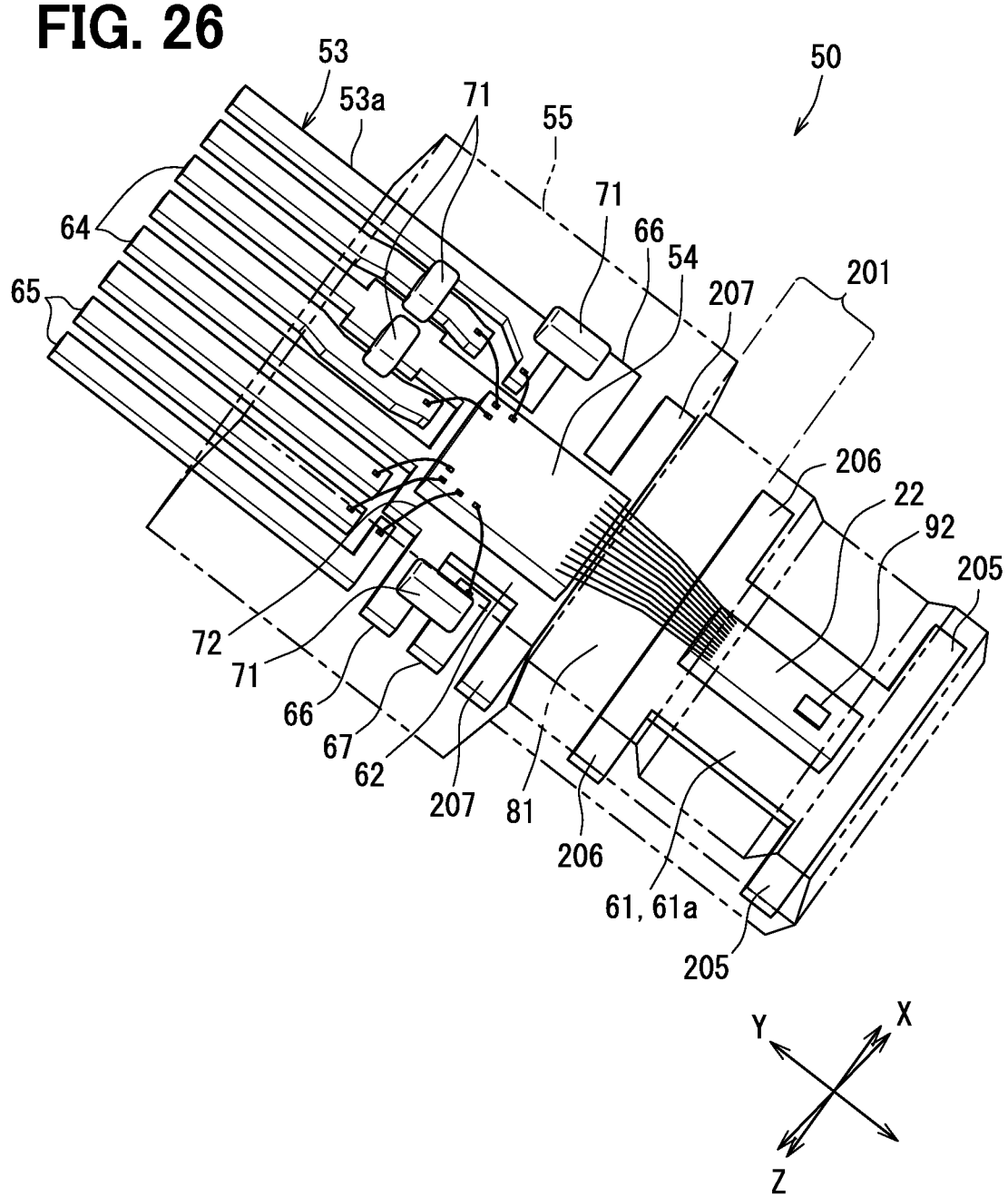
FIG. 26 is a perspective view for showing the internal structure of the sensor SA.

As shown in FIG. 25 and FIG. 26, the SA substrate 53 has suspension leads 205 to 207 exposed on the outer side of the molded part 55. Of the suspension leads 205 to 207, the detection suspension leads 205 and 206 extending from the detection frame 61 in the depth direction Z are exposed to the outside from the mold upstream surface 55c or the mold downstream surface 55d. Of the detection suspension leads 205 and 206, the first detection suspension lead 205 is provided at the end of the detection frame 61 opposite to the processor frame 62, and the second detection suspension lead 206 is provided at the end of the detection frame 61 adjacent to the processor frame 62. The SA substrate 53 includes a pair of the first detection suspension leads 205 and a pair of the second detection suspension leads 206, and one of each pair extends to the mold upstream surface 55c and the other extends to the mold downstream surface 55d.

Of the suspension leads 205 to 207, the processor suspension lead 207 extending from the processor frame 62 in the depth direction Z is exposed to the outside from the mold upstream surface 55c or the mold downstream surface 55d. The processor suspension lead 207 is provided at the end of the processor frame 62 on a side adjacent to the detection frame 61. The SA substrate 53 includes a pair of the processor suspension leads 207, one extending to the mold upstream surface 55c and the other extending to the mold downstream surface 55d.

The separation portion 201 and the frame regulation portion 81 exist not only between the detection frame 61 and the processor frame 62, but also between the second detection suspension leads 206 and the processor suspension leads 207. Therefore, the frame regulation portion 81 regulates the heat transfer from the processor frame 62 and the processor suspension leads 207 to the detection frame 61 and the second detection suspension leads 206. In the present embodiment, as described above, the SA substrate 53 does not have the connection frames 63, differently from the first embodiment described above. Therefore, the heat transfer from the processor frame 62 to the detection frame 61 via the connection frames 63 does not occur. Therefore, the heat transfer from the processor frame 62 to the detection frame 61 is more reliably regulated.

A method for manufacturing the sensor SA 50 will be described with reference to FIGS. 27 to 35 and the like. Basically, the sensor SA 50 is manufactured in the similar process to the first embodiment described above.

Figure 27:
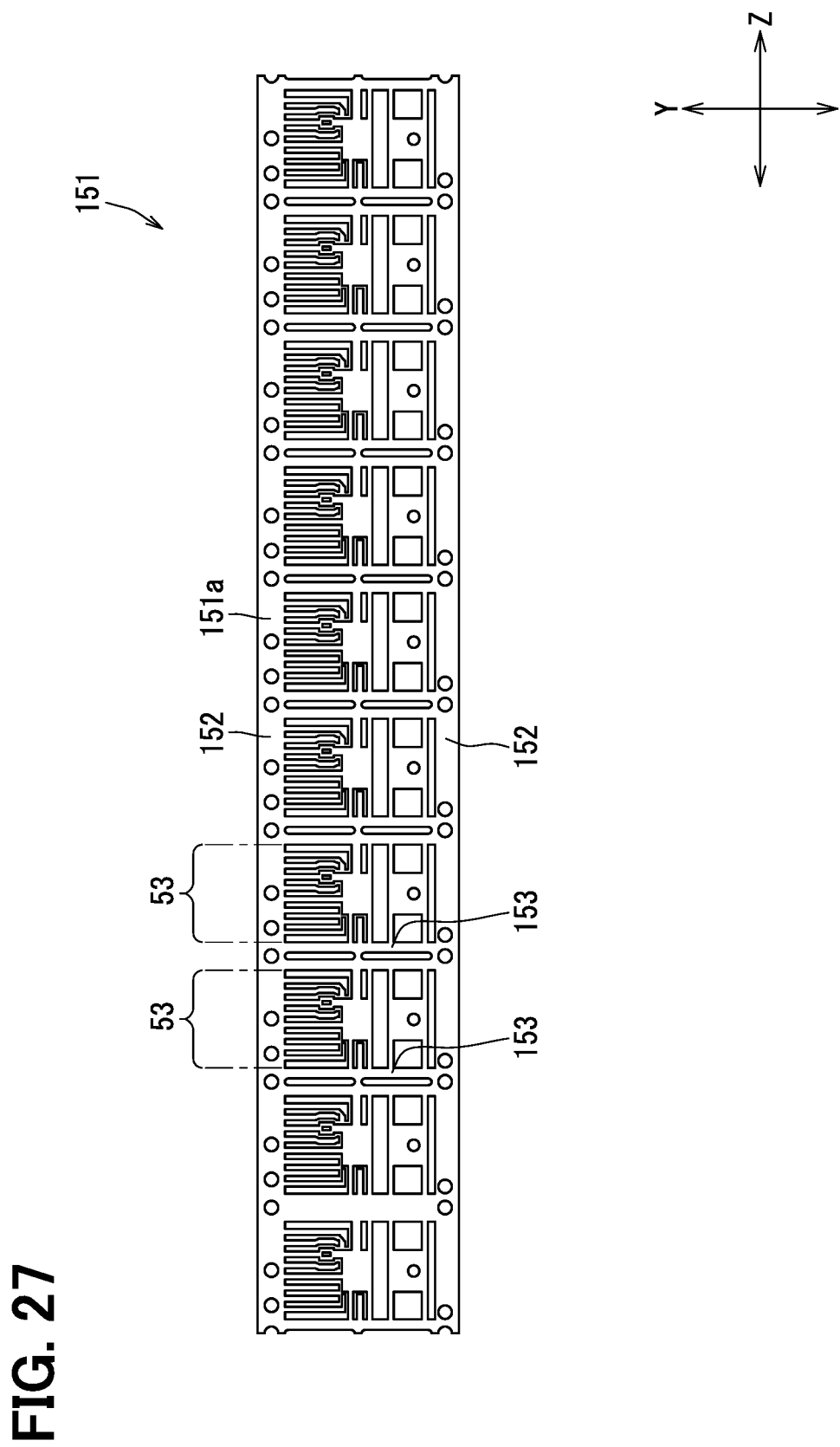
FIG. 27 is a plan view of a base material formed.
Figure 28:
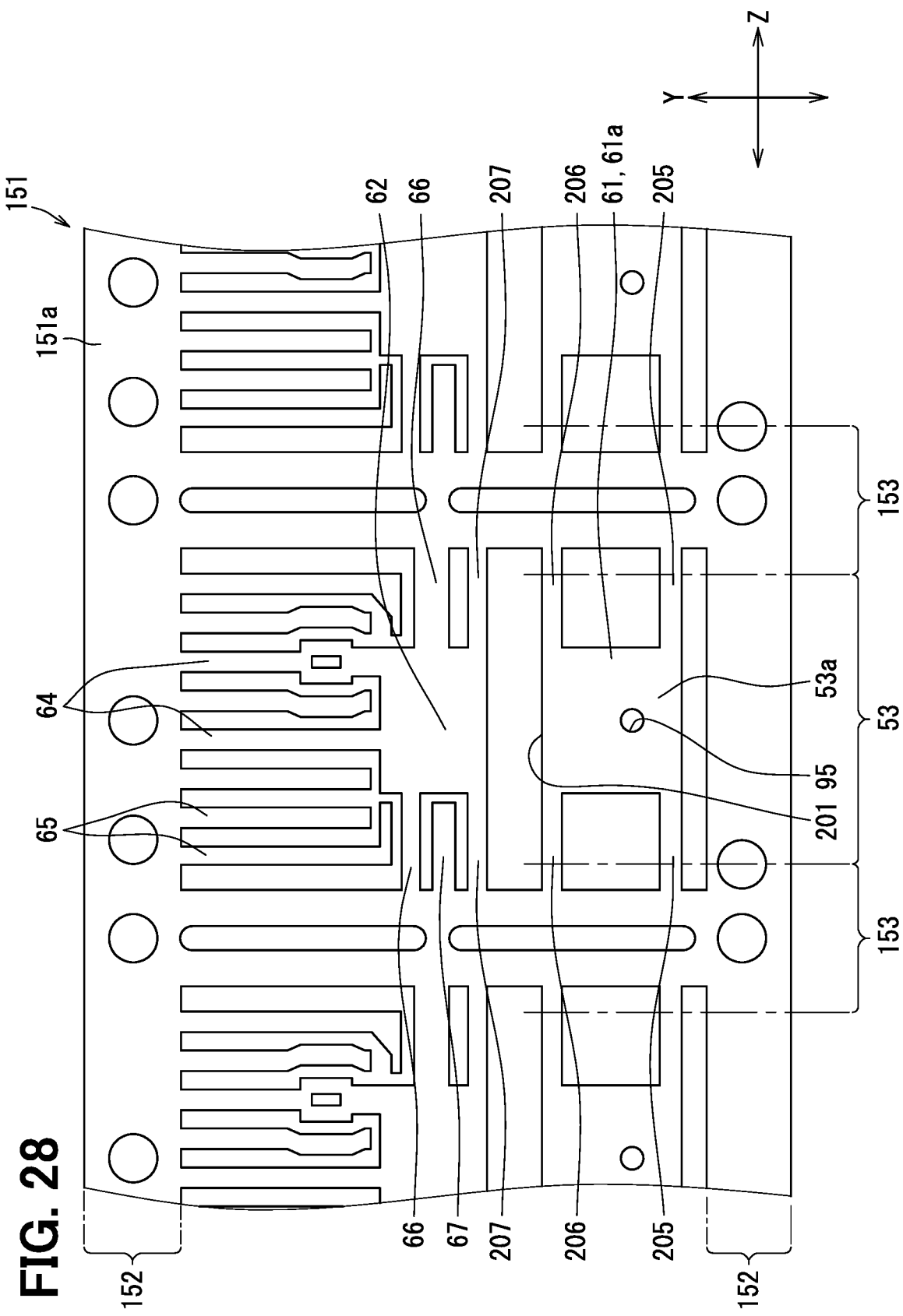
FIG. 28 is an enlarged view of the periphery of the SA substrate in FIG. 27.
Figure 29:
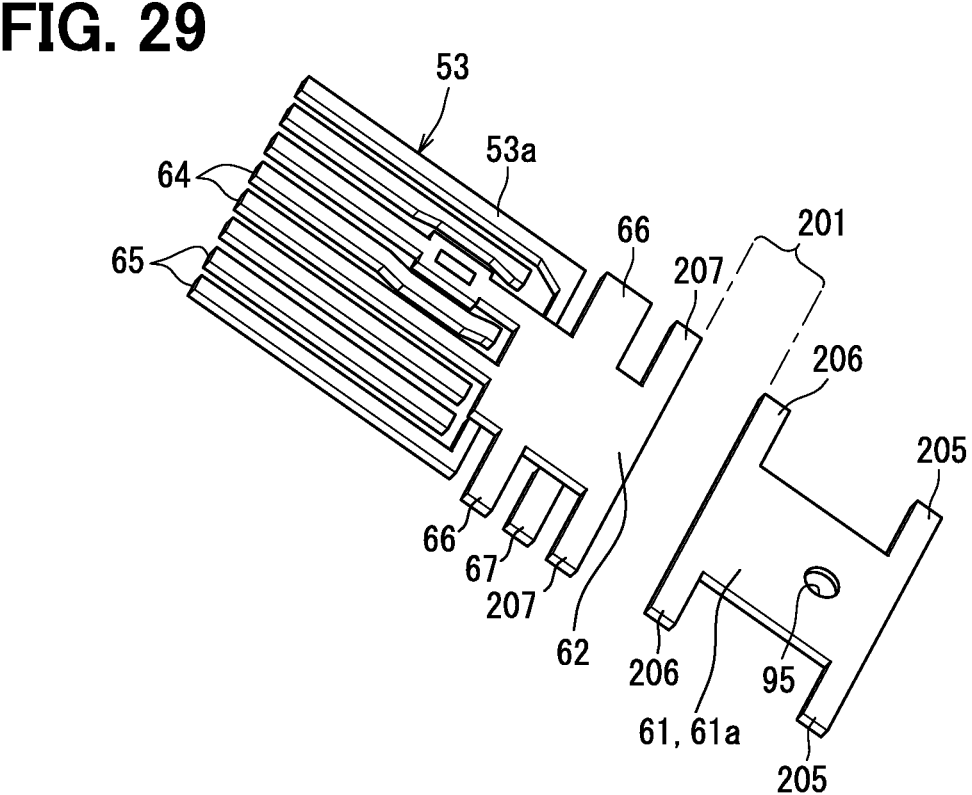
FIG. 29 is a perspective view of the SA substrate, when viewed from the front side.

In the step of forming the base material 151 by punching, as shown in FIGS. 27 to 29, the separation portion 201 and the suspension leads 205 to 207 are formed in the SA substrate 53 by forming through holes in the base material 151. The detection suspension leads 205 and 206 connect the detection frame 61 and the connecting lead 153, and the processor suspension lead 207 connects the processor frame 62 and the connecting lead 153. Further, in the present embodiment, differently from the first embodiment, the ground protection frame 66 is connected to the connecting lead 153. In this case, the ground protection frame 66 also connects the processor frame 62 and the connecting lead 153 in the similar manner to the processor suspension lead 207.

In this way, since the detection suspension leads 205 and 206 support the detection frame 61, even if the detection frame 61 is not connected to the processor frame 62 through the connection frames 63, the detection frame 61 is not separated from the base material 151. Further, as described above, the second detection suspension leads 206 support the end portion of the detection frame 61, and the processor suspension leads 207 support the end portion of the processor frame 62. Therefore, the second detection suspension leads 206 and the processor suspension leads 207 suppress deformation of the detection frame 61 and deformation of the processor frame 62 due to the stress caused when the separation portion 201 is formed by the punching process.

Figure 30:
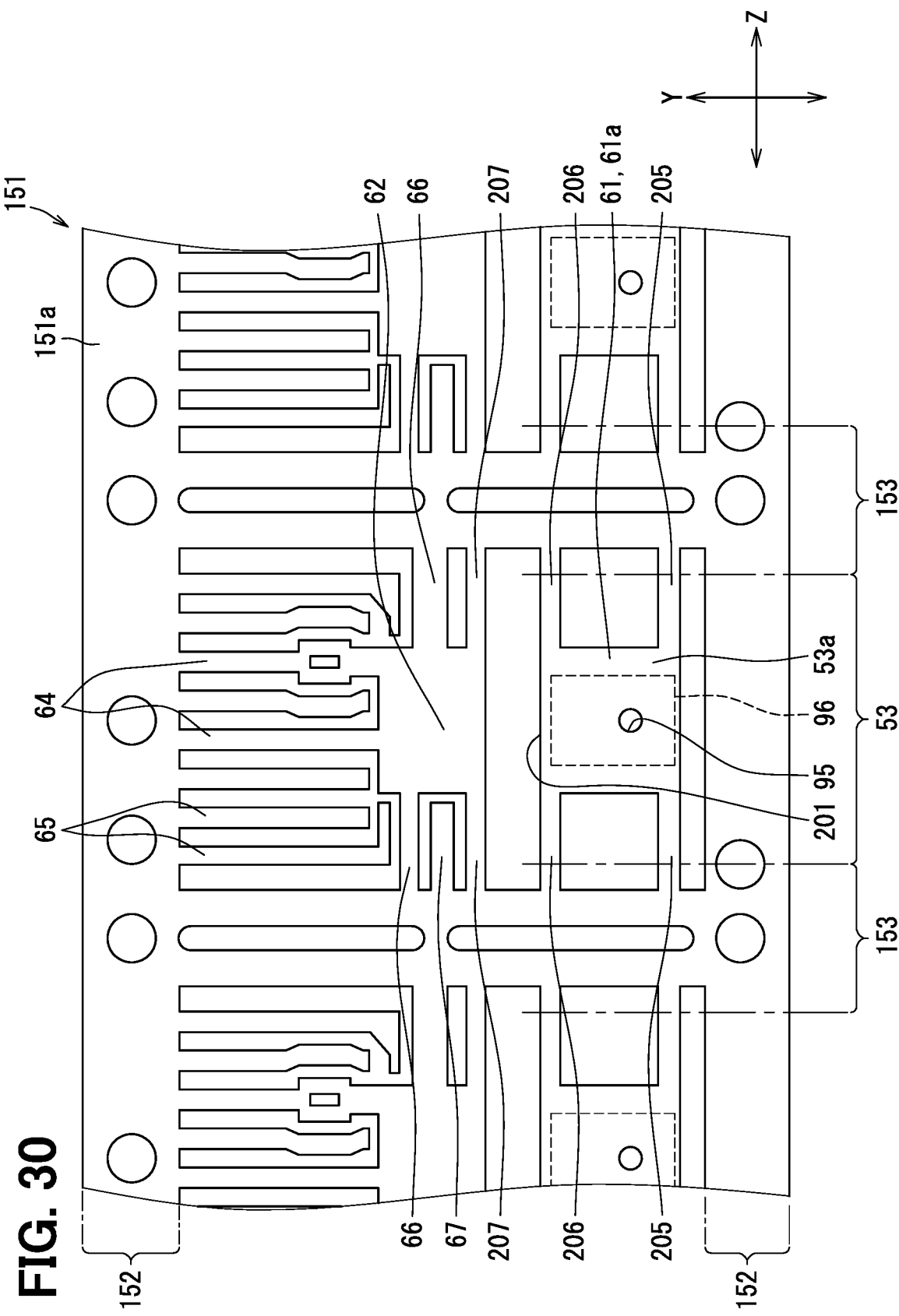
FIG. 30 is a plan view of the base material, in a state where a filter unit is attached to the SA substrate, when viewed from the front side.
Figure 31:
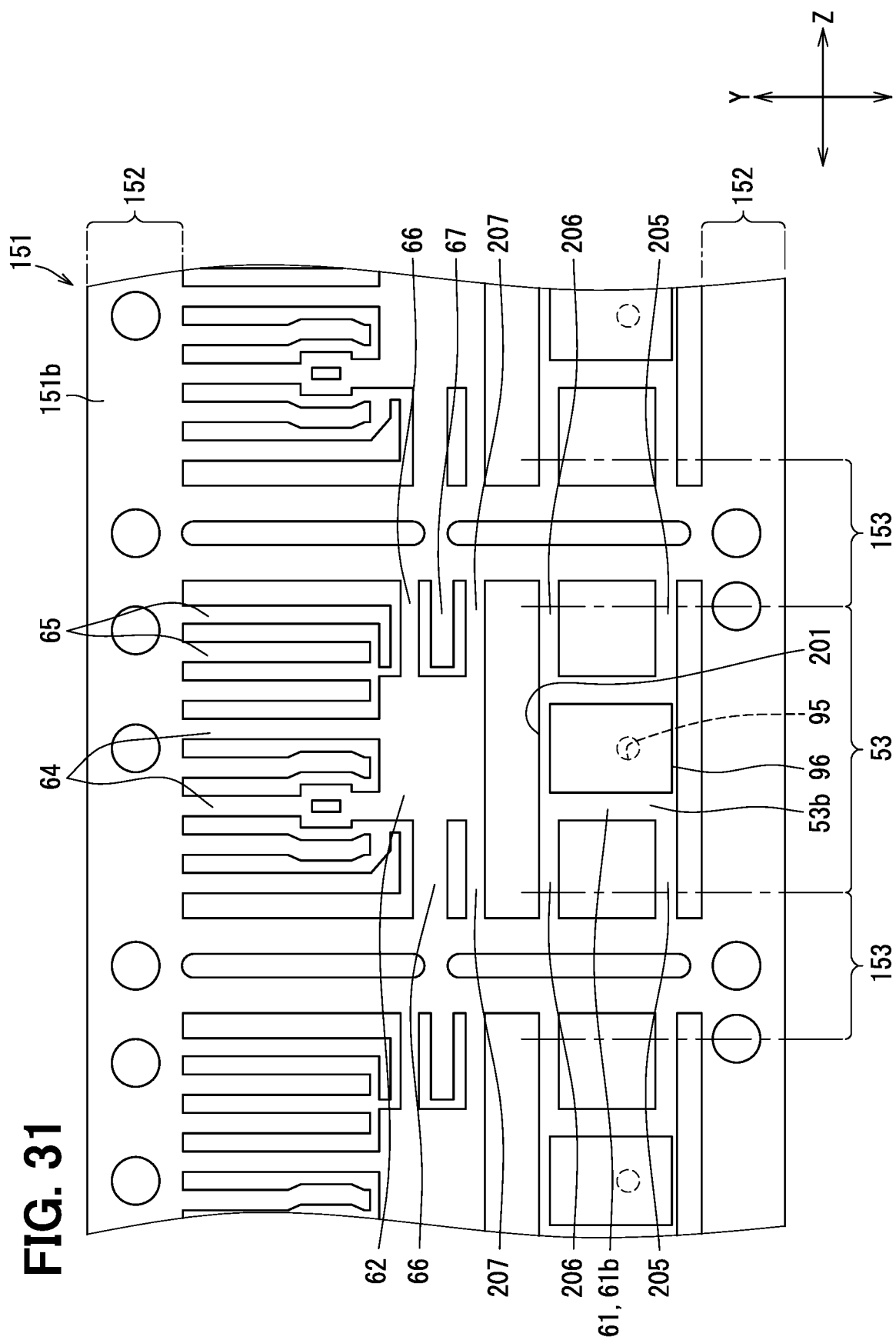
FIG. 31 is a plan view of the base material, in the state where the filter unit is attached to the SA substrate, when viewed from the back side.
Figure 33:
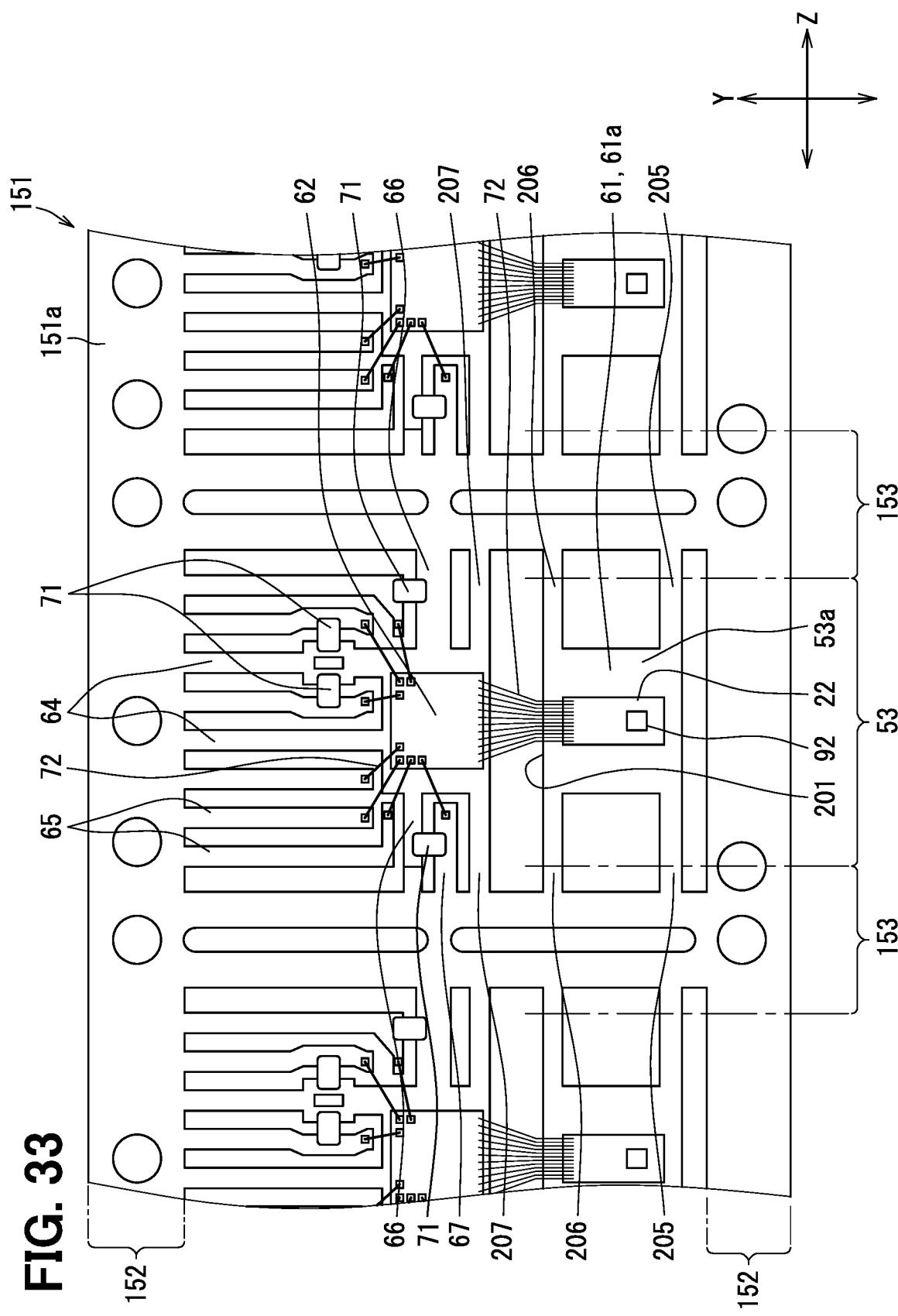
FIG. 33 is a plan view of the base material, in a state where a chip component is attached to the SA substrate, when viewed from the front side.
Figure 35:
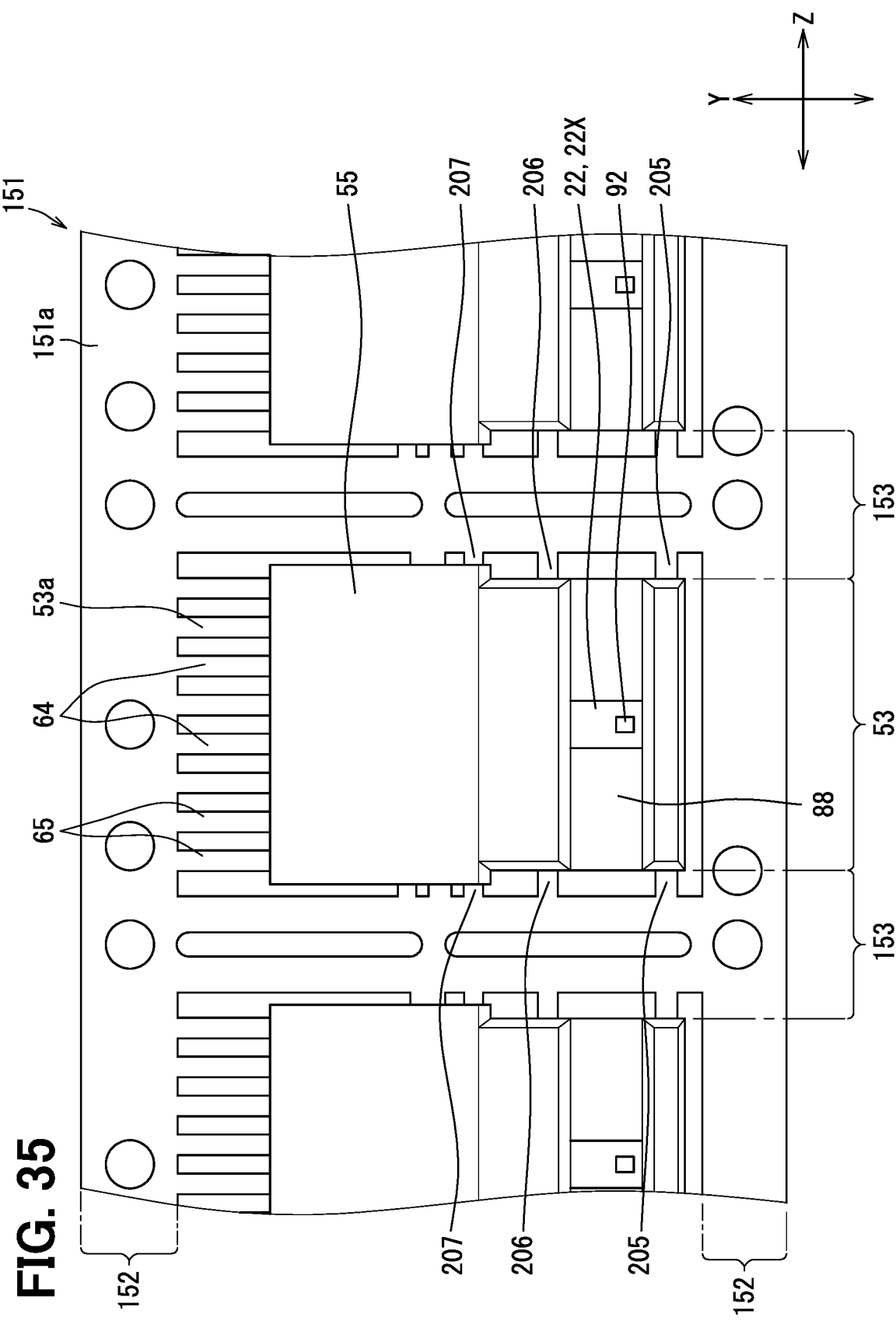
FIG. 35 is a plan view of the base material, in a state where a molded part is attached to the SA substrate, when viewed from the front side.

Next, the filter unit 96 is attached to the punching surface 151b of the base material 151, as shown in FIGS. 30 to 32. Further, a chip component such as the flow rate detection unit 22 is attached to the punched surface 151a of the base material 151, as shown in FIG. 33 and FIG. 34. Further, the bonding wires 72 are connected to the chip component and the SA substrate 53. Thereafter, as shown in FIG. 35, the molded part 55 is molded on the SA substrate 53 of the base material 151, as shown in FIG. 35.

Subsequently, in the step of removing the sensor SA 50 from the leads 152 and 153, the tie bars are cut in the similar manner to the first embodiment described above. In this case, the lead terminals 64 and 65 are separated from the bridging lead 152, and the circuit protection frame 67 is separated from the connecting lead 153. Further, in the present embodiment, the suspension leads 205 to 207 are cut off from the connecting lead 153. In this case, as shown in FIG. 25, the cut surfaces of the suspension leads 205 to 207 are exposed towards the sides of the sensor SA 50 on the mold upstream surface 55c and the mold downstream surface 55d. These cut surfaces of the suspension leads 205 to 207 may be coated with resin or the like.

According to the present embodiment, since the detection frame 61 and the processor frame 62 are independent portions independent from each other due to the separation portion 201, it is less likely that heat will be transferred from the processor frame 62 to the detection frame 61 through a part of the SA substrate 53. Therefore, the frame regulation portion 81 can more reliably regulate the heat transfer from the processor frame 62 to the detection frame 61.

According to the present embodiment, at the time of manufacturing the sensor SA 50, the detection frame 61 is supported by the detection suspension leads 205 and 206 in the base material 151. Therefore, even if the SA substrate 53 does not include the portion connecting the detection frame 61 and the processor frame 62, it is possible to restrict the detection frame 61 from being separated from the base material 151. In other words, since the detection suspension leads 205 and 206 that support the detection frame 61 are included in the base material 151, the SA substrate 53 can realize a configuration in which the detection frame 61 is independent of the processor frame 62.

Third Embodiment

In the third embodiment, an intermediate plate is provided between the flow rate detection unit 22 and flow rate processor 54 and the SA substrate 53. In the present embodiment, differences from the first embodiment will be mainly described.

Figure 36:
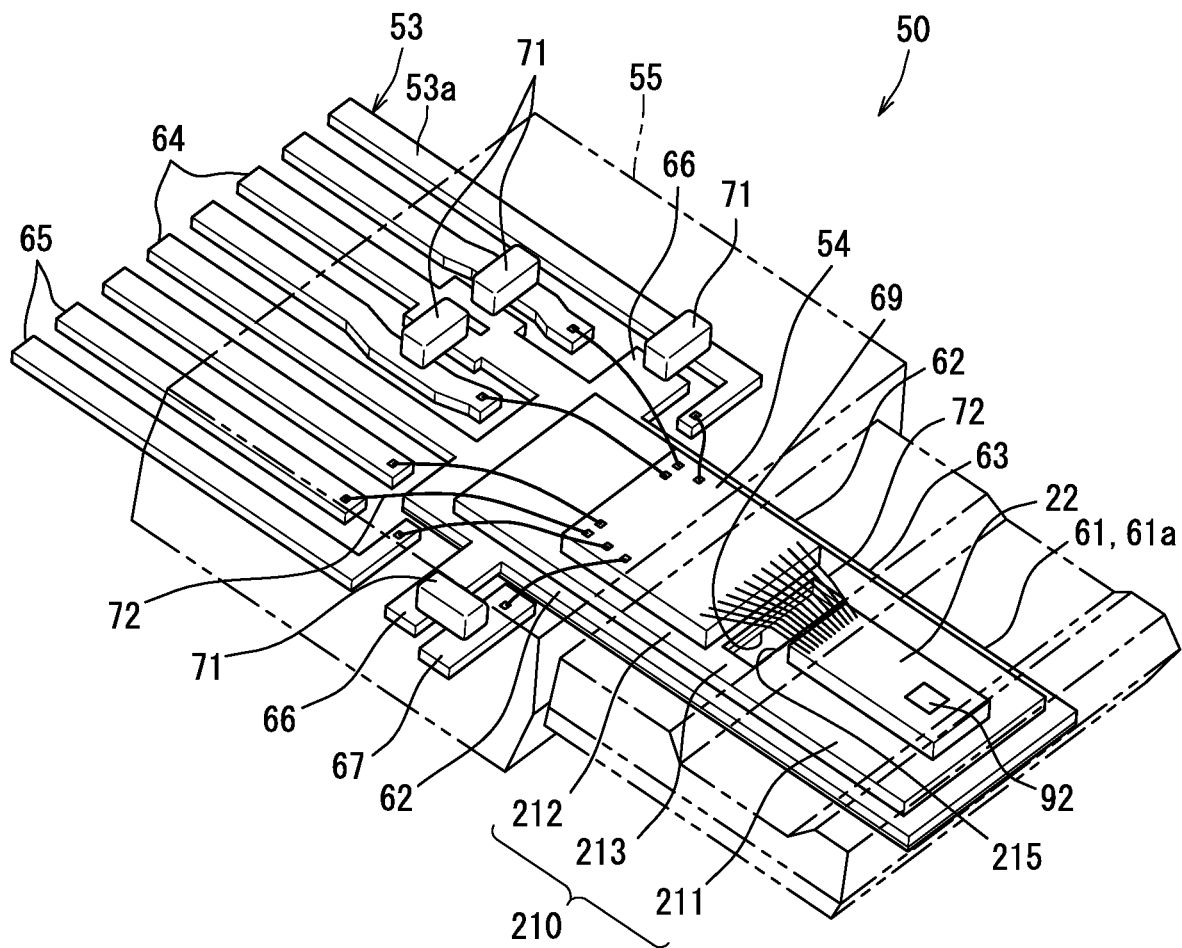
FIG. 36 is a perspective view showing an internal configuration of a sensor SA according to a third embodiment.
Figure 37:
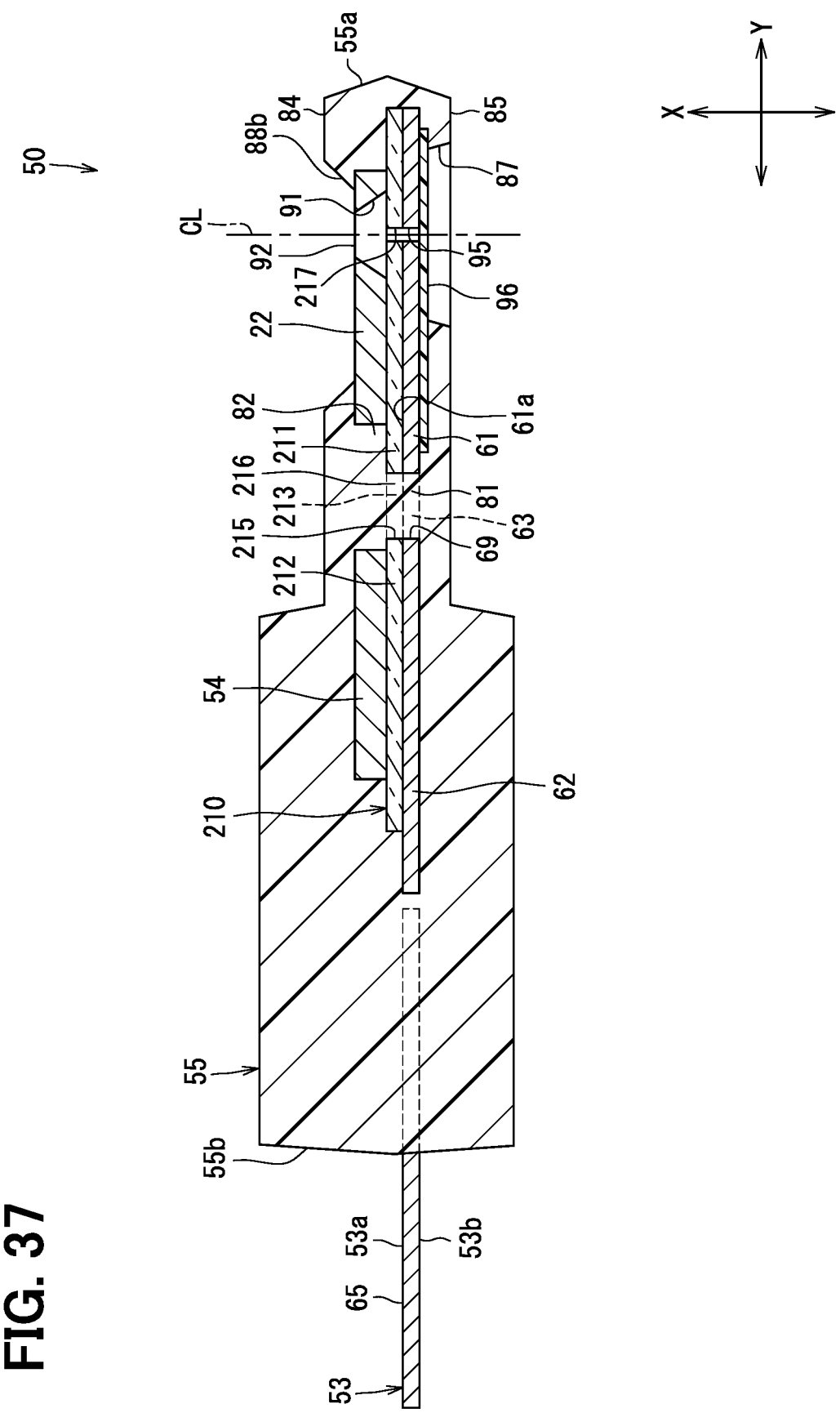
FIG. 37 is a vertical cross-sectional view of the sensor SA.

As shown in FIG. 36 and FIG. 37, the sensor SA 50 includes an intermediate plate 210. The intermediate plate 210 has a plate shape, and is provided by a glass plate or the like. The intermediate plate 210 has an insulating property. The intermediate plate 210 is attached to the SA substrate 53, and the back surface of the intermediate plate 210 is superposed on the front surface 53a of the SA substrate 53. The intermediate plate 210 is in a state of spanning between the detection frame 61 and the processor frame 62 over the connection frame 63 and the substrate hole 69 in the height direction Y. The intermediate plate 210 has a detection plate portion 211 overlapped with the detection frame 61, a processor plate portion 212 overlapped with the processor frame 62, and a connection plate portion 213 overlapped with the connection frame 63.

In the intermediate plate 210, the flow rate detection unit 22 is attached to the front surface of the detection plate portion 211, and the flow rate processor 54 is attached to the front surface of the processor plate portion 212. In this case, the flow rate detection unit 22 is fixed to the detection frame 61 via the detection plate portion 211, and the flow rate processor 54 is fixed to the processor frame 62 via the processor plate portion 212.

In the present embodiment, differently from the first embodiment, the substrate hole 69 of the SA substrate 53 protrudes toward the outside than the flow rate detection unit 22 in the depth direction Z, but does not protrude toward the outside than the flow rate processor 54. In this case, the width dimension W5 (see FIG. 7) of the substrate hole 69 in the depth direction Z is larger than the width dimension W3 (see FIG. 7) of the flow rate detection unit 22, but is smaller than the width dimension W4 (see FIG. 7) of the flow rate processor 54. Even in this case, the frame regulation portion 81 is still provided between the detection frame 61 and the processor frame 62.

The intermediate plate 210 is provided with an intermediate plate hole 215 that communicates with the substrate hole 69. The intermediate plate hole 215 has the same size and shape as the substrate hole 69 in a plan view, and the peripheral edge portion of the intermediate plate hole 215 overlaps the peripheral edge portion of the substrate hole 69 in the width direction X. In this case, the width dimension of the intermediate plate hole 215 in the depth direction Z is the same as the width dimension W5 of the substrate hole 69. The intermediate plate 210 has a pair of the connection plate portions 213 provided with an intermediate plate hole 215 interposed therebetween in the depth direction Z.

In addition to the frame regulation portion 81, the molded part 55 has a plate regulation portion 216 that regulates heat transfer from the processor plate portion 212 to the detection plate portion 211. The plate regulation portion 216 is a portion of the molded part 55 that enters the intermediate plate hole 215, and is in a state of being embedded inside the intermediate plate hole 215. Therefore, the plate regulation portion 216 has the same size and shape as the intermediate plate hole 215. The plate regulation portion 216 is arranged side by side with the connection plate portions 213 in the depth direction Z. In this case, the plate regulation portion 216 and the connection plate portions 213 are arranged side by side along the plate surface of the intermediate plate 210. Further, the plate regulation portion 216 is arranged between the frame regulation portion 81 and the direct regulation portion 82 in the width direction X.

In the present embodiment, the SA substrate 53 and the intermediate plate 210 provide the support plate part. The detection frame 61 and the detection plate portion 211 provide a detector support portion, the processor frame 62 and the processor plate portion 212 provide a processor support portion, and the connection frame 63 and the connection plate portion 213 provide a connection support portion. The frame reregulation portion 81 and the plate regulation portion 216 provide a heat transfer regulation portion.

The intermediate plate 210 has a detection plate hole 217 that passes through the detection plate portion 211. The detection plate hole 217 is provided between the detection recess 91 and the detection frame hole 95 in the width direction X, and allows communication between the detection recess 91 and the detection frame hole 95. Therefore, the air that has passed through the filter unit 96 and reached the detection frame hole 95 will flow into the detection recess 91 by further passing through the detection plate hole 217. The detection plate hole 217 has the same shape and size as the detection frame hole 95 in a plan view. The center line of the detection plate hole 217 coincides with the center line CL of the detection recess 91.

Next, a method for manufacturing the sensor SA 50 will be described with reference to FIGS. 38 to 41 and the like. Basically, the sensor SA 50 is manufactured in the similar process to that in the first embodiment.

Figure 38:
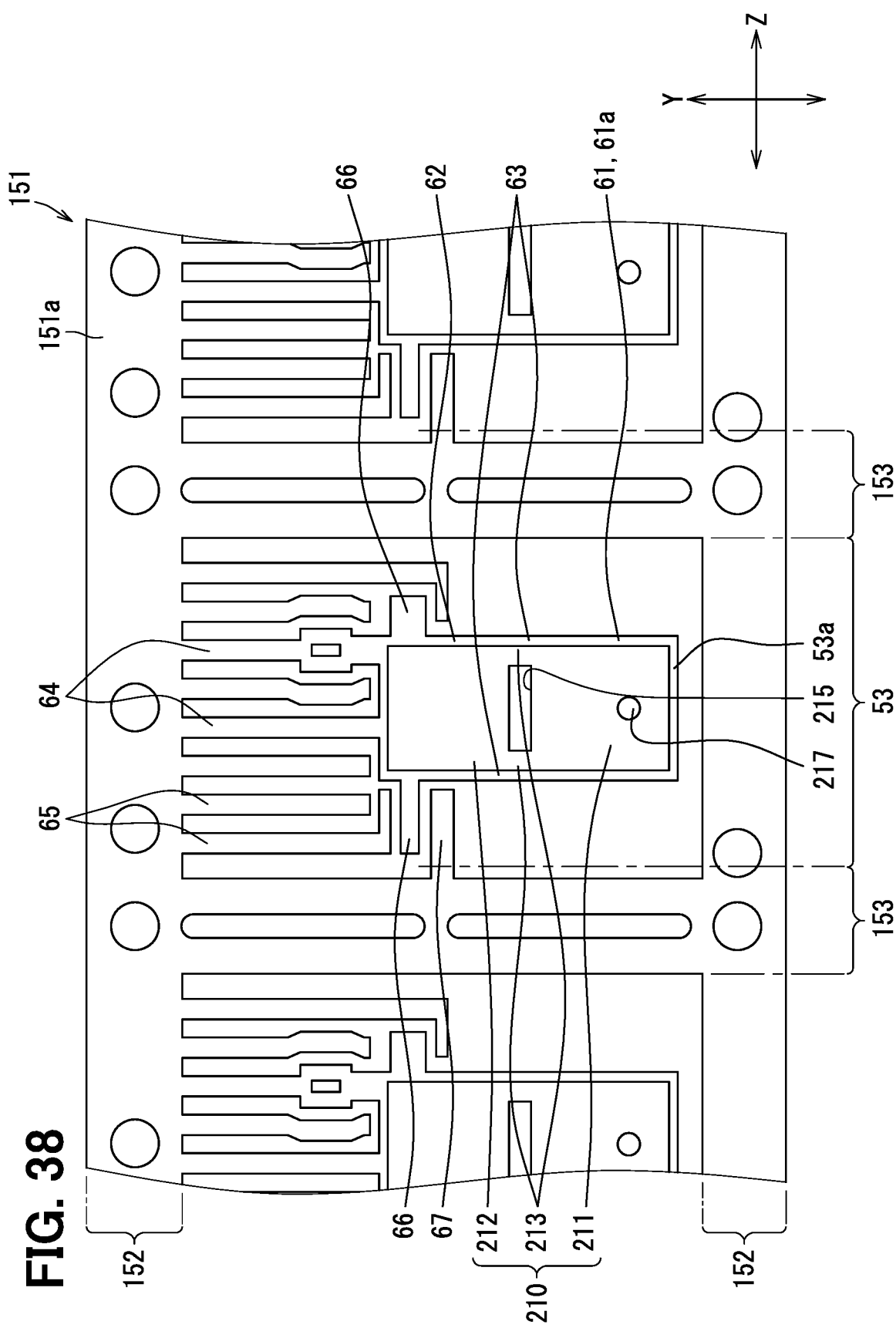
FIG. 38 is a plan view of a base material, in a state where an intermediate plate is attached to the SA substrate, when viewed from the front side.
Figure 39:
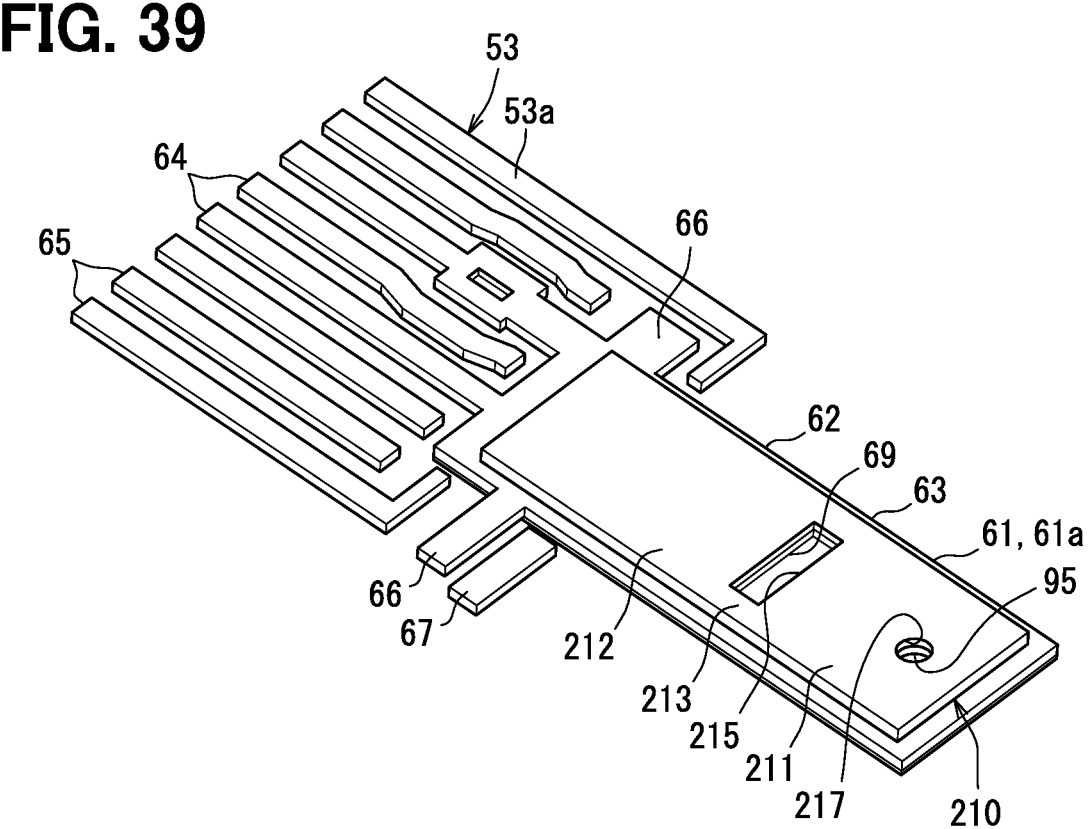
FIG. 39 is a perspective view of the SA substrate, in a state where the intermediate plate is attached to the SA substrate, when viewed from the front side.

First, a step of forming the intermediate plate 210 is performed. In this step, the intermediate plate 210 is formed by subjecting the glass plate to a process such as cutting. Specifically, by forming through holes in the glass plate, the intermediate plate 210 having the intermediate plate hole 215 and the detection plate hole 217 is formed. Then, after forming the base material 151, a step of attaching the intermediate plate 210 to the punched surface 151a of the base material 151 is performed. In this step, as shown in FIG. 38 and FIG. 39, the back surface of the intermediate plate 210 is fixed to the punched surface 151a with an adhesive or the like.

Figure 40:
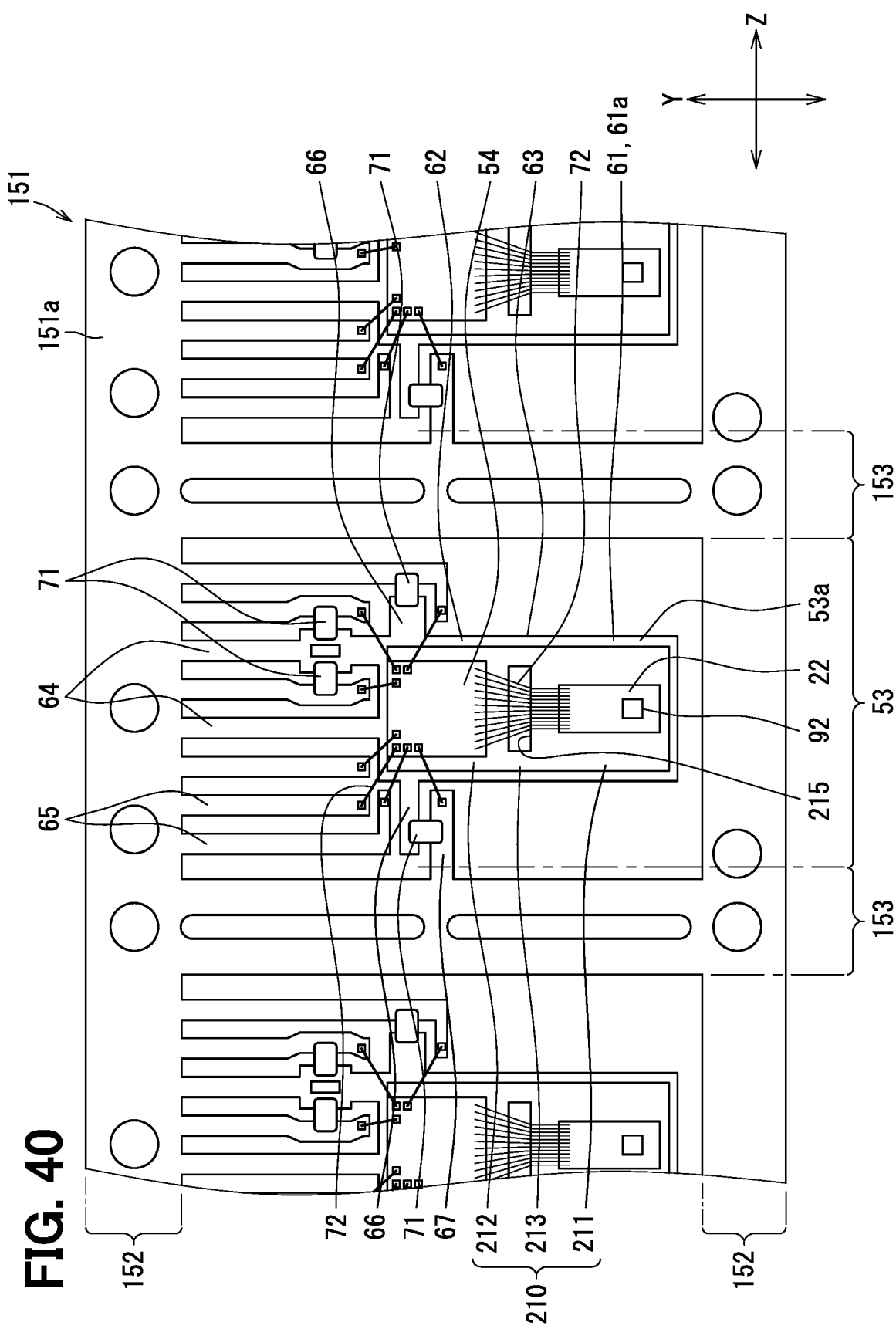
FIG. 40 is a plan view of the base material, in a state where a chip component is attached to the SA substrate, when viewed from the front side.

Subsequently, as shown in FIG. 40 and FIG. 41, a protection chip 71 is attached to the punched surface 151a of the base material 151, and the flow rate detection unit 22 and the flow rate processor 54 are attached to the front surface of the intermediate plate 210. Further, the bonding wires 72 are connected to the flow rate detection unit 22, the flow rate processor 54, and the SA substrate 53. Thereafter, the molded part 55 is attached to the base material 151, and the leads 152 and 153 are separated from the sensor SA 50. Thus, the sensor SA 50 is completed.

According to the present embodiment, since the plate regulation portion 216 is provided between the detection plate portion 211 and the processor plate portion 212 in the intermediate plate 210, the heat transfer from the processor plate portion 212 to the detection plate portion 211 is regulated by the plate regulation portion 216. Therefore, even if heat is generated from the flow rate processor 54, this heat will less likely to be transferred from the flow rate processor 54 to the flow rate detection unit 22 via the detection plate portion 211 and the processor plate portion 212.

According to the present embodiment, since the processor plate portion 212 is provided between the flow rate processor 54 and the processor frame 62, the heat of the flow rate processor 54 is less likely to be transferred to the processor frame 62. Moreover, since the detection plate portion 211 is provided between the flow rate detection unit 22 and the detection frame 61, the heat of the detection frame 61 is less likely to be transferred to the flow rate detection unit 22. As described above, the processor plate portion 212 and the detection plate portion 211 can regulate the transferring heat of the flow rate processor 54 to the flow rate detection unit 22 via the processor frame 62 and the detection frame 61.

Other Embodiments

Although a plurality of embodiments according to the present disclosure have been described above, the present disclosure is not construed as being limited to the embodiments described above, and can be applied to various embodiments and combinations within a scope not departing from the spirit of the present disclosure.

Figure 42:
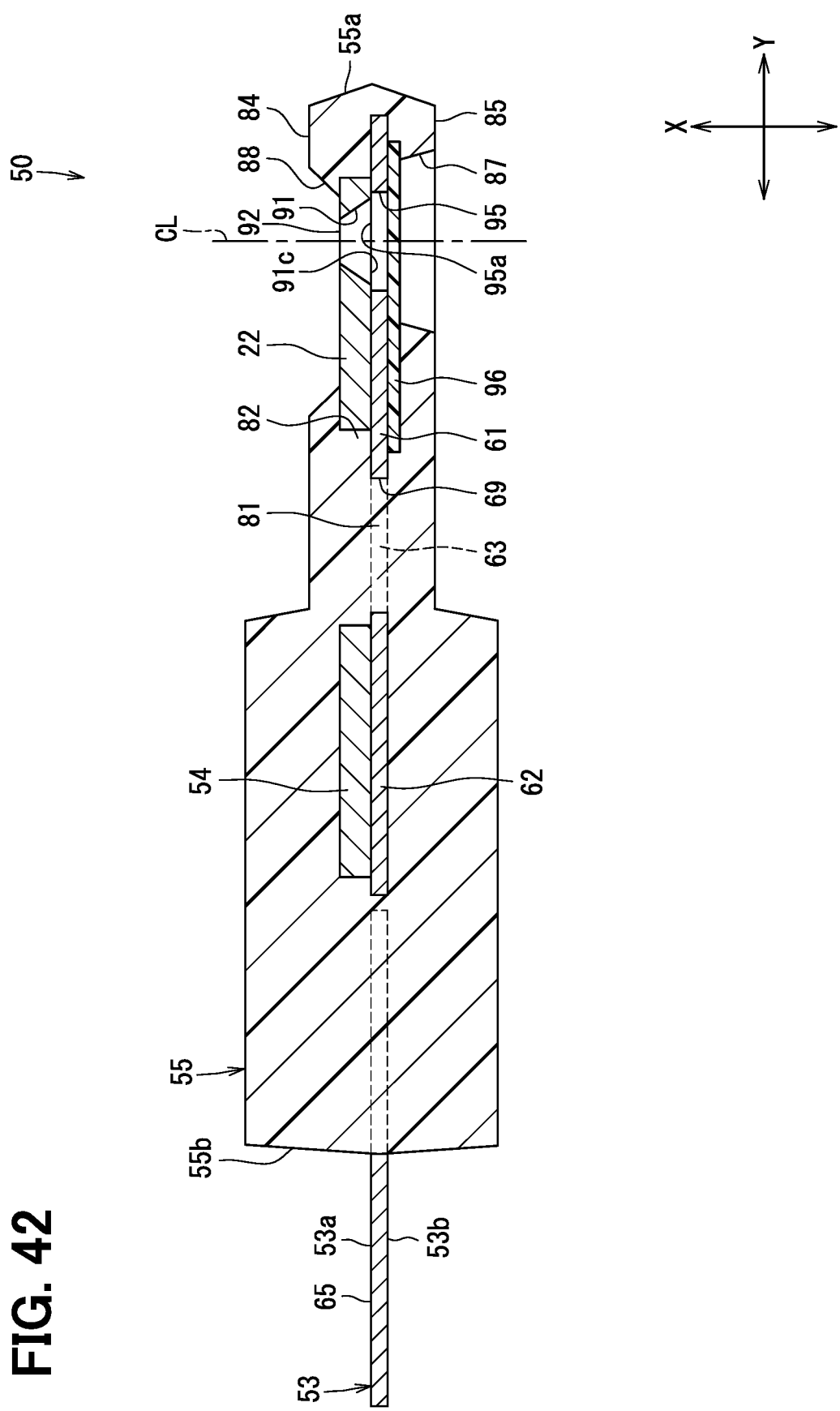
FIG. 42 is a vertical cross-sectional view of a sensor SA in a first modification.

As a first modification, the front opening 95a of the detection frame hole 95 does not have to be smaller than the recess opening 91c of the detection recess 91. For example, as shown in FIG. 42, the front opening 95a is smaller than the recess opening 91c. In this configuration, the peripheral edge portion of the front opening 95a is arranged at a position spaced apart from the recess opening 91c on the outer peripheral side.

Figure 43:
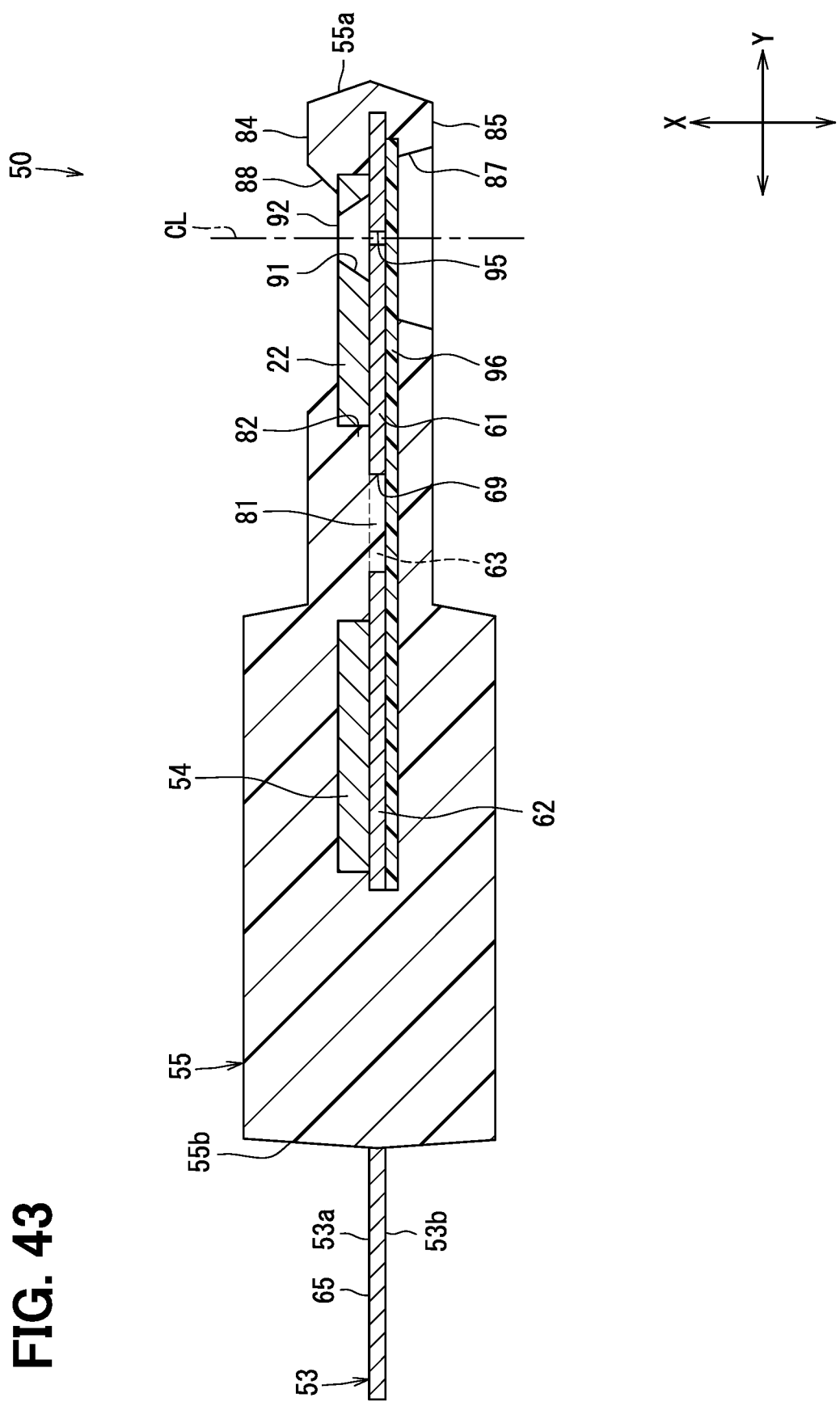
FIG. 43 is a vertical cross-sectional view of a sensor SA in a second modification.

As a second modification, the filter unit 96 may cover the substrate hole 69, in addition to the detection frame hole 95, from the back side. For example, as shown in FIG. 43 and FIG. 44, in the height direction Y, the filter unit 96 is provided to span the detection frame 61 and the processor frame 62 over the substrate hole 69 and the connection frame 63.

As a third modification, both of the flow rate detection unit 22 and the flow rate processor 54 may not be provided on the front side of the SA substrate 53, but at least one of the flow rate detection unit 22 and the flow rate processor 54 may be provided on the back side of the SA substrate 53. For example, the flow rate detection unit 22 is attached to the front surface 61a of the detection frame 61, and the flow rate processor 54 is attached to the back surface of the processor frame 62. As described above, in the configuration in which one of the flow rate detection unit 22 and the flow rate processor 54 is provided on the front side of the SA substrate 53 and the other is provided on the back side of the SA substrate 53, it is less likely that the heat of the flow rate processor 54 will be transferred to the flow rate detection unit 22 via the molded part 55. This is because the separation distance between the flow rate detection unit 22 and the flow rate processor 54 can be made as large as possible.

As a fourth modification, the heat transfer regulation portion such as the frame regulation portion 81 and the plate regulation portion 216 may be provided separately from the molded part 55. For example, a cured resin is provided inside the detection frame hole 95, and then the molded part 55 is molded so as to cover the SA substrate 53 and the flow rate detection unit 22 together with the heat transfer regulation portion. Further, the heat transfer regulation portion may be formed of a material different from that of the molded part 55. For example, the heat transfer regulation portion may be formed of a material having a higher heat insulating property than the molded part 55. Further, the heat transfer regulation portion may be provided by a fluid such as air. For example, the substrate hole 69 is filled with a gas such as air.

In the first embodiment described above, the substrate hole 69 is provided between the detection frame 61 and the processor frame 62 as a through portion passing through the SA substrate 53. As a fifth modification, alternatively, a cutout portion may be provided in the SA substrate 53 as the through portion. In other words, in the first embodiment described above, the substrate hole 69 is provided at an intermediate position of the SA substrate 53 in the depth direction Z. Alternatively, the cutout portion may be formed to extend from one side end of the SA substrate 53 toward the other side end, between the detection frame 61 and the processor frame 62. For example, in the depth direction Z, a cutout portion is provided at one side end of the SA substrate 53, and the connection frame 63 is provided at the other side end. Even in this configuration, the cutout portion as the through portion and the connecting frame 63 are arranged side by side in the depth direction Z, and thus the cutout portion can be easily formed by punching or pressing.

In the first embodiment described above, the width dimension of the connection frame 63 is smaller than the width dimensions of the detection frame 61 and the processor frame 62 in the depth direction Z, so that the cross-sectional area of the connection frames 63 is smaller than those of the detection frame 61 and the processor frame 62. As a sixth modification, alternatively, the thickness dimension of the connection frame 63 may be made smaller than the thickness dimensions of the detection frame 61 and the processor frame 62 in the width direction X, so that the cross-sectional area of the connection frames 63 is smaller than the cross-sectional areas of the detection frame 61 and the processor frame 62. Even in this case, the heat transfer regulation portion such as the frame regulation portion 81 can be provided between the detection frame 61 and the processor frame 62 by the amount that the cross-sectional area of the connection frame 63 is reduced.

As a seventh modification, the base material 151 may be formed by etching processing such as dry etching or wet etching, instead of the forming such as by punching or pressing.

As an eighth modification, in the detection frame 61, the front surface 61*a* may be exposed to the outside of the molded part 55 in addition to or instead of the back surface 61*b*. For example, the depth dimension of the front mold groove 88 is increased so that the front surface 61*a* of the detection frame 61 is exposed on the bottom surface 88*a* of the front mold groove 88. In this configuration, even if heat is transferred from the processor frame 62 to the detection frame 61, the heat is released to the outside from the front surface 61*a* of the detection frame 61 in the front mold groove 88. As a result, the amount of heat transferred to the flow rate detection unit 22 from the detection frame 61 can be reduced. Further, the molded part 55 may be provided with a dedicated heat dissipation hole for releasing heat to the outside from the front surface 53*a* or the back surface 53*b* of the SA substrate 53.

As a ninth modification, a back plate portion such as a glass plate having an insulating property may be provided on the back surface 53*b* of the SA substrate 53 in the configuration of the third embodiment described above. In this case, the SA substrate 53 and the back plate portion form the support plate part.

As a tenth modification, the base material 151 may not have the processor suspension lead 207 that supports the processor frame 62 during the manufacturing of the sensor SA 50, in the configuration of the second embodiment described above. Even in this case, since the processor frame 62 is in a state of being supported by the ground lead terminal 64, the processor frame 62 is not separated from the base material 151. Further, in the base material 151, the detection suspension lead that supports the detection frame 61 may be connected to the bridging lead 152 instead of the connecting lead 153.

As an eleventh modification, the sensor SA 50 may have a physical quantity detector that detects a physical quantity different from the flow rate, such as intake air, as a fluid to measure. Examples of the physical quantity detector include a detection unit that detects temperature, a detection unit that detects humidity, and a detection unit that detects pressure. These detection units may be provided in the measurement flow path 32 or the passage flow path 31 inside the housing 21, or may be provided in the intake passage 12 outside the housing 21. In this case, the sensor SA 50 has a physical quantity processor that receives the detection result of the physical quantity detected by the physical quantity detector.

Descriptions of the reference numerals are added below. Reference numeral 20 denotes an air flow meter as a physical quantity measuring device. Reference numeral 22 denotes a flow rate detection unit as a physical quantity detector. Reference numeral 32 denotes a measurement flow path. Reference numeral 53 denotes a SA substrate as a support plate part. Reference numeral 54 denotes a flow rate processor as a physical quantity processor. Reference numeral 55 indicates a molded part as a body. Reference numeral 61 denotes a detection frame as a detector support portion. Reference numeral 62 denotes a processor frame as a processor support portion. Reference numeral 63 denotes a connection frame as a connection support portion. Reference numeral 64 denotes a grand lead terminal as a support terminal. Reference numeral 69 denotes a substrate hole as a through portion. Reference numeral 81 denotes a frame regulation portion as a heat transfer regulation portion. Reference numeral 85 denotes a back cover portion as a support body portion. Reference numeral 87 denotes a back mold hole as a heat dissipation hole. Reference numeral 205 denotes a first detection suspension lead as a suspension lead. Reference numeral 206 denotes a second detection suspension lead as a suspension lead. Reference numeral 210 denotes an intermediate plate as a support plate portion. Reference numeral 211 denotes a detection plate portion as a detector support portion. Reference numeral 212 denotes a processor plate portion as a processor support portion. Reference numeral 213 indicates a connection plate portion as a connection support portion. Reference numeral 216 indicates a plate regulation unit as a heat transfer regulation portion. Reference numeral Z indicates a depth direction.

What is claimed is:

1. A physical quantity measurement device for measuring a physical quantity of a fluid, the physical quantity measurement device comprising:

a measurement flow path through which the fluid to be measured flows;
a physical quantity detector that detects the physical quantity of the fluid in the measurement flow path;
a physical quantity processor that receives a detection result of the physical quantity detector; and
a support plate part that supports the physical quantity detector and the physical quantity processor, wherein the support plate part includes:
a detector support portion to which the physical quantity detector is attached;
a processor support portion to which the physical quantity processor is attached, the processor support portion being located at a position spaced apart from the detector support portion; and
a connection support portion connecting the detector support portion and the processor support portion, wherein
the physical quantity detector is an air flow rate detector that detects a flow rate of air as the physical quantity,
the physical quantity measurement device further comprising:
a heat transfer regulation portion, between the detector support portion and the processor support portion, the heat transfer regulation portion regulating heat transfer from the processor support portion to the detector support portion.

2. The physical quantity measurement device according to claim 1, wherein
the support plate part is provided with a through portion passing through the support plate part between the detector support portion and the processor support portion, the heat transfer regulation portion is provided inside the through portion, and the connection support portion is aligned with the heat transfer regulation portion.

3. The physical quantity measurement device according to claim 2, wherein
the connection support portion is shifted outward, in an alignment direction of the connection support portion and the heat transfer regulation portion, from both of the physical quantity detector and the physical quantity processor.

4. The physical quantity measurement device according to claim 1, further comprising:
a body that protects the physical quantity detector and the physical quantity processor, and transfers less heat than the support plate part, wherein
the heat transfer regulation portion is provided by a portion of the body that is inserted between the detector support portion and the processor support portion.

5. The physical quantity measurement device according to claim 4, wherein
the support plate part includes a support terminal that is electrically connected to the physical quantity processor, and
the support terminal exposes outside of the body in a state of extending from the processor support portion.

6. The physical quantity measurement device according to claim 4, wherein
the support plate part includes a suspension lead that exposes outside of the body in a state of extending from the detector support portion.

7. The physical quantity measurement device according to claim 4, wherein
the body includes:

a support body portion covering the detector support portion; and
a heat radiation hole passing through the support body portion to release heat of the detector support portion to the outside of the body.

8. The physical quantity measurement device according to claim 1, further comprising:
a housing having a passage flow path and the measurement flow path, wherein
the passage flow path having an inflow port that allows the fluid to flow in the passage flow path and an outflow port that allows the fluid to flow out from the passage flow path,
the measurement flow path branches from a position of the passage flow path between the inflow port and the outflow port, and
the physical quantity detector is disposed in the measurement flow path.

9. The physical quantity measurement device according to claim 1, wherein
the support plate part includes two independent portions that are independent from each other, and
the detector support portion is provided by one of the two independent portions and the processor support portion is provided by the other of the two independent portions.

10. The physical quantity measurement device according to claim 1, further comprising:
a body that protects the physical quantity detector and the physical quantity processor, and transfers less heat than the support plate part, wherein
the heat transfer regulation portion is provided by a portion of the body that is inserted between the detector support portion and the processor support portion.

11. The physical quantity measurement device according to claim 10, wherein
the support plate part includes a support terminal that is electrically connected to the physical quantity processor, and
the support terminal exposes outside of the body in a state of extending from the processor support portion.

12. The physical quantity measurement device according to claim 10, wherein
the support plate part includes a suspension lead that exposes outside of the body in a state of extending from the detector support portion.

13. The physical quantity measurement device according to claim 10, wherein the body includes:
a support body portion covering the detector support portion; and
a heat radiation hole passing through the support body portion to release heat of the detector support portion to the outside of the body.

14. A physical quantity measurement device for measuring a physical quantity of a fluid, the physical quantity measurement device comprising:
a measurement flow path through which the fluid to be measured flows;
a physical quantity detector that detects the physical quantity of the fluid in the measurement flow path;
a physical quantity processor that receives a detection result of the physical quantity detector; and
a support plate part that supports the physical quantity detector and the physical quantity processor, wherein
the support plate part includes:
a detector support portion to which the physical quantity detector is attached;

a processor support portion to which the physical quantity processor is attached, the processor support portion being located at a position spaced apart from the detector support portion, the physical quantity measurement device further comprising:

a heat transfer regulation portion, between the detector support portion and the processor support portion, the heat transfer regulation portion regulating heat transfer from the processor support portion to the detector support portion, wherein the support plate part includes a connection support portion connecting the detector support portion and the processor support portion, the support plate part is provided with a through portion passing through the support plate part between the detector support portion and the processor support portion, the heat transfer regulation portion is provided inside the through portion, and the connection support portion is aligned with the heat transfer regulation portion, the connection support portion includes a first support portion and a second support portion disposed on opposite sides of the heat transfer regulation portion and aligned with the heat transfer regulation portion, and the first support portion and the second support portions are shifted outward, in an alignment direction of the first and second support portions and the heat transfer regulation portion, from both of the physical quantity detector and the physical quantity processor.

15. The physical quantity measurement device according to claim 14, wherein the physical quantity detector is an air flow rate detector that detects an air flow rate as the physical quantity of the fluid, and the air flow rate detector is electrically connected to the physical quantity processor through wires.

16. The physical quantity measurement device according to claim 14, wherein the first support portion and the second support portion provide the through hole therebetween in the alignment direction, and an inner distance between the first support portion and the second support portion is larger than a width of the physical quantity processor and a width of the physical quantity detector in the alignment direction.

17. The physical quantity measurement device according to claim 16, wherein a width of the support connection portion defined by an outer distance between the first support portion and the second support portion in the alignment direction is equal to a width of the detector support portion and a width of the processor support portion in the alignment direction.

* * * * *